US007358325B2

(12) United States Patent
Hayes

(10) Patent No.: US 7,358,325 B2
(45) Date of Patent: *Apr. 15, 2008

(54) SULFONATED AROMATIC COPOLYESTERS CONTAINING HYDROXYALKANOIC ACID GROUPS AND SHAPED ARTICLES PRODUCED THEREFROM

(75) Inventor: Richard Allen Hayes, Beaumont, TX (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/887,716

(22) Filed: Jul. 9, 2004

(65) Prior Publication Data
US 2006/0009609 A1    Jan. 12, 2006

(51) Int. Cl.
C08G 63/02      (2006.01)
C08G 63/688     (2006.01)
C08G 63/18      (2006.01)
C08G 63/66      (2006.01)
C08F 20/00      (2006.01)

(52) U.S. Cl. ............ 528/293; 528/296; 528/298; 528/300; 528/301; 528/302; 528/307; 528/308; 528/308.6; 525/437; 525/444; 525/450; 524/407; 428/34.9; 428/35.7; 428/36.4; 428/36.5; 428/221; 428/480; 428/482; 428/364

(58) Field of Classification Search .......... 528/293, 528/296, 298, 300, 301, 302, 307, 308, 308.6; 525/437, 444, 450; 524/401; 428/34.9, 428/35.7, 36.4, 36.5, 221, 480, 482, 364
See application file for complete search history.

(56) References Cited
U.S. PATENT DOCUMENTS

| 3,784,585 | A |   | 1/1974  | Schmitt et al.    |
|-----------|---|---|---------|-------------------|
| 5,097,004 | A |   | 3/1992  | Gallagher et al.  |
| 5,097,005 | A | * | 3/1992  | Tietz ........ 528/272 |
| 5,171,308 | A |   | 12/1992 | Gallagher et al.  |
| 5,219,646 | A |   | 6/1993  | Gallagher et al.  |
| 5,295,985 | A |   | 3/1994  | Romesser et al.   |
| 5,475,080 | A |   | 12/1995 | Gruber et al.     |
| 5,605,981 | A |   | 2/1997  | Imamura et al.    |
| 5,616,657 | A |   | 4/1997  | Imamura et al.    |
| 5,817,721 | A |   | 10/1998 | Warzelhan et al.  |
| 5,844,066 | A |   | 12/1998 | Kakizawa          |
| 6,018,004 | A |   | 1/2000  | Warzelhan et al.  |
| 6,303,677 | B1|   | 10/2001 | Warzelhan et al.  |
| 6,342,304 | B1|   | 1/2002  | Buchanan et al.   |

FOREIGN PATENT DOCUMENTS

| CA | 893216       | 9/1972  |
| EP | 0 618 250 A1 | 10/1994 |
| JP | 2002266167   | 9/2002  |
| JP | 2003003571   | 4/2003  |
| WO | WO 91/02015  | 2/1991  |
| WO | WO 95/16562  | 6/1995  |
| WO | WO 96/15173  | 5/1996  |
| WO | WO 00/01530  | 1/2000  |

OTHER PUBLICATIONS

PCT International Search Report for PCT application No. PCT/US2005/024388, dated Nov. 4, 2005.
European Patent Office Abstract of JP 2003113571 (Teijin Ltd.).
European Patent Office Abstract of JP 2002266167 (Teijin Ltd.).
Kirk-Othmer, Encyclopedia of Chemical Technology, Third Edition, 1980, pp. 82-145, Vol. 11, John Wiley & Sons, New York, NY.
Encyclopedia of Polymer Science and Engineering, Second Edition, 1985, pp. 434-446, vol. 2, John Wiley & Sons, New York, NY.

* cited by examiner

Primary Examiner—Duc Truong
(74) Attorney, Agent, or Firm—Gail D. Tanzer

(57) ABSTRACT

Sulfonated aromatic copolyesters and articles made therefrom, and processes for producing the sulfonated aromatic copolyesters and articles are provided. Articles that can be made from the sulfonated aromatic copolyesters include films, coatings and laminates. Some of the compositions and articles are biocompostable. The films can further be used to form shaped articles such as sheets, food packaging such as sandwich wraps, thermoformed containers, and coatings for, for example, films and other substrates. The sulfonated aromatic copolyesters contain a hydroxyalkanoic acid component.

79 Claims, No Drawings

SULFONATED AROMATIC COPOLYESTERS CONTAINING HYDROXYALKANOIC ACID GROUPS AND SHAPED ARTICLES PRODUCED THEREFROM

FIELD OF THE INVENTION

The present invention relates to sulfonated aromatic copolyesters that contain hydroxyalkanoic acid groups. The copolyesters can be used to form a variety of shaped articles, which use is also within the scope of the present invention.

BACKGROUND

Copolyesters of poly(hydroxyalkanoates) with aromatic dicarboxylic acids are known. For example, Gordon, et al., in WO 91/02015, disclose hydrodegradable aliphatic-aromatic copolyesters that can include hydroxy acids. Imamura, et al., in U.S. Pat. No. 5,605,981 and U.S. Pat. No. 5,616,657, disclose a process for the preparation of certain lactic acid copolyesters that comprise 98-50 weight percent lactide. Warzelhan, et al., in U.S. Pat. No. 5,817,721 and U.S. Pat. No. 5,889,135, disclose certain aliphatic-aromatic copolyesters containing hydroxy acid components. Warzelhan, et al., in U.S. Pat. No. 6,018,004 and U.S. Pat. No. 6,303,677, disclose certain aliphatic-aromatic copolyesters containing hydroxy acids. Buchanan, et al., in U.S. Pat. No. 6,342,304, disclose oriented films derived from linear aliphatic-aromatic copolyesters prepared from any polyester forming combination of hydroxy acids, dicarboxylic acids or derivatives thereof, and diols.

The introduction of a sulfonate functionality into some polyesters has been found to enhance the biodegradation rate of the polyesters and shaped articles produced therefrom.

Copolyesters of poly(hydroxyalkanoates) with aromatic dicarboxylic acids that also contain a sulfonate functionality are known. For example, Gallagher, et al., in U.S. Pat. No. 5,097,004, U.S. Pat. No. 5,171,308, and U.S. Pat. No. 5,219,646, Tietz, in U.S. Pat. No. 5,097,005, and Romesser, et al., in U.S. Pat. No. 5,295,985 disclose certain sulfonated aromatic copolyesters containing 2 to 40 weight percent of a hydroxy acid component. Warzelhan, et al., in U.S. Pat. No. 6,018,004 and U.S. Pat. No. 6,303,677, disclose sulfonated aliphatic-aromatic copolyesters containing hydroxy acids.

Known sulfonated aromatic copolyesters containing hydroxyalkanoic acid components can have unacceptable thermal properties, as evidenced by the low observed crystalline melting temperatures and glass transition temperatures. The present invention provides sulfonated aromatic copolyesters containing hydroxyalkanoic acids and having improved thermal properties, such as crystalline melting points, glass transition temperatures, and heat deflection temperatures, in comparison with known sulfonated aromatic copolyesters containing hydroxyalkanoic acids.

Various polymeric compositions have been used in an attempt to provide improved properties for uses such as sheets and wraps. In particular, poly(ethylene terephthalate) (PET) has been used to form low-cost sheets for many years. However, PET sheets can have inadequate low temperature impact strength, too low glass transition temperature (Tg) and/or too high rate of crystallization for some uses. Thus, PET sheets at low temperatures can be susceptible to breakage and diminished optical clarity at higher temperatures.

Polycarbonate sheets can be used in applications wherein low temperature impact strength is needed, or a high service temperature is required. Polycarbonate sheets have impact strengths at low temperatures and Tg suitable for use in high temperature applications. However, polycarbonate can have inadequate solvent resistance, thereby limiting its use in certain applications, and can be prone to stress induced cracking. Polycarbonate sheets also provide greater impact strength than is needed for certain applications, making them too costly and inefficient for some uses.

A need remains for polymeric materials that can be used in making articles such as packages, and that have thermal properties that enable them to be used in higher temperature uses without the loss of physical and structural integrity.

BRIEF SUMMARY OF THE INVENTION

One aspect of the present invention includes sulfonated aromatic copolyesters containing between 1.0 to 99.0 mole percent of a hydroxyalkanoic acid component. The sulfonated aromatic copolyesters consist essentially of 98.9 to 1.0 mole percent of an aromatic dicarboxylic acid component, 1.0 to 99.0 mole percent of a hydroxyalkanoic acid component selected from lactic acid, glycolic acid and mixtures thereof, 99.0 to 1.0 mole percent of a single first glycol component selected from ethylene glycol, 1,3-propanediol and 1,4-butanediol, 0.1 to 10.0 mole percent of a sulfonate component, 0 to 5.0 mole percent of an other glycol component, 0 to 5.0 mole percent of a polyfunctional branching agent, and optionally an effective amount of a color reducing agent. In some embodiments, the sulfonated aromatic copolyester compositions contain one or more fillers. In some embodiments, the sulfonated aromatic copolyesters are biodegradable. The sulfonated aromatic copolyesters have enhanced thermal properties in comparison to conventional sulfonated aromatic copolyesters.

Another aspect of the present invention is a process for producing a sulfonated aromatic copolyester. The process includes: providing a reaction mixture comprising an aromatic dicarboxylic component, a hydroxyalkanoic acid component, a single first glycol component selected from ethylene glycol, 1,3-propanediol and 1,4-butanediol, 0.1 to 10.0 mole percent of a sulfonate component, 0 to 5.0 mole percent of a second glycol component, and optionally a polyfunctional branching agent; and allowing the aromatic dicarboxylic acid component, the hydroxyalkanoic acid component, the sulfonate component, the first glycol component, the second glycol component and the polyfunctional branching agent to polymerize to form a sulfonated aromatic copolyester comprising an acid component, and a glycol component. The acid component consists essentially of 98.9 to 1.0 mole percent of an aromatic dicarboxylic acid component based on 100 mole percent total acid component, 1.0 to 99.0 mole percent of a hydroxyalkanoic acid component selected from lactic acid, glycolic acid and mixtures thereof, based on 100 mole percent total acid component, and about 0.1 to about 5.0 mole percent of a sulfonate component based on 100 mole percent total acid component. The glycol component contains about 99.0 to about 1.0 mole percent of a single first glycol component selected from ethylene glycol, 1,3-propanediol and 1,4-butanediol and 0 to about 5.0 mole percent of one or more of a second glycol component based on 100 mole percent total glycol component.

A further aspect of the present invention includes shaped articles produced from sulfonated aromatic copolyesters containing between 1.0 to 99.0 mole percent of a hydroxyalkanoic acid component. The sulfonated aromatic copolyesters consist essentially of 98.9 to 1.0 mole percent of an aromatic dicarboxylic acid component, 1.0 to 99.0 mole percent of a hydroxyalkanoic acid component selected from lactic acid, glycolic acid, and mixtures thereof, 99.0 to 1.0 mole percent of a single glycol selected from ethylene glycol, 1,3-propanediol, and 1,4-butanediol, 0.1 to 10.0 mole percent of a sulfonate component, 0 to 5.0 mole percent of an other glycol component, 0 to 5.0 mole percent of a polyfunctional branching agent, and optionally an effective amount of a color reducing agent. The sulfonated aromatic copolyester compositions can contain fillers. In some embodiments the sulfonated aromatic copolyesters are biodegradable. The shaped articles produced do shaped articles produced from the known sulfonated aromatic copolyesters. Shaped articles include film, sheets, fiber, melt blown containers, molded parts, such as cutlery, foamed parts, coatings, polymeric melt extrusion coatings onto substrates, polymeric solution coatings onto substrates, and laminates.

A further aspect of the present invention includes sulfonated aromatic copolyesters containing between 1.0 to 99.0 mole percent of a hydroxyalkanoic acid component which are filled with between 0.01 to 80 weight percent fillers, based on the total combined weight of polymer and filler. The sulfonated aromatic copolyesters consist essentially of 98.9 to 1.0 mole percent of an aromatic dicarboxylic acid component, 1.0 to 99.0 mole percent of a hydroxyalkanoic acid component selected from lactic acid, glycolic acid and mixtures thereof, 99.0 to 1.0 mole percent of a single glycol selected from ethylene glycol, 1,3-propanediol, and 1,4-butanediol, 0.1 to 10.0 mole percent of a sulfonate component, 0 to 5.0 mole percent of an other glycol component, 0 to 5.0 mole percent of a polyfunctional branching agent, and optionally an effective amount of a color reducing agent. In some embodiments the filled sulfonated aromatic copolyesters are biodegradable.

A further aspect of the present invention includes shaped articles produced from sulfonated aromatic copolyesters containing between 1.0 to 99.0 mole percent of a hydroxyalkanoic acid component and which are filled with between 0.01 to 80 weight percent fillers. The sulfonated aromatic copolyesters consist essentially of 98.9 to 1.0 mole percent of an aromatic dicarboxylic acid component, 1.0 to 99.0 mole percent of a hydroxyalkanoic acid component selected from lactic acid, glycolic acid and mixtures thereof, 99.0 to 1.0 mole percent of a single glycol selected from ethylene glycol, 1,3-propanediol, and 1,4-butanediol, 0.1 to 10.0 mole percent of a sulfonate component, 0 to 5.0 mole percent of an other glycol component, 0 to 5.0 mole percent of a polyfunctional branching agent, and optionally an effective amount of a color reducing agent. In some embodiments the filled sulfonated aromatic copolyesters are biodegradable.

One preferred aspect of the present invention includes film comprising sulfonated aromatic copolyesters containing between 1.0 to 99.0 mole percent of a hydroxyalkanoic acid component and processes to produce same. The sulfonated aromatic copolyesters consist essentially of 98.9 to 1.0 mole percent of an aromatic dicarboxylic acid component, 1.0 to 99.0 mole percent of a hydroxyalkanoic acid component selected from lactic acid, glycolic acid and mixtures thereof, 99.0 to 1.0 mole percent of a single glycol selected from ethylene glycol, 1,3-propanediol, and 1,4-butanediol, 0.1 to 10.0 mole percent of a sulfonate component, 0 to 5.0 mole percent of an other glycol component, 0 to 5.0 mole percent of a polyfunctional branching agent, and optionally an effective amount of a color reducing agent. The sulfonated aromatic copolyesters can contain fillers. The films of the sulfonated aromatic copolyesters have an optimized balance of physical properties, such as toughness, thermal dimensional stability and moisture barrier, in comparison to films of known sulfonated aromatic copolyesters.

A further preferred aspect of the present invention includes oriented film, such as uniaxially or biaxially oriented film, comprising sulfonated aromatic copolyesters containing between 1.0 to 99.0 mole percent of a hydroxyalkanoic acid component and processes to produce same. The sulfonated aromatic copolyesters consist essentially of 98.9 to 1.0 mole percent of an aromatic dicarboxylic acid component, 1.0 to 99.0 mole percent of a hydroxyalkanoic acid component selected from lactic acid, glycolic acid, and mixtures thereof, 99.0 to 1.0 mole percent of a single glycol selected from ethylene glycol, 1,3-propanediol, and 1,4-butanediol, 0.1 to 10.0 mole percent of a sulfonate component, 0 to 5.0 mole percent of an other glycol component, 0 to 5.0 mole percent of a polyfunctional branching agent, and optionally an effective amount of a color reducing agent. The sulfonated aromatic copolyesters can contain fillers. The oriented films of the sulfonated aromatic copolyesters have an optimized balance of physical properties, such as toughness, thermal dimensional stability and moisture barrier, in comparison to films of known sulfonated aromatic copolyesters.

A further preferred aspect of the present invention includes films laminated onto substrates comprising sulfonated aromatic copolyesters containing between 1.0 to 99.0 mole percent of a hydroxyalkanoic acid component and processes to produce same. The substrates may include, for example, paper, paperboard, inorganic foams, organic foams, inorganic-organic foams. The sulfonated aromatic copolyesters consist essentially of 98.9 to 1.0 mole percent of an aromatic dicarboxylic acid component, 1.0 to 99.0 mole percent of a hydroxyalkanoic acid component selected from lactic acid, glycolic acid and mixtures thereof, 99.0 to 1.0 mole percent of a single glycol selected from the group of ethylene glycol, 1,3-propanediol, and 1,4-butanediol, 0.1 to 10.0 mole percent of a sulfonate component, 0 to 5.0 mole percent of an other glycol component, 0 to 5.0 mole percent of a polyfunctional branching agent, and optionally an effective amount of a color reducing agent. The sulfonated aromatic copolyesters can contain fillers. The laminated films of the sulfonated aromatic copolyesters have an optimized balance of physical properties, such as toughness, thermal dimensional stability and moisture barrier, in comparison to laminated films of known sulfonated aromatic copolyesters.

A further preferred aspect of the present invention includes films coated onto substrates comprising sulfonated aromatic copolyesters containing between 1.0 to 99.0 mole percent of a hydroxyalkanoic acid component and processes to produce same. The substrates may include, for example, paper, paperboard, inorganic foams, organic foams, inorganic-organic foams. The sulfonated aromatic copolyesters consist essentially of 98.9 to 1.0 mole percent of an aromatic dicarboxylic acid component, 1.0 to 99.0 mole percent of a hydroxyalkanoic acid component selected from lactic acid, glycolic acid, and mixtures thereof, 99.0 to 1.0 mole percent of a single glycol selected from ethylene glycol, 1,3-propanediol, and 1,4-butanediol, 0.1 to 10.0 mole percent of a sulfonate component, 0 to 5.0 mole percent of an other glycol component, 0 to 5.0 mole percent of a polyfunctional branching agent, and optionally an effective amount of a color reducing agent. The sulfonated aromatic copolyesters can contain fillers. The coated films of the sulfonated aromatic copolyesters have an optimized balance of physical properties, such as toughness, thermal dimensional stability and moisture barrier, in comparison to coated films of known sulfonated aromatic copolyesters.

A further preferred aspect of the present invention includes the use of film comprising sulfonated aromatic copolyesters containing between 1.0 to 99.0 mole percent of a hydroxyalkanoic acid component for food packaging end uses, especially for disposable food packaging end uses such as food wraps. The sulfonated aromatic copolyesters consist essentially of 98.9 to 1.0 mole percent of an aromatic dicarboxylic acid component, 1.0 to 99.0 mole percent of a hydroxyalkanoic acid component selected from lactic acid, glycolic acid and mixtures thereof, 99.0 to 1.0 mole percent of a single glycol selected from ethylene glycol, 1,3-propanediol, and 1,4-butanediol, 0.1 to 10.0 mole percent of a sulfonate component, 0 to 5.0 mole percent of an other glycol component, 0 to 5.0 mole percent of a polyfunctional branching agent, and optionally an effective amount of a color reducing agent. The sulfonated aromatic copolyesters can contain fillers. The food packaging films of the sulfonated aromatic copolyesters have an optimized balance of physical properties, such as toughness, thermal dimensional stability, deadfold performance, and moisture barrier, in comparison to food packaging films of known sulfonated aromatic copolyesters.

A further preferred aspect of the present invention includes the use of oriented film, such as uniaxially or biaxially oriented film, comprising sulfonated aromatic copolyesters containing between 1.0 to 99.0 mole percent of a hydroxyalkanoic acid component for food packaging end uses, especially for disposable food packaging end uses such as food wraps. The sulfonated aromatic copolyesters consist essentially of 98.9 to 1.0 mole percent of an aromatic dicarboxylic acid component, 1.0 to 99.0 mole percent of a hydroxyalkanoic acid component selected from lactic acid, glycolic acid and mixtures thereof, 99.0 to 1.0 mole percent of a single glycol selected from ethylene glycol, 1,3-propanediol, and 1,4-butanediol, 0.1 to 10.0 mole percent of a sulfonate component, 0 to 5.0 mole percent of an other glycol component, 0 to 5.0 mole percent of a polyfunctional branching agent, and optionally an effective amount of a color reducing agent. The sulfonated aromatic copolyesters can contain fillers. The oriented food packaging films of the sulfonated aromatic copolyesters have an optimized balance of physical properties, such as toughness, thermal dimensional stability, deadfold performance, and moisture barrier, in comparison to food packaging films of known sulfonated aromatic copolyesters.

A further preferred aspect of the present invention includes the use of films laminated onto substrates comprising sulfonated aromatic copolyesters containing between 1.0 to 99.0 mole percent of a hydroxyalkanoic acid component for food packaging or food service end uses. The substrates may include, for example, paper, paperboard, inorganic foams, organic foams, inorganic-organic foams. The sulfonated aromatic copolyesters consist essentially of 98.9 to 1.0 mole percent of an aromatic dicarboxylic acid component, 1.0 to 99.0 mole percent of a hydroxyalkanoic acid component selected from lactic acid, glycolic acid and mixtures thereof, 99.0 to 1.0 mole percent of a single glycol selected from ethylene glycol, 1,3-propanediol, and 1,4-butanediol, 0.1 to 10.0 mole percent of a sulfonate component, 0 to 5.0 mole percent of an other glycol component, 0 to 5.0 mole percent of a polyfunctional branching agent, and optionally an effective amount of a color reducing agent. The sulfonated aromatic copolyesters can contain fillers. The foods packaging or food service laminated films of the sulfonated aromatic copolyesters have an optimized balance of physical properties, such as toughness, thermal dimensional stability and moisture barrier, in comparison to food packaging or food service laminated films of known sulfonated aromatic copolyesters.

A further preferred aspect of the present invention includes the use of coatings onto substrates comprising sulfonated aromatic copolyesters containing between 1.0 to 99.0 mole percent of a hydroxyalkanoic acid component for food packaging or food service end uses. The substrates may include, for example, paper, paperboard, inorganic foams, organic foams, inorganic-organic foams. The sulfonated aromatic copolyesters consist essentially of 98.9 to 1.0 mole percent of an aromatic dicarboxylic acid component, 1.0 to 99.0 mole percent of a hydroxyalkanoic acid component selected from lactic acid, glycolic acid and mixtures thereof, 99.0 to 1.0 mole percent of a single glycol selected from the group of ethylene glycol, 1,3-propanediol, and 1,4-butanediol, 0.1 to 10.0 mole percent of a sulfonate component, 0 to 5.0 mole percent of an other glycol component, 0 to 5.0 mole percent of a polyfunctional branching agent, and optionally an effective amount of a color reducing agent. The sulfonated aromatic copolyesters can contain fillers. The food packaging or food service coatings of the sulfonated aromatic copolyesters have an optimized balance of physical properties, such as toughness, thermal dimensional stability and moisture barrier, in comparison to food packaging or food service coatings of known sulfonated aromatic copolyesters.

DETAILED DESCRIPTION OF THE INVENTION

The present invention provides compositions, shaped articles, preferably as films, coatings, and laminates, of aromatic copolyesters containing a hydroxyalkanoic acid component, and processes to produce the compositions and articles. The present invention further includes packaging, particularly food packaging, especially disposable food packaging such as wraps, cups, bowls, plates, containing the preferred films, coatings onto substrates, such as, for example, paper, paperboard, inorganic foams, organic foams, and inorganic-organic foams, and laminates onto substrates, such as, for example, paper, paperboard, inorganic foams, organic foams, and inorganic-organic foams.

The aromatic copolyesters consist essentially of 98.9 to 1.0 mole percent of an aromatic dicarboxylic acid component; 1.0 to 99.0 mole percent of a hydroxyalkanoic acid selected from lactic acid, glycolic acid and mixtures thereof; 99 to 1.0 mole percent of a single glycol selected from ethylene glycol, 1,3-propanediol, and 1,4-butanediol; 0.1 to 10.0 mole percent of a sulfonate component, (based on a total of 100 mole percent of the aromatic dicarboxylic acid component, the hydroxyalkanoic acid component, and the sulfonate component); 0 to 5.0 mole percent of an other glycol component; 0 to 5.0 mole percent of a polyfunctional branching agent; and optionally an effective amount of a color reducing agent component.

The aromatic dicarboxylic acid component is selected from unsubstituted and substituted aromatic dicarboxylic acids, the lower alkyl esters of aromatic dicarboxylic acids having from 8 carbons to 20 carbons, and bisglycolate esters of aromatic dicarboxylic acids. Examples of desirable diacid moieties in the dicarboxylic acids and esters thereof include those derived from terephthalates, isophthalates, naphthalates and bibenzoates. Although essentially any aromatic dicarboxylic acid and ester there of can be used; however, examples of desirable aromatic dicarboxylic acid components include terephthalic acid, dimethyl terephthalate, isophthalic acid, dimethyl isophthalate, 2,6-naphthalene dicarboxylic acid, dimethyl-2,6-naphthalate, 2,7-naphthalene dicarboxylic acid, dimethyl-2,7-naphthalate, 3,4'-diphenyl ether dicarboxylic acid, dimethyl-3,4'diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), bis(2-hydroxyethyl)terephthalate, bis(2-hydroxyethyl) isophthalate, bis(3-hydroxypropyl)terephthalate, bis(4-hydroxybutyl)terephthalate, bis(4-hydroxybutyl)isophthalate, and bis(3-hydroxypropyl)isophthalate, and mixtures derived therefrom. Preferably, the aromatic dicarboxylic acid component is selected from terephthalic acid, dimethyl terephthalate, isophthalic acid, dimethyl isophthalate, 2,6-naphthalene dicarboxylic acid, dimethyl-2,6-naphthalate, and mixtures derived therefrom. Preferably, the aromatic dicarboxylic acid component is selected from terephthalic acid and isophthalic acid and lower alkyl esters, such as dimethyl terephthalate and dimethyl isophthalate, and glycolate esters, such as bis(2-hydroxyethyl)terephthalate, bis(2-hydroxyethyl)isophthalate, bis(3-hydroxypropyl)terephthalate, bis(4-hydroxybutyl)terephthalate, bis(4-hydroxybutyl) isophthalate, and bis(3-hydroxypropyl)isophthalate, and mixtures thereof. Preferably, the sulfonated aromatic copolyester contains between 98.9 and 30 mole percent of the aromatic dicarboxylic acid component. More preferably, the sulfonated aromatic copolyester contains between 98.9 and 50 mole percent of the aromatic dicarboxylic acid component. Even more preferably, the aromatic copolyester contains between 95 and 50 mole percent of the aromatic dicarboxylic acid component.

The hydroxyalkanoic acid component is selected from lactic acid and glycolic acid, the lower alkyl esters having 2 to 10 carbon atoms, glycolate esters of lactic acid and glycolic acid, cyclic dimers of lactic acid and glycolic acid, and oligomers and polymers of lactic acid and glycolic acid. Although essentially any derivative of lactic acid and glycolic acid known can be used, specific examples of desirable hydroxyalkanoic acid components include: lactic acid, DL-lactic acid, L-lactic acid, glycolic acid, methyl lactate, methyl (R)-(+)-lactate, methyl (S)-(−)-lactate, methyl glycolate, ethyl lactate, ethyl (R)-(+)-lactate, ethyl (S)-(−)-lactate, ethyl glycolate, (2-hydroxyethyl)lactate, (2-hydroxyethyl) (R)-(+)-lactate, (2-hydroxyethyl) (S)-(−)-lactate, (3-hydroxypropyl)lactate, (3-hydroxypropyl) (R)-(+)-lactate, (3-hydroxypropyl) (S)-(−)-lactate, (4-hydroxybutyl)lactate, (2-hydroxyethyl)glycolate, (3-hydroxypropyl)glycolate, (4-hydroxybutyl)glycolate), lactide, 3,6-dimethyl-1,4-dioxane-2,5-dione, L-lactide, (3 S-cis)-3,6-dimethyl-1,4-dioxane-2,5-dione, glycolide, poly(lactide), poly(DL-lactide), poly(glycolide) and mixtures derived therefrom.

Preferably, the sulfonated aromatic copolyester includes between 1 and 70 mole percent of the hydroxyalkanoic acid component. More preferably, the sulfonated aromatic copolyester includes between 1 and 50 mole percent of the hydroxyalkanoic acid component. Even more preferably, the sulfonated aromatic copolyester includes between 5 and 50 mole percent of the hydroxyalkanoic acid component. Preferably, the hydroxyalkanoic acid component is bio-derived, for example, by fermentation.

The sulfonate component can be provided in an aliphatic or aromatic monomer, or can be introduced as an endgroup. Exemplary aliphatic sulfonate components include the metal salts of sulfosuccinic acid. Examples of aromatic sulfonate components suitable for introduction as endgroups include the metal salts of 3-sulfobenzoic acid, 4-sulfobenzoic acid, 5-sulfosalicylic acid. Preferred are sulfonate components whereby the sulfonate salt group is attached to an aromatic dicarboxylic acid. The aromatic nucleus can be, for example, benzene, naphthalene, diphenyl, oxydiphenyl, sulfonyldiphenyl, or methylenediphenyl.

Preferred sulfonate-containing monomers are residues of a sulfonate-substituted phthalic acid, terephthalic acid, isophthalic acid, or 2,6-naphthalenedicarboxylic acid. More preferably, the sulfonate component is a metal salt of 5-sulfoisophthalic acid or of a lower alkyl ester of 5-sulfoisophthalate. The metal salts can be of monovalent or polyvalent alkali metal ions, alkaline earth metal ions, or other metal ions. Preferred alkali metal ions are, for example, sodium, potassium or lithium. However, alkaline earth metals such as magnesium are also useful. Other useful metal ions include those of transition metals, such as zinc, cobalt or iron. Multivalent metal ions can be useful when an increase in the melt viscosity of the sulfonated aromatic copolyesters is desired. Examples of uses wherein such melt viscosity enhancements may prove useful include melt extrusion coatings, melt blown containers or film, and foam. As little as 0.1 mole percent of the sulfonate component can contribute significantly to the property characteristics of the resultant films or coatings. Preferably, the amount of sulfonate component is 0.1 to 4.0 mole percent.

The optional other glycol component is selected from unsubstituted, substituted, straight chain, branched, cyclic aliphatic, aliphatic-aromatic and aromatic diols having from 2 carbon atoms to 36 carbon atoms. Essentially any other glycol known can be used; however, specific examples of desirable other glycol components include ethylene glycol, 1,3-propanediol, 1,4-butanediol, 1,6-hexanediol, 1,8-octanediol, 1,10-decanediol, 1,12-dodecanediol, 1,14-tetradecanediol, 1,16-hexadecanediol, dimer diol, 4,8-bis(hydroxymethyl)-tricyclo[5.2.1.0/2.6]decane, 1,4-cyclohexanedimethanol, isosorbide, di(ethylene glycol), tri (ethylene glycol) and mixtures derived therefrom.

The optional polyfunctional branching agent includes any material with three or more carboxylic acid functions, ester functions, hydroxy functions or a mixture thereof. Essentially any polyfunctional material that includes three or more carboxylic acid or hydroxyl functions can be used. Specific examples of desirable polyfunctional branching agent components include 1,2,4-benzenetricarboxylic acid, (trimellitic acid), trimethyl-1,2,4-benzenetricarboxylate, tris(2-hydroxyethyl)-1,2,4-benzenetricarboxylate, 1,2,4-benzenetricarboxylic anhydride, (trimellitic anhydride), 1,3,5-benzenetricarboxylic acid, 1,2,4,5-benzenetetracarboxylic acid, (pyromellitic acid), 1,2,4,5-benzenetetracarboxylic dianhydride, (pyromellitic anhydride), 3,3',4,4'-benzophenonetetracarboxylic dianhydride, 1,4,5,8-naphthalenetetracarboxylic dianhydride, citric acid, tetrahydrofuran-2,3,4,5-tetracarboxylic acid, 1,3,5-cyclohexanetricarboxylic acid, pentaerythritol, glycerol, 2-(hydroxymethyl)-1,3-propanediol, 2,2-bis(hydroxymethyl)propionic acid, and mixtures derived therefrom. The polyfunctional branching agent can be included when higher resin melt viscosity is desired for specific end uses. Examples of such end uses include melt extrusion coatings, melt blown films or containers, and foam. Preferably, the sulfonated aromatic copolyester contains 0 to 1.0 mole percent of the polyfunctional branching agent.

The optional color reducing agent includes any material that effectively reduces the color of the sulfonated aromatic copolyester. Examples of general classes of color reducing agents that can be used include: phosphorus-containing materials, hindered phenolic materials, such as antioxidants, nitrogen-containing materials, especially secondary and tertiary amines, hindered amine light stabilizers (HALS), and mixtures thereof.

Specific examples of phosphorus-containing materials include: phosphoric acid, phophorous acid, hypophosphorous acid, sodium hypophosphite, potassium tripolyphosphate, polyphosphoric acid, 6H-dibenzo[c,e]oxaphosphorin-6-oxide, phenylphosphinic acid, phenylphosphinic acid, sodium salt hydrate, diphenyl phosphite, potassium pyrophosphate, sodium pyrophosphate decahydrate, triethyl phosphate, 2,2'-ethylidenebis(4,6-di-tert-butylphenyl)fluorophosphite, 3,9-bis(2,4-dicumylphenoxy)-2,4,8,10-tetraoxa-3,9-diphosphaspiro[5.5]undecane, 3,9-bis(octadecyloxy)-2,4,8,10-tetraoxa-3,9-diphosphaspiro[5.5]undecane, diisodecyl phenyl phosphite, 4,4'-isopropylidenebis(diisodecyl phenyl phosphite), tetrakis(2,4-di-tert-butylphenyl)-4,4'-biphenyldiphosphonite, triisodecyl phosphite, tris(2,4-di-tert-butylphenyl)phosphite, tris(nonylphenyl)phosphite, tris(tridecyl)phosphite, calcium bis[monoethyl(3,5-di-tert-butyl-4-hydroxybenzyl)phosphonate], 2,2',2"-nitrilo triethyl-tris[3,3',5',5'-tetra-tert-butyl-1,1'-biphenyl-2,2'-diyl] phosphite, bis[2,4-bis(1,1-dimethylethyl)-6-methylphenyl] ethyl ester of phosphorous acid, bis(2,4-di-tert-butylphenyl)-pentaerythritol diphosphite, and mixtures thereof.

Specific examples of hindered phenolic materials include: 1,3,5-trimethyl-2,4,6-tris(3,5-di-tert-butyl-4-hydroxybenzyl)benzene, 2-(2H-benzotriazol-2-yl)-4-(1,1,3,3-tetramethylbutyl)phenol, 3-tert-butyl-4-hydroxy-5-methylphenyl sulfide, 5-tert-butyl-4-hydroxy-2-methylphenyl sulfide, 2,4-di-tert-butyl-6-(5-chloro-2H-benzotriazol-2-yl)phenol, 2,2'-ethylidenebis(4,6-di-tert-butylphenol), 4,4'-isopropylidenebis(2,6-dimethylphenol), 2,2'-methylenebis [6-(2H-benzotriazol-2-yl)-4-(1,1,3,3-tetramethylbutyl) phenol], 2-(2H-benzotriazol-2-yl)-4,6-bis-(1-methyl-1-phenylethyl)phenol, 2-(2'-hydroxy-3',5'-di-tert-amylphenyl) benzotriazole, 2-(2H-benzotriazol-2-yl)-4-(1,1,3,3-tetramethylbutyl)phenol, 2-(2'-hydroxy-5'-methylphenyl) benzotriazole, 2,2'-methylenebis(6-tert-butyl-4-ethylphenol), 2,2'-methylenebis(6-tert-butyl-4-methylphenol), 4,4'-methylenebis(2,6-di-tert-butylphenol), octadecyl 3-(3,5-di-tert-butyl-4-hydroxyphenyl)propionate, pentaerythritol tetrakis(3,5-di-tert-butyl-4-hydroxyhydrocinnamate), tetrakis[methylene(3,5-di-tert-butyl-4-hydroxyhydrocinnamate)]methane, tris(4-tert-butyl-3-hydroxy-2,6-dimethylbenzyl)isocyanurate, tris(3,5-di-tert-butyl-4-hydroxybenzyl)isocyanurate, 1,3,5-tris-(3,5-di-tert-butyl-4-hydroxybenzyl)-s-triazine-2,4,6(1H,3H,5H)trione, 1,1,3-tris (2-methyl-4-hydroxy-5-tert-butylphenyl)butane, Vitamin E, 2,5,7,8-tetramethyl-2-(4',8',12'-trimethyltridecyl)-6-chromanol, alpha-tocopherol, ethylene bis(oxyethylene)bis(3-tert-butyl-4-hydroxy-5-methylhydrocinnamate), hexamethylenebis(3,5-di-tert-butyl-4-hydroxyhydrocinnamate), 4-[[4,6-bis(octylthio)-s-triazin-2-yl]amino]-2,6-di-tert-butylphenol, N,N'-1,3-propanediylbis(3,5-di-tert-butyl-4-hydroxyhydrocinnamamide), N,N'-hexamethylene bis(3,5-di-tert-butyl-4-hydroxyhydrocinnamamide), thiodiethylene bis (3,5-di-tert-butyl-4-hydroxyhydrocinnamate), 2-methyl-4,6-bis[(octylthio)methyl]phenol, 3,5-di-tert-butyl-4-hydroxyhydrocinnamic acid triester with 1,3,5-tris(2-hydroxyethyl)-s-triazine-2,4,6(1H,3H,5H)-trione, 1,2-bis(3, 5-di-tert-butyl-4-hydroxyhydrocinnamoyl)hydrazine, mono-methylhydroquinone, mono-tert-butylhydroquinone, 2,5-di-tert-butylhydroquinone, and mixtures thereof.

Specific examples of nitrogen-containing materials include: trioctyl amine, tridodecylamine, triisodecylamine, triisooctylamine, trioctylamine, bis(hydrogenated tallow alkyl)amines, bis(hydrogenated tallow alkyl)amines, oxidized, 4-acetamido-2,2,6,6-tetramethylpiperidine, N-(1-acetyl-2,2,6,6-tetramethyl-4-piperidinyl)-2-dodecylsuccinimide, bis[2-[2-(1-methylethyl)-3-oxazolidinyl]ethyl]1,6-hexanediylbiscarbamate, N,N'-bis(2,2,6,6-tetramethyl-4-piperidinyl)-1,6-hexanediamine, 1,4-diazabicyclo[2.2.2] octane, 4-(dimethylamino)-1,2,2,6,6-pentamethylpiperidine, 4-dimethylamino-2,2,6,6-tetramethylpiperidine, 2-dodecyl-N-(1,2,2,6,6-pentamethyl-4-piperidinyl)succinimide, 2-dodecyl-N-(2,2,6,6-tetramethyl-4-piperidinyl)succinimide, hexahydro-2,6-bis (2,2,6,6-tetramethyl-4-piperidinyl)-1H,4H,5H,8H-2,3a,4a, 6,7a,8a-hexaazacyclopenta[def]fluorene-4,8-dione, 4-hydroxy-2,2,6,6-tetramethyl-4-piperidinecarboxylic acid, phenothiazine, poly[N,N'-bis(2,2,6,6-tetramethyl-4-piperidinyl)1,6-hexanediamine-co-2,4-dichloro-6-morpholino-1,3,5-triazine], poly(1,2-dihydro-2,2,4-trimethylquinoline), 7,7,9,9-tetramethyl-1,4-dioxa-8-azaspiro[4.5]decane-2-methanol, 2,2,6,6-tetramethylpiperidine, 2,2,6,6-tetramethyl-4-piperidinol, poly[[6-[-(1,1,3,3-tetramethylbutyl) amino]-s-triazine-2,4-diyl][2,2,6,6-tetramethyl-4-piperidyl) imino]hexamethylene[(2,2,6,6-tetramethyl-4-piperidyl) imino]], reaction products of N-phenylbenzenamine with 2,4,4-trimethylpentenes, dimethyl succinate polymer with 4-hydroxy-2,2,6,6-tetramethyl-1-piperidineethanol, 2,2'-(2, 5-thiophenediyl)bis[5-tert-butylbenzoxazole], bis(2,2,6,6-tetramethyl-4-piperidinyl)sebacate, 1,3,5-triazine-2,4,6-triamine, N,N'-[1,2-ethanediylbis[N-[3-[4,6-bis-[butyl(1,2,2, 6,6-penyamethyl-4-piperidinyl)amino]-1,3,5-triazin-2-yl] amino]propyl]-[N',N"-dibutyl-N',N"-bis(1,2,2,6,6-pentamethyl-4-piperidinyl), bis(1-octyloxy-2,2,6,6-tetramethyl-4-piperidinyl)sebacate, and mixtures thereof.

As one skilled within the art would appreciate, "an effective amount" of the color reducing agent can vary within a wide range due to the great diversity of the chemical structures and the molecular weights of the color reducing agents. Preferably, "an effective amount" includes 0.001 to 5 weight percent of the color reducing agent based on the weight of the polymer. More preferably, "an effective amount" includes 0.001 to 1 weight percent of the color reducing agent based on the weight of the polymer. Most preferably, "an effective amount" includes 0.001 to 0.5 weight percent of the color reducing agent based on the weight of the polymer.

The color reducing agent can be added at any stage of the polymerization. For example, the color reducing agent can be added with the monomers, after the esterification or transesterification process, or at any stage of the finishing operation. Preferably the color reducing agent is added prior to the polymer reaching an inherent viscosity of about 0.50 dL/g. More preferably, the color reducing agent is added prior to the polymer reaching an inherent viscosity of about 0.25 dL/g. If desired, additional color reducing agent can be added after the polymerization to reduce color formation in subsequent processes, including fabrication into shaped articles, or within the intended end use.

While the color reducing agent can reduce color at any polymerization temperature, it is effective in allowing for the polymerization temperatures to be raised without undue increases in the discoloration of the product polymer. As one skilled within the art will appreciate, the polymerization rate is generally enhanced as the polymerization temperature is increased. This allows for a more rapid, economical polymerization process than processes typical for conventional sulfonated aromatic copolyesters containing hydroxyalkanoic acid residues.

To give the desired physical properties, the sulfonated aromatic copolyesters containing hydroxyalkanoic acid residues desirably have an inherent viscosity at least equal to or greater than 0.15. More desirably, the inherent viscosity, (IV), of the sulfonated aromatic copolyesters will be at least equal to 0.35 dL/g, as measured on a 0.5 percent (weight/volume) solution of the copolyester in a 50:50 (weight) solution of trifluoroacetic acid:dichloromethane solvent system at room temperature. Although the inherent viscosities recited hereinabove are sufficient for some applications, higher inherent viscosities are desirable for many other applications, such as, for example, in making films, bottles, sheet, and molding resin. The polymerization conditions can be adjusted to obtain the desired inherent viscosities up to at least about 0.5 and desirably higher than 0.65 dL/g. Further processing of the copolyester may achieve inherent viscosities of 0.7, 0.8, 0.9, 1.0, 1.5, 2.0 dL/g and even higher.

As is known to those skilled in the art, the inherent viscosity of a polymer is indicative of its molecular weight. The molecular weight is normally not measured directly. Instead, the inherent viscosity of the polymer in solution or the melt viscosity is used as an indicator of molecular weight. The inherent viscosities are an indicator of molecular weight for comparisons of samples within a polymer family, such as poly(ethylene terephthalate), poly(butylene terephthalate), etc., and are used as the indicator of molecular weight herein.

The sulfonated aromatic copolyesters can be prepared by any conventional polycondensation technique. The copolyester composition may vary somewhat due to the method of preparation used, particularly in the amount of diol and hydroxyalkanoic acid component that is present within the polymer. Preferably, the sulfonated aromatic copolyesters are produced by a melt polymerization process. In a preferred melt polymerization process, the aromatic dicarboxylic acid component, (either as acids, esters, glycolate esters, polymers, or mixtures thereof, the hydroxyalkanoic acid component, (either as acids, esters, glycolate esters, cyclic dimers, polymers, or mixtures thereof, the sulfonate component, the glycol, the other glycol component, optionally the polyfunctional branching agent, and optionally the color reducing agent, are combined in the presence of a catalyst to a high enough temperature that the monomers combine to form esters and diesters, then oligomers, and finally polymers. The polymeric product at the end of the polymerization process is a molten product. Generally, the other glycol component and the glycol component are volatile and distill from the reactor as the polymerization proceeds. When polymeric components are utilized, they can be heated to a temperature high enough to melt the polymeric components. Additional catalysts can be used or the polymerization may be conducted with the catalyst residues incorporated within the polymeric component. When all of the components utilized are polymeric, the polymerization process is commonly referred to as transesterification. Such procedures are known to those skilled in the art.

The melt process conditions of the present invention, particularly the amounts of monomers used, depend on the polymer composition that is desired. The amount of the glycol component, other glycol component, aromatic dicarboxylic acid component, hydroxyalkanoic acid component, sulfonate component, and branching agent are desirably chosen so that the polymeric product contains the desired amounts of the various monomer units, desirably with equimolar amounts of monomer units derived from the respective diol and diacid components. Because of the volatility of some of the monomers, especially some of the hydroxyalkanoic acid components, the glycol components, and the other glycol component, and depending on such variables as whether the reactor is sealed, (i.e.; is under pressure), the polymerization temperature ramp rate, and the efficiency of the distillation columns used in synthesizing the polymer, it may be desirable that some of the monomers be included in excess at the beginning of the polymerization reaction and removed by distillation as the reaction proceeds. This is particularly true of the hydroxyalkanoic acid component, glycol component, and the other glycol component.

The exact amount of monomers to be charged to a particular reactor is readily determined by a skilled practitioner, but often will be in the ranges below. Excesses of the diacid, hydroxyalkanoic acid, sulfonate component, the glycol component, and the other glycol are often desirably charged, and the excess diacid, hydroxyalkanoic acid, sulfonate component, glycol and other glycol are desirably removed by distillation or other means of evaporation as the polymerization reaction proceeds. Ethylene glycol, 1,3-propanediol, 1,4-butanediol are desirably charged at a level 10 to 100 percent greater than the desired incorporation level in the final polymer. More preferably, the glycol component is charged at a level 20 to 70 percent greater than amount desired in the polymer. The other glycol component is desirably charged at a level 0 to 100 percent greater than the amount desired in the polymer, depending on the volatility of the other glycol component.

The ranges given for the monomers are very wide because of the wide variation in the monomer loss during polymerization, depending on the efficiency of distillation columns and other kinds of recovery and recycle systems, and are only an approximation. Exact amounts of monomers to be charged to a reactor to produce a polymer having a particular composition can be determined by a skilled practitioner.

In the polymerization process, the monomers are combined, and heated gradually with mixing with a catalyst or catalyst mixture to a temperature in the range of 150 C to about 300 C, desirably 180 C to 275 C. The polymerization conditions and the catalysts used are selected depending on whether the acids are polymerized as true acids, as esters, or as polymers. The catalyst can be included initially with the reactants, and/or can be added one or more times to the mixture as it is heated. The nature and/or quantity of catalyst used can be modified as the reaction proceeds. The heating and stirring are continued for a sufficient time and to a sufficient temperature, generally with removal by distillation of excess reactants, to yield a molten polymer having a high enough molecular weight to be suitable for making fabricated products.

Essentially any catalyst system known can be used. Examples of suitable catalysts include salts of Li, Ca, Mg, Mn, Zn, Pb, Sb, Sn, Ge, and Ti, such as acetate salts and oxides, including glycol adducts, and Ti alkoxides. A catalyst, or combination or sequence of catalysts, can be selected by a skilled practitioner. The preferred catalyst and preferred conditions are determined in part by, for example, whether the diacid monomer is polymerized as the free diacid, as a dimethyl ester, or as the polymer; whether the hydroxyalkanoic acid monomer is polymerized as the free acid, as the ester, as the cyclic dimer, or as the polymer, and the chemical composition of the diol components.

In some embodiments, the aromatic dicarboxylic acid and the hydroxyalkanoic acid components can be substituted with oligomers or polymers derived therefrom. For example, poly(lactide) may be conveniently substituted for lactic acid.

As a further alternative, polymers can be combined to produce the sulfonated aromatic copolyesters. While it is not intended that the present invention be limited by any particular theory, typically when two polymers are melt mixed together, they transesterify to initially form blocky copolymers with long blocks of each of the initial polymers added. The blocky copolymers can then further transesterify to form block copolymers containing shorter blocks of the constituent polymers. After sufficient time, the blocky copolymers can transesterify to form random copolymers. The melt mixing can be stopped at any time to form block sulfonated aromatic copolyesters containing long blocks of the constituent polymers used as the starting materials, block sulfonated aromatic copolyesters containing short blocks of the constituent polymers used as the starting materials, random sulfonated aromatic copolyesters containing no blocks of the constituent polymers used as the starting materials, or sulfonated aromatic copolyester having another desired composition. When polymers are utilized to produce the sulfonated aromatic copolyesters, catalysts can be added if desired.

The monomers used to make the polymer, and thus the composition of the polymer, can be chosen for specific uses and for specific sets of properties. As one skilled in the art will appreciate, the thermal properties observed are generally a complex function of the chemical identity and level of each component utilized in making the copolyester composition.

Polymers can be made by the melt condensation process above having adequate inherent viscosity for many applications. Solid state polymerization can be used to achieve even higher inherent viscosities (molecular weights).

Polymers made by melt polymerization, after extruding, cooling and pelletizing, may be essentially noncrystalline. Noncrystalline material can be made semicrystalline by heating it to a temperature above the glass transition temperature for an extended period of time. This induces crystallization so that the product can then be heated to a higher temperature to raise the molecular weight. Alternatively, the polymer can be crystallized prior to solid state polymerization by treatment with a relatively poor solvent for polyesters, which induces crystallization. Such solvents reduce the glass transition temperature ($T_g$) of the polymer, allowing for crystallization. The process, called solvent induced crystallization, is known for polyesters and is disclosed, for example, in U.S. Pat. No. 5,164,478 and U.S. Pat. No. 3,684,766.

The semicrystalline polymer can be subjected to solid-state polymerization by placing the pelletized or pulverized polymer into a stream of an inert gas, usually nitrogen, or under a vacuum of, for example, 1 Torr, at an elevated temperature, but below the melting temperature of the polymer, for an extended period of time, such as, for example, several hours, frequently about 6 to 8 hours.

The sulfonated aromatic copolyesters can contain known additives. It is preferred that the additives are nontoxic, biodegradable and biobenign. Such additives can include thermal stabilizers, for example, phenolic antioxidants, secondary thermal stabilizers, for example, thioethers and phosphites, UV absorbers, for example benzophenone- and benzotriazole-derivatives, UV stabilizers, for example, hindered amine light stabilizers, (HALS). Further examples of additives that can be used include plasticizers, processing aides, flow enhancing additives, lubricants, pigments, flame retardants, impact modifiers, nucleating agents to increase crystallinity, antiblocking agents such as silica, base buffers, such as sodium acetate, potassium acetate, and tetramethyl ammonium hydroxide, (for example; as disclosed in U.S. Pat. No. 3,779,993, U.S. Pat. No. 4,340,519, U.S. Pat. No. 5,171,308, U.S. Pat. No. 5,171,309, and U.S. Pat. No. 5,219,646 and references cited therein). Examples of plasticizers, which can be added to improve processing and/or mechanical properties, or to reduce rattle or rustle of the films, coatings and laminates formed from the polyesters, include soybean oil, epoxidized soybean oil, corn oil, caster oil, linseed oil, epoxidized linseed oil, mineral oil, alkyl phosphate esters, Tween® 20 plasticizer, Tween® 40 plasticizer, Tween® 60 plasticizer, Tween® 80 plasticizer, Tween® 85 plasticizer, sorbitan monolaurate, sorbitan monooleate, sorbitan monopalmitate, sorbitan trioleate, sorbitan monostearate, citrate esters, such as trimethyl citrate, triethyl citrate, (Citroflex® 2, produced by Morflex, Inc. Greensboro, N.C.), tributyl citrate, (Citroflex® 4, produced by Morflex, Inc., Greensboro, N.C.), trioctyl citrate, acetyl-tri-n-butyl citrate, (Citroflex® A4, produced by Morflex, Inc., Greensboro, N.C.), acetyltriethyl citrate, (Citroflex® A-2, produced by Morflex, Inc., Greensboro, N.C.), acetyl-tri-n-hexyl citrate, (Citroflex® A-6, produced by Morflex, Inc., Greensboro, N.C.), and butyryltri-n-hexyl citrate, (Citroflex® B-6, produced by Morflex, Inc., Greensboro, N.C.), tartarate esters, such as dimethyl tartarate, diethyl tartarate, dibutyl tartarate, and dioctyl tartarate, poly(ethylene glycol), derivatives of poly(ethylene glycol), paraffin, monoacyl carbohydrates, such as 6-O-sterylglucopyranoside, glyceryl monostearate, Myvaplex® 600, (concentrated glycerol monostearates), Nyvaplex®, (concentrated glycerol monostearate which is a 90% minimum distilled monoglyceride produced from hydrogenated soybean oil and which is composed primarily of stearic acid esters), Myvacet, (distilled acetylated monoglycerides of modified fats), Myvacet® 507, (48.5 to 51.5 percent acetylation), Myvacet® 707, (66.5 to 69.5 percent acetylation), Myvacet® 908, (minimum of 96 percent acetylation), Myverol®, (concentrated glyceryl monostearates), Acrawax®, N,N-ethylene bis-stearamide, N,N-ethylene bis-oleamide, dioctyl adipate, diisobutyl adipate, diethylene glycol dibenzoate, dipropylene glycol dibenzoate, polymeric plasticizers, such as poly(1,6-hexamethylene adipate), poly(ethylene adipate), Rucoflex®, and other compatible low molecular weight polymers and mixtures thereof. Preferably, the plasticizers are nontoxic and biodegradable and/or bioderived.

If desired for some applications, the copolyesters can be filled with inorganic, organic and clay fillers. Exemplary fillers include wood flour, gypsum, talc, mica, carbon black, wollastonite, montmorillonite minerals, chalk, diatomaceous earth, sand, gravel, crushed rock, bauxite, limestone, sandstone, aerogels, xerogels, microspheres, porous ceramic spheres, gypsum dihydrate, calcium aluminate, magnesium carbonate, ceramic materials, pozzolamic materials, zirconium compounds, xonotlite (a crystalline calcium silicate gel), perlite, vermiculite, hydrated or unhydrated hydraulic cement particles, pumice, perlite, zeolites, kaolin, clay fillers, including both natural and synthetic clays and treated and untreated clays, such as organoclays and clays which have been surface treated with silanes and stearic acid to enhance adhesion with the copolyester matrix, smectite clays, magnesium aluminum silicate, bentonite clays, hectorite clays, silicon oxide, calcium terephthalate, aluminum oxide, titanium dioxide, iron oxides, calcium phosphate, barium sulfate, sodium carbonate, magnesium sulfate, aluminum sulfate, magnesium carbonate, barium carbonate, calcium oxide, magnesium oxide, aluminum hydroxide, calcium sulfate, barium sulfate, lithium fluoride, polymer particles, powdered metals, pulp powder, cellulose, starch, chemically modified starch, thermoplastic starch, lignin powder, wheat, chitin, chitosan, keratin, gluten, nut shell flour, wood flour, corn cob flour, calcium carbonate, calcium hydroxide, glass beads, hollow glass beads, seagel, cork, seeds, gelatins, wood flour, saw dust, agar-based materials, reinforcing agents, such as glass fiber, natural fibers, such as sisal, hemp, cofton, wool, wood, flax, abaca, sisal, ramie, bagasse, and cellulose fibers, carbon fibers, graphite fibers, silica fibers, ceramic fibers, metal fibers, stainless steel fibers, and recycled paper fibers, for example, from repulping operations. Fillers may tend to increase the Young's modulus, improve the dead-fold properties, improve the rigidity of the film, coating or laminate, decrease the cost, and/or reduce the tendency of a film, coating, or laminate to block or self-adhere during processing or use. The use of fillers has also been found to produce plastic articles that have many of the qualities of paper, such as texture and feel, as disclosed by, for example, Miyazaki, et al., in U.S. Pat. No. 4,578,296. The additives, fillers or blend materials can be added before the polymerization process, at any stage during the polymerization process or as a post polymerization process. Essentially any known filler can be used.

Clay fillers that can be used include both natural and synthetic clays, and untreated and treated clays, such as organoclays and clays that have been surface treated with silanes or stearic acid to enhance the adhesion of the claim with the copolyester matrix. Specific usable clay materials include, for example, kaolin, smectite clays, magnesium aluminum silicate, bentonite clays, montmorillonite clays, hectorite clays, and mixtures thereof. The clays may be treated with organic materials, such as surfactants, to make them organophilic. Examples of commercially available clay fillers include Gelwhite MAS 100, a commercial product of the Southern Clay Company, which is defined as a Claytone 2000, a commercial product of the Southern Clay Company, which is defined as a an organophilic smectite clay; Gelwhite L, a commercial product of the Southern Clay Company, which is defined as a montmorillonite clay from a white bentonite clay; Cloisite 30 B, a commercial product of the Southern Clay Company, which is defined as an organophilic natural montmorillonite clay with bis(2-hydroxyethyl)methyl tallow quarternary ammonium chloride salt; Cloisite Na, a commercial product of the Southern Clay Company, which is defined as a natural montmorillonite clay; Garamite 1958, a commercial product of the Southern Clay Company, which is defined as a mixture of minerals; Laponite RDS, a commercial product of the Southern Clay Company, which is defined as a synthetic layered silicate with an inorganic polyphosphate peptiser; Laponite RD, a commercial product of the Southern Clay Company, which is defined as a synthetic colloidal clay; Nanomers, which are commercial products of the Nanocor Company, which are defined as montmorillonite minerals which have been treated with compatibilizing agents; Nanomer 1.24TL, a commercial product of the Nanocor Company, which is defined as a montmorillonite mineral surface treated with amino acids; "P Series" Nanomers, which are commercial products of the Nanocor Company, which are defined as surface modified montmorillonite minerals; Polymer Grade (PG) Montmorillonite PGW, a commercial product of the Nanocor Company, which is defined as a high purity aluminosilicate mineral, sometimes referred to as a phyllosilicate; Polymer Grade (PG) Montmorillonite PGA, a commercial product of the Nanocor Company, which is defined as a high purity aluminosilicate mineral, sometimes referred to as a phyllosilicate; Polymer Grade (PG) Montmorillonite PGV, a commercial product of the Nanocor Company, which is defined as a high purity aluminosilicate mineral, sometimes referred to as a phyllosilicate; Polymer Grade (PG) Montmorillonite PGN, a commercial product of the Nanocor Company, which is defined as a high purity aluminosilicate mineral, sometimes referred to as a phyllosilicate; and mixtures thereof.

Some clay fillers can exfoliate during the polyester production process to provide nanocomposites. This is especially true for the layered silicate clays, such as smectite clays, magnesium aluminum silicate, bentonite clays, montmorillonite clays, hectorite clays. As discussed above, such clays may be natural or synthetic, treated or not. The clay particle size in the filled copolyester can vary within a wide range.

The particle size of the filler may be within a wide range in the present invention. As one skilled within the art would appreciate, the filler particle size can be tailored based on the desired use of the filled copolyester composition. It is generally preferable that the average diameter of the filler be less than about 40 microns. It is more preferable that the average diameter of the filler be less than about 20 microns. The filler can include particle sizes up to 40 mesh (US Standard) or larger. Mixtures of filler particle sizes can also be advantageously utilized. For example, mixtures of calcium carbonate fillers with average particle sizes of about 5 microns and average particle sizes of about 0.7 microns may provide better space filling of the filler within the copolyester matrix. Use of two or more filler particle sizes allows for improved particle packing, in which the spaces between a group of large particles are substantially occupied by a selected group of smaller filler particles. In general, the particle packing is increased whenever any given set of particles is mixed with another set of particles having a nominal particle size that is at least about 2 times larger or smaller than the first group of particles. The particle packing density for a two-particle system is maximized whenever the size ratio of a given set of particles is from about 3 to 10 times the size of another set of particles. Similarly, three or more different sets of particles can be used to further increase the particle packing density. The degree of packing density that will be optimal depends on a number of factors, for example, the types and concentrations of the various components within both the thermoplastic phase and the solid filler phase, the film, coating or lamination process used, and the desired mechanical, thermal and other performance properties of the products to be manufactured. Andersen, et al., in U.S. Pat. No. 5,527,387, disclose particle-packing techniques. Filler concentrates that contain a mixture of filler are commercially available from the Shulman Company under the tradename Papermatch®.

The filler can be added to the polymer of the present invention at any stage during the polymerization of the polymer or after the polymerization is completed. For example, the fillers can be added with the copolyester monomers at the start of the polymerization process. This is preferable for, for example, the silica and titanium dioxide fillers, to provide adequate dispersion of the fillers within the polyester matrix. Alternatively, the filler can be added at an intermediate stage of the polymerization, for example, as the precondensate passes into the polymerization vessel. As yet a further alternative, the filler can be added after the copolyester exits the polymerizer. For example, the sulfonated aromatic copolyester may be melt fed to any intensive mixing operation, such as a static mixer or a single- or twin-screw extruder, and compounded with the filler.

As a further alternative, the sulfonated aromatic copolyester can be combined with the filler in a post polymerization process. Typically, such a process involves intensive mixing of the molten copolyester with the filler. The intensive mixing is carried out using standard equipment such as static mixers, Brabender mixers, single screw extruders, and twin screw extruders. In a typical process, the copolyester is dried, then mixed with the filler. Alternatively, the copolyester and the filler can be cofed into the equipment through two separate feeders. In an extrusion process, the copolyester and the filler are typically fed into the back, feed section of the extruder. The copolyester and the filler are advantageously fed into two different locations of the extruder. For example, the copolyester can be added in the back, feed section of the extruder while the filler is fed ("side-stuffed") in the front of the extruder near the die plate. The extruder temperature profile is set up to allow the copolyester to melt under the processing conditions. The screw design will also provide stress and, in turn, heat, to the resin as it mixes the molten sulfonated aromatic copolyester with the filler. Such processes to melt mix in fillers is disclosed, for example, by Dohrer, et al., in U.S. Pat. No. 6,359,050. Alternatively, the filler may be blended with the sulfonated aromatic copolyester materials which incorporate hydroxyalkanoic acid residues during the formation of the films and coatings, as described below.

The sulfonated aromatic copolyesters containing hydroxyalkanoic acid residues may be blended with other polymeric materials. The materials may be biodegradable or not biodegradable. The materials may be naturally derived, modified naturally derived or synthetic.

Examples of blendable biodegradable materials include poly(hydroxy alkanoates), polycarbonates, poly(caprolactone), aliphatic polyesters, aliphatic-aromatic copolyesters, aliphatic-aromatic copolyetheresters, aliphatic-aromatic copolyamideesters, sulfonated aliphatic-aromatic copolyesters, sulfonated aliphatic-aromatic copolyetheresters, sulfonated aliphatic-aromatic copolyamideesters, copolymers thereof, and mixtures thereof.

Specific examples of the blendable biodegradable materials include the Biomax® sulfonated aliphatic-aromatic copolyesters of the DuPont Company, the Eastar Bio® aliphatic-aromatic copolyesters of the Eastman Chemical Company, the Ecoflex® aliphatic-aromatic copolyesters of the BASF Corporation, poly(1,4-butylene terephthalate-co-adipate, (50:50, molar), the EnPol® polyesters of the Ire Chemical Company, poly(1,4-butylene succinate), the Bionolle® polyesters of the Showa High Polymer Company, poly(ethylene succinate), poly(1,4-butylene adipate-co-succinate), poly(1,4-butylene adipate), poly(amide esters), the Bak® poly(amide esters) of the Bayer Company, poly(ethylene carbonate), poly(hydroxybutyrate), poly(hydroxyvalerate), poly(hydroxybutyrate-co-hydroxyvalerate), the Biopol® poly(hydroxy alkanoates) of the Monsanto Company, poly(lactide-co-glycolide-co-caprolactone), the Tone® poly(caprolactone) of the Union Carbide Company, the EcoPLA® poly(lactide) of the Cargill Dow Company and copolymers and mixtures thereof. Essentially any biodegradable material may be blended with the sulfonated aromatic copolyesters.

Examples of blendable nonbiodegradable polymeric materials include polyethylene, high density polyethylene, low density polyethylene, linear low density polyethylene, ultralow density polyethylene, polyolefins, poly(ethylene-co-glycidylmethacrylate), poly(ethylene-co-methyl (meth)acrylate-co-glycidyl acrylate), poly(ethylene-co-n-butyl acrylate-co-glycidyl acrylate), poly(ethylene-co-methyl acrylate), poly(ethylene-co-ethyl acrylate), poly(ethylene-co-butyl acrylate), poly(ethylene-co-(meth)acrylic acid), metal salts of poly(ethylene-co-(meth)acrylic acid), poly((meth)acrylates), such as poly(methyl methacrylate), poly(ethyl methacrylate), poly(ethylene-co-carbon monoxide), poly(vinyl acetate), poly(ethylene-co-vinyl acetate), poly(vinyl alcohol), poly(ethylene-co-vinyl alcohol), polypropylene, polybutylene, polyesters, poly(ethylene terephthalate), poly(1,3-propylene terephthalate), poly(1,4-butylene terephthalate), PETG, poly(ethylene-co-1,4-cyclohexanedimethanol terephthalate), poly(vinyl chloride), PVDC, poly(vinylidene chloride), polystyrene, syndiotactic polystyrene, poly(4-hydroxystyrene), novalacs, poly(cresols), polyamides, nylon, nylon 6, nylon 46, nylon 66, nylon 612, polycarbonates, poly(bisphenol A carbonate), polysulfides, poly(phenylene sulfide), polyethers, poly(2,6-dimethylphenylene oxide), polysulfones, and copolymers thereof and mixtures thereof.

Examples of blendable natural polymeric materials include starch, starch derivatives, modified starch, thermoplastic starch, cationic starch, anionic starch, starch esters, such as starch acetate, starch hydroxyethyl ether, alkyl starches, dextrins, amine starches, phosphate starches, dialdehyde starches, cellulose, cellulose derivatives, modified cellulose, cellulose esters, such as cellulose acetate, cellulose diacetate, cellulose priopionate, cellulose butyrate, cellulose valerate, cellulose triacetate, cellulose tripropionate, cellulose tributyrate, and cellulose mixed esters, such as cellulose acetate propionate and cellulose acetate butyrate, cellulose ethers, such as methylhydroxyethylcellulose, hydroxymethylethylcellulose, carboxymethylcellulose, methyl cellulose, ethylcellulose, hydroxyethycellulose, and hydroxyethylpropylcellulose, polysaccharides, alginic acid, alginates, phycocolloids, agar, gum arabic, guar gum, acaia gum, carrageenan gum, furcellaran gum, ghatti gum, psyllium gum, quince gum, tamarind gum, locust bean gum, gum karaya, xantahn gum, gum tragacanth, proteins, Zein®, (a prolamine derived from corn), collagen, (extracted from animal connective tissue and bones), and derivatives thereof such as gelatin and glue, casein, (the principle protein in cow milk), sunflower protein, egg protein, soybean protein, vegetable gelatins, gluten, and mixtures thereof. Thermoplastic starch can be produced, for example, as disclosed in U.S. Pat. No. 5,362,777. They disclose the mixing and heating of native or modified starch with high boiling plasticizers, such as glycerin or sorbitol, in such a way that the starch has little or no crystallinity, a low glass transition temperature, and a low water content. Essentially any polymeric material known may be blended with the sulfonated aromatic copolyesters containing hydroxyalkanoic acid residues.

The polymeric material to be blended with the polymer of the present invention can be added to the polymer of the present invention at any stage during the polymerization of the polymer or after the polymerization is completed. For example, the polymeric materials can be added with the copolyester monomers at the start of the polymerization process. Alternatively, the polymeric material can be added at an intermediate stage of the polymerization, for example, as the precondensate passes into the polymerization vessel. As yet a further alternative, the polymeric material can be added after the copolyester exits the polymerizer. For example, the copolyester and the polymeric material may be melt fed to any intensive mixing operation, such as a static mixer or a single- or twin-screw extruder and compounded with the polymeric material.

As yet a further method to produce the blends of the sulfonated aromatic copolyesters containing hydroxyalkanoic acid residues and the polymeric material, the copolyester can be combined with the polymeric material in a subsequent post polymerization process. Typically, such a process would involve intensive mixing of the molten copolyester with the polymeric material. The intensive mixing may be provided through static mixers, Brabender mixers, single screw extruders, twin screw extruders. In a typical process, the copolyester would be dried. The polymeric material can also be dried. The dried copolyester can then be mixed with the polymeric material. Alternatively, the copolyester and the polymeric material may be cofed through two different feeders. In an extrusion process, the copolyester and the polymeric material would typically be fed into the back, feed section of the extruder. The copolyester and the polymeric material may be advantageously fed into two different locations of the extruder. For example, the copolyester can be added in the back, feed section of the extruder while the polymeric material is fed, ("side-stuffed"), in the front of the extruder near the die plate. The extruder temperature profile is set up to allow the copolyester to melt under the processing conditions. The screw design will also provide stress and, in turn, heat, to the resin as it mixes the molten copolyester with the polymeric material. Alternatively, the polymeric material may be blended with the sulfonated aromatic copolyester materials which incorporate hydroxyalkanoic acid residues during the formation of the films and coatings, as described below.

As a further aspect of the present invention, the sulfonated aromatic copolyesters containing hydroxyalkanoic acid residues have been found to be useful within a wide variety of shaped articles. The copolyesters consist essentially of 98.9 to 1.0 mole percent of an aromatic dicarboxylic acid component, 1.0 to 99.0 mole percent of a hydroxyalkanoic acid component, 99.0 to 1.0 mole percent of a single glycol selected from ethylene glycol, 1,3-propanediol, and 1,4-butanediol, 0.1 to 10.0 mole percent of a sulfonate component, 0 to 5.0 mole percent of an other glycol component, 0 to 5.0 mole percent of a polyfunctional branching agent, and optionally an effective amount of a color reducing agent. The shaped articles produced from the sulfonated aromatic copolyesters containing hydroxyalkanoic acid residues have greater thermal properties in comparison to shaped articles produced from known sulfonated copolyesters. Shaped articles include film, sheets, fiber, melt blown containers, molded parts, such as cutlery, foamed parts, coatings, polymeric melt extrusion coatings onto substrates, polymeric solution coatings onto substrates, laminates. The sulfonated aromatic copolyesters containing hydroxyalkanoic acid residues can be used in the form of essentially all shaped articles known. The sulfonated aromatic copolyesters containing hydroxyalkanoic acid residues can be used in essentially any process known to form shaped articles.

A preferred aspect of the present invention relates to film comprising the sulfonated aromatic copolyesters containing hydroxyalkanoic acid residues and production processes thereof and articles derived therefrom. Polymeric films have a variety of uses, such as in packaging, especially of foodstuffs, adhesives tapes, insulators, capacitors, photographic development, x-ray development and as laminates, for example. For many of these uses, the heat resistance of the film is an important factor. Therefore, a higher melting point, glass transition temperature, and crystallinity level are desirable to provide better heat resistance and more stable electrical characteristics, along with a rapid biodegradation rate. Further, it is desired that these films have good barrier properties, for example; moisture barrier, oxygen barrier, and carbon dioxide barrier, good grease resistance, good tensile strength and a high elongation at break.

The sulfonated aromatic copolyesters containing hydroxyalkanoic acid residues may be formed into a film for use in any one of the many different applications, such as food packaging, labels, dielectric insulation, a water vapor barrier or the like. While not limiting, the monomer composition of the copolyester polymer is preferably chosen to result in a partially crystalline polymer desirable for the formation of film, wherein the crystallinity provides strength and elasticity. As first produced, the polyester is generally semi-crystalline in structure. The crystallinity increases on reheating and/or stretching of the polymer, as occurs in the production of film.

In the process of the invention, film is made from the polymer by any process known. For example, thin films may be formed through dipcoating as disclosed in U.S. Pat. No. 4,372,311, through compression molding as disclosed in U.S. Pat. No. 4,427,614, through melt extrusion as disclosed in U.S. Pat. No. 4,880,592, through melt blowing as disclosed in U.S. Pat. No. 5,525,281, or other art processes. The difference between a film and a sheet is the thickness, but there is no set industry standard as to when a film becomes a sheet. For purposes of this invention, a film is less than or equal to 0.25 mm (10 mils) thick, preferably between about 0.025 mm and 0.15 mm (1 mil and 6 mils). However, thicker films can be formed up to a thickness of about 0.50 mm (20 mils).

The film is preferably formed by either solution casting or extrusion. Extrusion is particularly preferred for formation of "endless" products, such as films and sheets, which emerge as a continuous length. In extrusion, the polymeric material, whether provided as a molten polymer or as plastic pellets or granules, is fluidized and homogenized. Additives, as described above, such as thermal or UV stabilizers, plasticizers, fillers and/or blendable polymeric materials, can be added, if desired. This mixture is then forced through a suitably shaped die to produce the desired cross-sectional film shape. The extruding force may be exerted by a piston or ram (ram extrusion), or by a rotating screw (screw extrusion), which operates within a cylinder in which the material is heated and plasticized and from which it is then extruded through the die in a continuous flow. Single screw, twin screw, and multi-screw extruders can be used as known. Different kinds of die are used to produce different products, such as blown film (formed by a blow head for blown extrusions), sheets and strips (slot dies) and hollow and solid sections (circular dies). In this manner, films of different widths and thickness can be produced. After extrusion, the polymeric film is taken up on rollers, cooled and taken off by suitable devices designed to prevent any subsequent deformation of the film.

Using extruders as known, film can be produced by extruding a thin layer of polymer over chilled rolls and then further drawing down the film to size by tension rolls. In the extrusion casting process, the polymer melt is conveyed from the extruder through a slot die, (T-shaped or "coat hanger" die). The die may be as wide as 10 feet and typically have thick wall sections on the final lands to minimize deflection of the lips from internal pressure. Die openings may be within a wide range, but 0.015 inch to 0.030 inch is typical. The nascent cast film may be drawn down, and thinned significantly, depending on the speed of the rolls taking up the film. The film is then solidified by cooling below the crystalline melting point or glass transition temperature. This may be accomplished by passing the film through a water bath or over two or more chrome-plated chill rolls which have been cored for water cooling. The cast film is then conveyed though nip rolls, a slitter to trim the edges, and then wound up. In cast film, conditions may be tailored to allow a relatively high degree of orientation in the machine direction, which is the direction of travel of the film, especially at high draw down conditions and wind up speeds, and a much lower level of orientation in the transverse direction. Alternatively, the conditions may be tailored to minimize the level of orientation, thus providing films with essentially equivalent physical properties in both the machine direction and the transverse direction. Preferably, the finished film is less than or equal to 0.25 mm thick.

Blown film, which is generally stronger, tougher, and made more rapidly than cast film, is made by extruding a tube. In producing blown film, the melt flow of molten polymer is typically turned upward from the extruder and fed through an annular die. In so doing, the melt flows around a mandrel and emerges through the ring-shaped opening in the form of a tube. As this tube leaves the die, internal pressure is introduced through the die mandrel with air, which expands the tube from about 1.5 to about 2.5 times the die diameter and simultaneously draws the film, causing a reduction in thickness. The air contained in the bubble cannot escape because it is sealed by the die on one end and by nip (or pinch) rolls on the other. Desirably, an even air pressure is maintained to ensure uniform thickness of the film bubble. The tubular film may be cooled internally and/or externally by directing air onto the film. Faster quenching in the blown film method may be accomplished by passing the expanded film about a cooled mandrel which is situated within the bubble. For example, one such method using a cooled mandrel is disclosed by Bunga, et al., in Canadian Patent 893,216. If the polymer which is being used to prepare blown film is semicrystalline, the bubble may become cloudy as it cools below the softening point of the polymer. Drawdown of the extrudate is not essential, but preferably the drawdown ratio is between 2 and 40. The draw down ratio is defined as the ratio of the die gap to the product of the thickness of the cooled film and the blow-up ratio. Draw down may be induced by tension from pinch rolls. Blow-up ratio is the ratio of the diameter of the cooled film bubble to the diameter of the circular die. The blow up ratio may be as great as 4 to 5, but 2.5 is more typical. The draw down induces molecular orientation within the film in the machine direction, (i.e.; direction of the extrudate flow), and the blow-up ratio induces molecular orientation in the film in the transverse or hoop direction. The quenched bubble moves upward through guiding devices into a set of pinch rolls which flatten it. The resulting sleeve may subsequently be slit along one side, making a larger film width than could be conveniently made via the cast film method. The slit film may be further gusseted and surface-treated in line. In addition, the blown film can be produced by more elaborate techniques, such as the double bubble, tape bubble, or trapped bubble processes. The double-bubble process is a technique in which the polymeric tube is first quenched and then reheated and oriented by inflating the polymeric tube above the glass transition temperature, (Tg), but below the crystalline melting temperature, (Tm), of the polyester, (if the polyester is crystalline). The double bubble technique has been disclosed in the common art, for example, by Pahkle in U.S. Pat. No. 3,456,044.

The conditions used to produce blown film will be a complex combination of many factors, such as the exact chemical composition of the polymer, the amount and type of additives, such as plasticizers, which are used, the thermal properties of the polymeric composition. However, the blown film process offers many advantages, such as the relative ease of changing the film width and caliber simply by changing the volume of air in the bubble and the speed of the screw, the elimination of end effects, and the capability of providing biaxial orientation in the as produced film. Typical film thicknesses from a blown film operation may be in the range of about 0.004 to 0.008 inch and the flat film width may range up to 24 feet or larger after slitting.

For manufacturing large quantities of film, a sheeting calender is useful. The rough film is fed into the gap of the calender, a machine comprising a number of heatable parallel cylindrical rollers which rotate in opposite directions and spread out the polymer and stretch it to the required thickness. The last roller smoothes the film thus produced. If the film is required to have a textured surface, the final roller is provided with an appropriate embossing pattern. Alternatively, the film may be reheated and then passed through an embossing calender. The calender is followed by one or more cooling drums. Finally, the finished film is reeled up.

Extruded films can also be used as the starting material for other products. For example, the film may be cut into small segments for use as feed material for other processing methods, such as injection molding. As a further example, the film may be laminated onto a substrate as described below. As yet a further example, the films may be metalized, as is known to those skilled in the art. The film tubes available from blown film operations may be converted to bags through, for example, heat-sealing processes.

The extrusion process can be combined with a variety of post-extruding operations for expanded versatility. Such post-forming operations include altering round to oval shapes, blowing the film to different dimensions, machining and punching, biaxial stretching, as known to those skilled in the art.

A film can also be made by solution casting, which produces more consistently uniform gauge film than that made by melt extrusion. Solution casting comprises dissolving polymeric granules, powder or the like in a suitable solvent with any desired formulant, such as a plasticizer or colorant. The solution is filtered to remove dirt or large particles and cast from a slot die onto a moving belt, preferably of stainless steel, dried, whereon the film cools. The extrudate thickness is typically five to ten times that of the finished film. The film can then be finished in a like manner to the extruded film. One of ordinary skill in the art can determine appropriate process parameters based on the polymeric composition and process used for film formation. The solution cast film can then be treated to the same post treatments as described for the extrusion cast film.

Multilayer films can also be produced, having, for example, bilayer, trilayer, and multilayer film structures. One advantage to multilayer films is that specific properties can be tailored into the film to solve critical use needs. The more costly ingredients can thus be relegated to the outer layers to directly provide the desired properties for the critical needs. The multilayer film structures may be formed through coextrusion, blown film, dipcoating, solution coating, blade, puddle, air-knife, printing, Dahlgren, gravure, powder coating, spraying, or other art processes. Generally, the multilayer films are produced by extrusion casting processes. For example, the resin materials are heated in a uniform manner. The molten materials are conveyed to a coextrusion adapter that combines the molten materials to form a multilayer coextuded structure. The layered polymeric material is transferred through an extrusion die opened to a predetermined gap, commonly in the range of between about 0.05 inch (0.13 cm) and 0.012 inch (0.03 cm). The material is then drawn down to the intended gauge thickness by a primary chill or casting roll maintained at typically in the range of about 15 to 55° C., (60-130° F.). Typical draw down ratios are within the range of about 5:1 to about 40:1. The additional layers can serve as barrier layers, adhesive layers, antiblocking layers, or for other purposes. Further, for example, the inner layers can be filled and the outer layers may be unfilled, as disclosed in U.S. Pat. No. 4,842,741 and U.S. Pat. No. 6,309,736. Production processes are well known, for example, as disclosed in U.S. Pat. No. 3,748,962, U.S. Pat. No. 4,522,203, U.S. Pat. No. 4,734,324, U.S. Pat. No. 5,261,899 and U.S. Pat. No. 6,309,736. El-Afandi, et al., in U.S. Pat. No. 5,849,374, U.S. Pat. No. 5,849,401, and U.S. Pat. No. 6,312,823, disclose compostable multilayer films having a core poly(lactide) layer with inner and outer layers of blocking reducing layers composed of, for example, aliphatic polyesters.

The additional layers can contain the sulfonated copolyesters containing hydroxyalkanoic acid residues, or other materials, which can be biodegradable or not biodegradable, and also can be naturally derived, modified naturally derived or synthetic.

Examples of biodegradable materials suitable as additional layers include poly(hydroxy alkanoates), polycarbonates, poly(caprolactone), aliphatic polyesters, aliphatic-aromatic copolyesters, aliphatic-aromatic copolyetheresters, aliphatic-aromatic copolyamideesters, sulfonated aliphatic-aromatic copolyesters, sulfonated aliphatic-aromatic copolyetheresters, sulfonated aliphatic-aromatic copolyamideesters, copolymers thereof, and mixtures thereof.

Specific examples of biodegradable materials suitable as additional layers include the Biomax® sulfonated aliphatic-aromatic copolyesters of the DuPont Company, the Eastar Bio® aliphatic-aromatic copolyesters of the Eastman Chemical Company, the Ecoflex® aliphatic-aromatic copolyesters of the BASF Corporation, poly(1,4-butylene terephthalate-co-adipate, (50:50, molar), the EnPol® polyesters of the Ire Chemical Company, poly(1,4-butylene succinate), the Bionolle® polyesters of the Showa High Polymer Company, poly(ethylene succinate), poly(1,4-butylene adipate-co-succinate), poly(1,4-butylene adipate), poly(amide esters), the Bak® poly(amide esters) of the Bayer Company, poly(ethylene carbonate), poly(hydroxybutyrate), poly(hydroxyvalerate), poly(hydroxybutyrate-co-hydroxyvalerate), the Biopol® poly(hydroxy alkanoates) of the Monsanto Company, poly(lactide-co-glycolide-co-caprolactone), the Tone® poly(caprolactone) of the Union Carbide Company, the EcoPLA® poly(lactide) of the Cargill Dow Company and copolymers and mixtures thereof. Essentially any biodegradable polymeric material can be used as an additional layer with the sulfonated aromatic copolyesters.

Examples of nonbiodegradable polymeric materials suitable as additional layers include polyethylene, high density polyethylene, low density polyethylene, linear low density polyethylene, ultralow density polyethylene, polyolefins, poly(ethylene-co-glycidylmethacrylate), poly(ethylene-co-methyl(meth)acrylate-co-glycidyl acrylate), poly(ethylene-co-n-butyl acrylate-co-glycidyl acrylate), poly(ethylene-co-methyl acrylate), poly(ethylene-co-ethyl acrylate), poly (ethylene-co-butyl acrylate), poly(ethylene-co-(meth) acrylic acid), metal salts of poly(ethylene-co-(meth)acrylic acid), poly((meth)acrylates), such as poly(methyl methacrylate), poly(ethyl methacrylate), poly(ethylene-co-carbon monoxide), poly(vinyl acetate), poly(ethylene-co-vinyl acetate), poly(vinyl alcohol), poly(ethylene-co-vinyl alcohol), polypropylene, polybutylene, poly(cyclic olefins), polyesters, poly(ethylene terephthalate), poly(1,3-propylene terephthalate), poly(1,4-butylene terephthalate), PETG, poly (ethylene-co-1,4-cyclohexanedimethanol terephthalate), poly(vinyl chloride), PVDC, poly(vinylidene chloride), polystyrene, syndiotactic polystyrene, poly(4-hydroxystyrene), novalacs, poly(cresols), polyamides, nylon, nylon 6, nylon 46, nylon 66, nylon 612, polycarbonates, poly(bisphenol A carbonate), polysulfides, poly(phenylene sulfide), polyethers, poly(2,6-dimethylphenylene oxide), polysulfones, and copolymers thereof and mixtures thereof.

Examples of natural polymeric materials suitable as additional layers are disclosed hereinabove for use in making blends. Essentially any material known can be used as an additional layer.

Regardless of how the film is formed, biaxial orientation can be induced in the film by stretching in both the machine and transverse direction after formation. The machine direction stretch is initiated in forming the film simply by rolling out and taking up the film. This stretches the film in the direction of takeup, orienting some of the fibers. Although this strengthens the film in the machine direction, it allows the film to tear easily in the direction at right angles because all of the fibers are oriented in one direction. The biaxially oriented film can further be subjected to additional drawing of the film in the machine direction, in a process known as tensilizing.

Biaxial stretching of the film provides superior tensile strength, flexibility, toughness and shrinkability, for example, in comparison to non-oriented films. It is desirable to stretch the film along two axes at right angles to each other. This increases tensile strength and elastic modulus in the directions of stretch. It is most desirable for the amount of stretch in each direction to be roughly equivalent, thereby providing similar properties or behavior within the film when tested from any direction. However, certain applications, such as those desiring a certain amount of shrinkage or greater strength in one direction over another, as in labels or adhesive and magnetic tapes, will require uneven, or uniaxial, orientation of the fibers of the film.

Biaxial orientation can be introduced into the film using any known method. However, tentering is preferred, wherein the material is stretched while heating in the transverse direction simultaneously with, or subsequent to, stretching in the machine direction. The orientation can be performed on available commercial equipment. For example, suitable equipment is available from Bruckner Maschenenbau of West Germany. One form of such equipment operates by clamping on the edges of the sheet to be drawn and, at the appropriate temperature, separating the edges of the sheet at a controlled rate. For example, a film may be fed into a temperature-controlled box, heated above its glass transition temperature and grasped on either side by tenterhooks which simultaneously exert a drawing tension (longitudinal stretching) and a widening tension (lateral stretching). Typically, stretch ratios of 3:1 to 4:1 are useful. Alternatively, and preferably for some commercial uses, the biaxial drawing process is conducted continuously at high production rates in multistage roll drawing equipment, as available from Bruckner, wherein the drawing of the extruded film stock takes place in a series of steps between heated rolls rotating at different and increasing rates. When the appropriate combinations of draw temperatures and draw rates are employed, the monoaxial stretching is preferably from about 4 to about 20, more preferably from about 4 to about 10. Draw ratio is defined as the ratio of a dimension of a stretched film to a non-stretched film.

Uniaxial orientation can be obtained through stretching the film in only one direction in the above-described biaxial processes or by directing the film through a machine direction orienter ("MDO"), commercially available from vendors such as the Marshall and Williams Company of Providence, R.I. The MDO apparatus has a plurality of stretching rollers that progressively stretch and thin the film in the machine direction of the film.

Preferably, the stretching process takes place at a temperature of at least 10° C. above the glass transition temperature of the film material and preferably below the Vicat softening temperature of the film material, especially at least 10° C. below the Vicat softening point, depending on some degree to the rate of stretching.

Orientation may be enhanced within blown film operations by adjusting the blow-up ratio, (BUR), which is defined as the ratio of the diameter of the film bubble to the die diameter. For example, it is generally preferred to have a BUR of 1 to 5 for the production of bags or wraps. However, this may be modified based on the desired balance of properties desired in the machine direction and the transverse direction. For a balanced film, a BUR of about 3:1 is generally appropriate. If it is desired to have a "splitty" film which easily tears in one direction, then a BUR of 1:1 to about 1.5:1 is generally preferred.

Shrinkage can be controlled by holding the film in a stretched position and heating for a few seconds before quenching. This is typically referred to as "heat setting". This heat stabilizes the oriented film, which then may be forced to shrink only at temperatures above the heat stabilization temperature. Further, the film can also be subjected to rolling, calendering, coating, embossing, printing, or any other typical finishing operations known.

Process conditions and parameters for making films using known methods can be determined by a skilled artisan for any given polymeric composition and desired application. The properties exhibited by a film depend on several factors indicated above, including the polymeric composition, the method of forming the polymer, the method of forming the film, and whether the film was treated for stretch or biaxially oriented. These factors affect many properties of the film, such as shrinkage, tensile strength, elongation at break, impact strength, dielectric strength and constant, tensile modulus, chemical resistance, melting point, heat deflection temperature.

The film properties may be further adjusted by adding certain additives and fillers to the polymeric composition, such as colorants, dyes, UV and thermal stabilizers, antioxidants, plasticizers, lubricants antiblock agents, slip agents, as recited above. Alternatively, the sulfonated aromatic copolyesters containing hydroxyalkanoic acid residues can be blended with one or more other polymeric materials to improve certain characteristics, as described above.

As disclosed by Moss, in U.S. Pat. No. 4,698,372, Haffner, et al., in U.S. Pat. No. 6,045,900, and McCormack, in WO 95/16562, the films, especially the filled films, may be formed microporous, if desired. Further disclosures on this subject include U.S. Pat. No. 4,626,252, U.S. Pat. No. 5,073,316, and U.S. Pat. No. 6,359,050. As is known to those skilled in the art, the stretching of a filled film can create fine pores. This allows the film to serve as a barrier to liquids and particulate matter, yet allow air and water vapor to pass through.

To enhance the printability (ink receptivity) of the surface of a film, adhesion or other desirable characteristics, the film can be treated by known, conventional post forming operations, such as corona discharge, chemical treatments, and flame treatment.

The films made from the sulfonated aromatic copolyesters containing hydroxyalkanoic acid residues can be used in a wide variety of applications. For example, the films can be used as components of personal sanitary items, such as disposable diapers, incontinence briefs, feminine pads, sanitary napkins, tampons, tampon applicators, motion sickness bags, baby pants, and personal absorbent products. The films combine excellent water barrier properties, to avoid leak through, with excellent toughness to easily conform to the body and to stretch with the body movements during use. After their use, the soiled articles will biocompost when discarded appropriately.

As further examples, the films can be used as protective films for agriculture, such as mulch films, seed coverings, agriculture mats containing seeds, ("seed tapes"), garbage and lawn waste bags. Still further examples of the use of the films include: adhesive tape substrates, bags, bag closures, bed sheets, bottles, cartons, dust bags, fabric softener sheets, garment bags, industrial bags, trash bags, waste bin liners, compost bags, labels, tags, pillow cases, bed liners, bedpan liners, bandages, boxes, handkerchiefs, pouches, wipes, protective clothing, surgical gowns, surgical sheets, surgical sponges, temporary enclosures, temporary siding, toys, and wipes.

A particularly preferred use of the films comprising the sulfonated aromatic copolyesters containing hydroxyalkanoic acid residues include food packaging, especially for fast food packaging. Specific examples of food packaging uses include fast food wrappers, stretch wrap films, hermetic seals, food bags, snack bags, grocery bags, cups, trays, cartons, boxes, bottles, crates, food packaging films, blister pack wrappers, skin packaging.

A specifically preferred end use for the films is in making wraps. Wraps can be used to enclose meats, other perishable items, and especially fast food items, such as sandwiches, burgers, and dessert items. Desirably, the films used as wraps combine a balance of physical properties, including: paper-like stiffness combined with sufficient toughness so as not to tear when used to wrap, for example, a sandwich; deadfold characteristics such that once folded, wrapped or otherwise manipulated into the desired shape, the wraps maintain their shape and not tend to spontaneously unfold or unwrap; grease resistance, where desired; and a moisture barrier while not allowing for moisture to condense onto an item wrapped therein. The wraps can have smooth surface or a textured surface, with texture provided, for example, by embossing, crimping, or quilting. The wraps can contain fillers, such as, for example, inorganic particles, organic particles such as starch, and combinations of fillers.

The films can be further processed to produce additional desirable articles, such as containers. For example, the films may be thermoformed as disclosed, for example, in U.S. Pat. No. 3,303,628, U.S. Pat. No. 3,674,626, and U.S. Pat. No. 5,011,735. The films may also serve to package foods, such as meats, through vacuum skin packaging techniques, as disclosed in, for example, U.S. Pat. No. 3,835,618, U.S. Pat.

No. 3,950,919, U.S. Re 30,009, and U.S. Pat. No. 5,011,735. The films can further be laminated onto substrates, as described below.

Further preferred embodiments of the present invention include coatings of the sulfonated aromatic copolyesters containing hydroxyalkanoic acid residues onto substrates, and the production processes thereof, and articles derived therefrom. Coatings can be produced by coating a substrate with polymer solutions, dispersions, latexes, and emulsions of the sulfonated aromatic copolyesters containing hydroxyalkanoic acid residues by, for example, rolling, spreading, spraying, brushing, or pouring processes, followed by drying; by coextruding the copolyesters with other materials, powder coating onto a preformed substrate, or by melt/extrusion coating a preformed substrate with the copolyesters. The substrate can be coated on one side or on both sides. The polymeric coated substrates have a variety of uses, such as in packaging, especially of foodstuffs, and as disposable cups, plates, bowls and cutlery. For many of these uses, the heat resistance of the coating is an important factor. Therefore, a higher melting point, glass transition temperature, and crystallinity level are desirable to provide better heat resistance, along with a rapid biodegradation rate. Further, it is desired that the coatings provide good barrier properties for moisture, grease, oxygen, and carbon dioxide, and have good tensile strength and a high elongation at break.

Coatings can be made from the sulfonated aromatic copolyesters by any process known. For example, thin coatings may be formed through dipcoating as disclosed in U.S. Pat. No. 4,372,311 and U.S. Pat. No. 4,503,098, extrusion onto substrates, as disclosed, for example, in U.S. Pat. No. 5,294,483, U.S. Pat. No. 5,475,080, U.S. Pat. No. 5,611,859, U.S. Pat. No. 5,795,320, U.S. Pat. No. 6,183,814, and U.S. Pat. No. 6,197,380, blade, puddle, air-knife, printing, Dahlgren, gravure, powder coating, spraying, or other art processes. The coatings may be of any thickness. Preferably, the polymeric coating has a thickness of 0.25 mm (10 mils) or less, more preferably between about 0.025 mm and 0.15 mm (1 mil and 6 mils). However, thicker coatings can be formed, for example, up to a thickness of about 0.50 mm (20 mils) or greater.

Various substrates can be coated directly with a film. Coatings are preferably formed by solution, dispersion, latex, or emulsion casting; powder coating; or extrusion onto a preformed substrate.

Solution casting onto a substrate generally produces a more consistently uniform gauge coating than that made by melt extrusion. Solution casting comprises dissolving polymeric granules, powder or the like in a suitable solvent with any desired formulant, such as a plasticizer, filler, blendable polymeric material, or colorant. The solution is filtered to remove dirt or large particles and cast from a slot die onto a moving preformed substrate, dried, whereon the coating cools. The extrudate thickness is five to ten times that of the finished coating. The coating can then be finished in a like manner to the extruded coating. Similarly, polymeric dispersions and emulsions may be coated onto substrates through equivalent processes. Coatings may be applied to textiles, nonwovens, foil, paper, paperboard, and other sheet materials by continuously operating spread-coating machines. A coating knife, such as a "doctor knife", ensures uniform spreading of the coating materials (in the form of solution, emulsions, or dispersions in water or an organic medium) on the supporting material, which is moved along by rollers. The coating is then dried. Alternatively, the polymeric solution, emulsion, or dispersion may be sprayed, brushed, rolled or poured onto the substrate. Potts, in U.S. Pat. No. 4,372,311 and U.S. Pat. No. 4,503,098, discloses exemplary processes for coating water-soluble substrates with solutions of water-insoluble materials. U.S. Pat. No. 3,378,424 discloses processes for coating a fibrous substrate with an aqueous polymeric emulsion.

A coating of the sulfonated copolyesters can also be applied to substrates by powder coating processes. In a powder coating process, the sulfonated copolyesters are coated onto the substrates in the form of a powder having a fine particle size. The substrate to be coated can be heated to above the fusion temperature of the polymer and the substrate is dipped into a bed of the powdered polymer fluidized by the passage of air through a porous plate. The fluidized bed is typically not heated. A layer of the polymer adheres to the hot substrate surface and melts to provide the coating. Coating thicknesses can be in the range of about 0.005 inch to 0.080 inch, (0.13 to 2.00 mm). Other powder coating processes include spray coating, whereby the substrate is not heated until after it is coated, and electrostatic coating. For example, paperboard containers can be electrostatically spray-coated with a thermoplastic polymer powder, as disclosed in U.S. Pat. No. 4,117,971, U.S. Pat. No. 4,168,676, U.S. Pat. No. 4,180,844, U.S. Pat. No. 4,211,339, and U.S. Pat. No. 4,283,189. The cups are then heated, causing the polymeric powder to melt to form the laminated polymeric coating.

Metal articles of complex shapes can also be coated with the polymeric film by the whirl sintering process. The articles, heated to above the melting point of the polymer, are introduced into a fluidized bed of powdered polymer wherein the polymer particles are held in suspension by a rising stream of air, thus depositing a coating on the metal by sintering.

Coatings of the sulfonated copolyesters can also be applied by spraying the molten, atomized polymeric composition onto substrates, such as paperboard. Such processes are disclosed in the art for wax coatings in, for example, U.S. Pat. No. 5,078,313, U.S. Pat. No. 5,281,446, and U.S. Pat. No. 5,456,754.

The coatings are preferably formed through melt or extrusion coating processes. Extrusion is particularly preferred for formation of "endless" products, such as coated paper and paperboard, which emerge as a continuous length, as disclosed hereinabove. In extrusion coating, the substrate (for example, paper, foil, fabric, or polymeric film) is compressed together with the extruded polymeric melt by the pressure rolls so that the polymer impregnates the substrate for maximum adhesion. The molten film is then cooled by water-cooled chromium-plated chill rolls. The coated substrate can be then passed through a slitter to trim the edges and taken off by suitable devices designed to prevent subsequent deformation of the coated substrate.

Extrusion coating of polyesters onto paperboard is disclosed, for example, in U.S. Pat. No. 3,924,013, U.S. Pat. No. 4,147,836, U.S. Pat. No. 4,391,833, U.S. Pat. No. 4,595,611, U.S. Pat. No. 4,957,578, and U.S. Pat. No. 5,942,295. Kane, in U.S. Pat. No. 3,924,013, discloses the formation of ovenable trays mechanically formed from paperboard previously laminated with polyester. Chaffey, et al., in U.S. Pat. No. 4,836,400, disclose the production of cups formed from paper stock that has been coated with a polymer on both sides. Beavers, et al., in U.S. Pat. No. 5,294,483, disclose the extrusion coating of certain polyesters onto paper substrates.

As a further example of extrusion coating, wires and cable may be sheathed directly with polymeric films extruded from oblique heads.

Calendering processes can also be used to produce polymeric laminates onto substrates. Calenders consist of two, three, four, or five hollow rolls arranged for steam heating or water cooling. Typically, the polymer to be calendered is softened, for example in a ribbon blender, such as a Banbury mixer. Optional additives can be mixed in, such as plasticizers. The softened polymer is then fed to the rollers and is squeezed into a film. If desired, thick sections can be formed by applying one layer of polymer onto a previous layer (double plying). The substrate, such as textile or nonwoven fabric or paper, is fed through the last two rolls of the calender so that the resin film is pressed into the substrate. The thickness of the laminate is determined by the gap between the last two rolls of the calender. If desired, the surface can be made glossy, matte, or embossed. The laminate is then cooled and wound up on rolls.

Multiple polymer layers coated onto a substrate can also be produced, such as bilayer, trilayer, and multilayer film structures. One advantage to multilayer films is that specific properties can be tailored into the film to solve critical use needs while allowing the more costly ingredients to be relegated to the outer layers where they provide the greater needs. The multilayer composite structures may be formed through coextrusion, dipcoating, solution coating, blade, puddle, air-knife, printing, Dahlgren, gravure, powder coating, spraying, or other art processes. Generally, the multilayer films are produced by extrusion casting processes. For example, the materials for the polymers can separately heated in a uniform manner. The molten materials are conveyed to a coextrusion adapter that combines the molten materials to form a multilayer coextuded structure. The layered polymeric material is transferred through an extrusion die opened to a predetermined gap, commonly in the range of between about 0.05 inch (0.13 cm) to about 0.012 inch (0.03 cm) and is pulled down onto a substrate and into a nip between a chill roll and a pressure roll situated directly below the die. The material is drawn down to the intended gauge thickness based on the speed of the substrate. The primary chill or casting roll is maintained typically at a temperature in the range of about 15 to 55° C., (60-130 F). Typical draw down ratios range from about 5:1 to about 40:1. The additional layers can serve as barrier layers, adhesive layers, antiblocking layers, or for other purposes. Further, for example, the inner layers can be filled and the outer layers may be unfilled, as disclosed in U.S. Pat. No. 4,842,741 and U.S. Pat. No. 6,309,736. Production processes are well known, and are disclosed, for example, in U.S. Pat. No. 3,748,962, U.S. Pat. No. 4,522,203, U.S. Pat. No. 4,734,324, U.S. Pat. No. 5,261,899 and U.S. Pat. No. 6,309,736. El-Afandi, et al., in U.S. Pat. No. 5,849,374, U.S. Pat. No. 5,849,401, and U.S. Pat. No. 6,312,823, disclose compostable multilayer films with a core poly(lactide) layer with inner and outer layers of blocking reducing layers composed of, for example, aliphatic polyesters. Kuusipalo, et al., in WO Application 00/01530, disclose paper and paperboard coated with poly(lactide) and biodegradable adhesive layers, such as aliphatic-aromatic polyesters.

The additional layers can contain the sulfonated aromatic copolyesters containing hydroxyalkanoic acid residues or of materials which may be biodegradable or not biodegradable. The materials can be naturally derived, modified naturally derived or synthetic.

Examples of biodegradable materials suitable as additional layers include poly(hydroxy alkanoates), polycarbonates, poly(caprolactone), aliphatic polyesters, aliphatic-aromatic copolyesters, aliphatic-aromatic copolyetheresters, aliphatic-aromatic copolyamideesters, sulfonated aliphatic-aromatic copolyesters, sulfonated aliphatic-aromatic copolyetheresters, sulfonated aliphatic-aromatic copolyamideesters, copolymers thereof, and mixtures thereof.

Specific examples of the biodegradable materials suitable as additional layers include the Biomax® sulfonated aliphatic-aromatic copolyesters of the DuPont Company, the Eastar Bio® aliphatic-aromatic copolyesters of the Eastman Chemical Company, the Ecoflex® aliphatic-aromatic copolyesters of the BASF Corporation, poly(1,4-butylene terephthalate-co-adipate, (50:50, molar), the EnPol® polyesters of the Ire Chemical Company, poly(1,4-butylene succinate), the Bionolle® polyesters of the Showa High Polymer Company, poly(ethylene succinate), poly(1,4-butylene adipate-co-succinate), poly(1,4-butylene adipate), poly(amide esters), the Bak® poly(amide esters) of the Bayer Company, poly(ethylene carbonate), poly(hydroxybutyrate), poly(hydroxyvalerate), poly(hydroxybutyrate-co-hydroxyvalerate), the Biopol® poly(hydroxy alkanoates) of the Monsanto Company, poly(lactide-co-glycolide-co-caprolactone), the Tone® poly(caprolactone) of the Union Carbide Company, the EcoPLA® poly(lactide) of the Cargill Dow Company and copolymers and mixtures thereof. Essentially any biodegradable material can be used as an additional layer with the sulfonated aromatic copolyesters.

Examples of nonbiodegradable polymeric materials suitable as additional layers are disclosed hereinabove with regard to nobiodedgradable polymeric materials useful in multilayer structures.

Examples of natural polymeric materials suitable as additional layers are disclosed hereinabove for use in forming blends. Essentially any material known can be used as an additional layer.

In coating a substrate, the material to form the coating is generally applied to a thickness of about 0.2 to 15 mils, more typically in the range of 0.5 to 2 mils. The substrates can vary widely in thickness, but the range of between 0.5 to more than 24 mils thickness is common. Suitable substrates include articles composed of paper, paperboard, cardboard, fiberboard, cellulose, such as Cellophane®, starch, plastic, polystyrene foam, glass, metal, for example; aluminum or tin cans, metal foils, polymeric foams, organic foams, inorganic foams, organic-inorganic foams, and olymeric films. Preferred are biodegradable substrates, such as paper, paperboard, cardboard, cellulose, and starch, and biobenign substrates such as inorganic and inorganic-organic foams.

Polymeric films used as substrates can contain the sulfonated aromatic copolyesters containing hydroxyalkanoic acid residues and/or other materials, which may be biodegradable or not biodegradable. The materials can be naturally derived, modified naturally derived or synthetic.

Examples of biodegradable, nonbiodegradable and natural materials suitable as substrates include those disclosed hereinabove for use in forming multilayer structures.

Organic foams, such as derived from expanded starches and grains, can be used as substrates. Such materials are disclosed, for example, in U.S. Pat. No. 3,137,592, U.S. Pat. No. 4,673,438, U.S. Pat. No. 4,863,655, U.S. Pat. No. 5,035,930, U.S. Pat. No. 5,043,196, U.S. Pat. No. 5,095,054, U.S. Pat. No. 5,300,333, U.S. Pat. No. 5,413,855, U.S. Pat. No. 5,512,090, and U.S. Pat. No. 6,106,753. Specific examples of the materials include: EcoFoam®, a product of the National Starch Company of Bridgewater, N.J., which is a hydroxypropylated starch product, and EnviroFil®, a product of the EnPac Company, a DuPont-Con Agra Company.

Particularly preferred organic-inorganic foams are the cellular highly inorganically filled with, for example, calcium carbonate, clays, cement, or limestone, having a starch-based binder such as, for example, potato starch, corn starch, waxy corn starch, rice starch, wheat starch, tapioca, and a small amount of fiber, as disclosed, for example, by Andersen, et al., in U.S. Pat. No. 6,030,673. Such materials are produced by mixing the ingredients together, such as limestone, potato starch, fiber and water, to form a batter. The substrate is formed by pressing the batter between two heated molds. The water contained within the batter is turned to steam, raising the pressure within the mold. This forms the foamed product. Products produced by the process are commercially available by the EarthShell Packaging Company, and include 9-inch plates, 12-ounce bowls and hinged-lid containers ("clam shells"). Additional disclosures of inorganic and organic-inorganic foam substrates include, for example: U.S. Pat. No. 5,095,054, U.S. Pat. No. 5,108,677, U.S. Pat. No. 5,234,977, U.S. Pat. No. 5,258,430, U.S. Pat. No. 5,262,458, U.S. Pat. No. 5,292,782, U.S. Pat. No. 5,376,320, U.S. Pat. No. 5,382,611, U.S. Pat. No. 5,405,564, U.S. Pat. No. 5,412,005, U.S. Pat. No. 5,462,980, U.S. Pat. No. 5,462,982, U.S. Pat. No. 5,512,378, U.S. Pat. No. 5,514,430, U.S. Pat. No. 5,549,859, U.S. Pat. No. 5,569,514, U.S. Pat. No. 5,569,692, U.S. Pat. No. 5,576,049, U.S. Pat. No. 5,580,409, U.S. Pat. No. 5,580,624, U.S. Pat. No. 5,582,670, U.S. Pat. No. 5,614,307, U.S. Pat. No. 5,618,341, U.S. Pat. No. 5,626,954, U.S. Pat. No. 5,631,053, U.S. Pat. No. 5,658,603, U.S. Pat. No. 5,658,624, U.S. Pat. No. 5,660,900, U.S. Pat. No. 5,660,903, U.S. Pat. No. 5,660,904, U.S. Pat. No. 5,665,442, U.S. Pat. No. 5,679,145, U.S. Pat. No. 5,683,772, U.S. Pat. No. 5,705,238, U.S. Pat. No. 5,705,239, U.S. Pat. No. 5,709,827, U.S. Pat. No. 5,709,913, U.S. Pat. No. 5,753,308, U.S. Pat. No. 5,766,525, U.S. Pat. No. 5,770,137, U.S. Pat. No. 5,776,388, U.S. Pat. No. 5,783,126, U.S. Pat. No. 5,800,647, U.S. Pat. No. 5,810,961, U.S. Pat. No. 5,830,305, U.S. Pat. No. 5,830,548, U.S. Pat. No. 5,843,544, U.S. Pat. No. 5,849,155, U.S. Pat. No. 5,868,824, U.S. Pat. No. 5,879,722, U.S. Pat. No. 5,897,944, U.S. Pat. No. 5,910,350, U.S. Pat. No. 5,928,741, U.S. Pat. No. 5,976,235, U.S. Pat. No. 6,083,586, U.S. Pat. No. 6,090,195, U.S. Pat. No. 6,146,573, U.S. Pat. No. 6,168,857, U.S. Pat. No. 6,180,037, U.S. Pat. No. 6,200,404, U.S. Pat. No. 6,214,907, U.S. Pat. No. 6,231,970, U.S. Pat. No. 6,242,102, U.S. Pat. No. 6,347,934, U.S. Pat. No. 6,348,524, and U.S. Pat. No. 6,379,446. Essentially any material known can be used as a substrate.

To enhance the coating process, the substrates can be treated by known, conventional post forming operations, such as corona discharge, chemical treatments, such as primers, flame treatments, adhesives. The substrate layer can be primed with, for example, an aqueous solution of polyethyleneimine, (Adcote® 313), or a styrene-acrylic latex, or flame treated, as disclosed in U.S. Pat. No. 4,957,578 and U.S. Pat. No. 5,868,309.

The substrate can be coated with an adhesive, using conventional coating technologies or extrusion. Specific examples of adhesives that can be used include: glue, gelatine, caesin, starch, cellulose esters, aliphatic polyesters, poly(alkanoates), aliphatic-aromatic polyesters, sulfonated aliphatic-aromatic polyesters, polyamide esters, rosin/poly-caprolactone triblock copolymers, rosin/poly(ethylene adipate) triblock copolymers, rosin/poly(ethylene succinate) triblock copolymers, poly(vinyl acetates), poly(ethylene-co-vinyl acetate), poly(ethylene-co-ethyl acrylate), poly(ethylene-co-methyl acrylate), poly(ethylene-co-propylene), poly(ethylene-co-1-butene), poly(ethylene-co-1-pentene), poly(styrene), acrylics, Rhoplex® N-1031, (an acrylic latex from the Rohm & Haas Company), polyurethanes, AS 390, (an aqueous polyurethane adhesive base for Adhesion Systems, Inc.) with AS 316, (an adhesion catalyst from Adhesion Systems, Inc.), Airflex® 421, (a water-based vinyl acetate adhesive formulated with a crosslinking agent), sulfonated polyester urethane dispersions, (such as sold as Dispercoll® U-54, Dispercoll® U-53, and Dispercoll® KA-8756 by the Bayer Corporation), nonsulfonated urethane dispersions, (such as Aquathane® 97949 and Aquathane® 97959 by the Reichold Company; Flexthane® 620 and Flexthane® 630 by the Air Products Company; Luphen® D DS 3418 and Luphen® D 200A by the BASF Corporation; Neorez® 9617 and Neorez® 9437 by the Zeneca Resins Company; Quilastic® DEP 170 and Quilastic® 172 by the Merquinsa Company; Sancure® 1601 and Sancure® 815 by the B. F. Goodrich Company), urethane-styrene polymer dispersions, (such as Flexthane® 790 and Flexthane® 791 of the Air Products & Chemicals Company), Non-ionic polyester urethane dispersions, (such as Neorez® 9249 of the Zeneca Resins Company), acrylic dispersions, (such as Jagotex® KEA-5050 and Jagotex® KEA 5040 by the Jager Company; Hycar® 26084, Hycar® 26091, Hycar® 26315, Hycar® 26447, Hycar® 26450, and Hycar® 26373 by the B. F. Goodrich Company; Rhoplex® AC-264, Rhoplex® HA-16, Rhoplex® B-60A, Rhoplex® AC-234, Rhoplex® E-358, and Rhoplex® N-619 by the Rohm & Haas Company), silanated anionic acrylate-styrene polymer dispersions, (such as Acronal® S-710 by the BASF Corporation and Texigel® 13-057 by Scott Bader Inc.), anionic acrylate-styrene dispersions, (such as Acronal®296D, Acronal® NX 4786, Acronal® S-305D, Acronal® S-400, Acronal® S-610, Acronal® S-702, Acronal® S-714, Acronal® S-728, and Acronal® S-760 by the BASF Corporation; Carboset® CR-760 by the B. F. Goodrich Company; Rhoplex® P-376, Rhoplex® P-308, and Rhoplex® NW-1715K by the Rohm & Haas Company; Synthemul® 40402 and Synthemul® 40403 by the Reichold Chemicals Company; Texigel® 13-57 Texigel® 13-034, and Texigel® 13-031 by Scott Bader Inc.; and Vancryl® 954, Vancryl® 937 and Vancryl® 989 by the Air Products & Chemicals Company), anionic acrylate-styrene-acrylonitrile dispersions, (such as Acronal® S 886S, Acronal® S 504, and Acronal® DS 2285 X by the BASF Corporation), acrylate-acrylonitrile dispersions, (such as Acronal® 35D, Acronal® 81D, Acronal® B 37D, Acronal® DS 3390, and Acronal® V275 by the BASF Corporation), vinyl chloride-ethylene emulsions, (such as Vancryl® 600, Vancryl® 605, Vancryl® 610, and Vancryl® 635 by Air Products and Chemicals Inc.), vinylpyrrolidone/styrene copolymer emulsions, (such as Polectron® 430 by ISP Chemicals), carboxylated and noncarboxylated vinyl acetate ethylene dispersions, (such as Airflex® 420, Airflex® 421, Airflex® 426, Airflex® 7200, and Airflex® A-7216 by Air Products and Chemicals Inc. and Dur-o-set® E150 and Dur-o-set® E-230 by ICI), vinyl acetate homopolymer dispersions, (such as Resyn® 68-5799 and Resyn® 25-2828 by ICI), polyvinyl chloride emulsions, (such as Vycar® 460x24, Vycar® 460x6 and Vycar® 460x58 by the B. F. Goodrich Company), polyvinylidene fluoride dispersions, (such as Kynar® 32 by Elf Atochem), ethylene acrylic acid dispersions, (such as Adcote® 50T4990 and Adcote® 50T4983 by Morton International), polyamide dispersions, (such as Micromid® 121RC, Micromid® 141L, Micromid® 142LTL, Micromid® 143LTL, Micromid® 144LTL, Micromid® 321RC, and Micromid® 632HPL by the Union Camp Corporation), anionic carboxylated or noncarboxylated acrylonitrile-butadiene-styrene emulsions and acrylonitrile emulsions, (such as Hycar® 1552, Hycar® 1562x107, Hycar® 1562x117 and Hycar® 1572x64 by B. F. Goodrich), resin dispersions derived from styrene, (such as Tacolyn® 5001 and Piccotex® LC-55WK by Hercules), resin dispersions derived from aliphatic and/or aromatic hydrocarbons, (such as Escorez® 9191, Escorez® 9241, and Escorez® 9271 by Exxon), styrene-maleic anhydrides, (such as SMA® 1440 H and SMA® 1000 by AtoChem), and mixtures thereof. Essentially any adhesive known can be used. In some preferred embodiments, the substrate is coated with a biodegradable adhesion binder layer of, for example, glue, gelatine, casein, or starch.

Adhesives be applied by melt, solution, emulsion, dispersion, or coating processes. For example, U.S. Pat. No. 4,343,858, discloses a coated paperboard formed by the coextrusion of a polyester top film and an intermediate layer of an ester of acrylic acid, methacrylic acid, or ethacrylic acid, on top of a paperboard. U.S. Pat. No. 4,455,184, disclose a process to coextrude a polyester layer and a polymeric adhesive layer onto a paperboard substrate. Fujita, et al., in U.S. Pat. No. 4,543,280, disclose the use of adhesives in the extrusion coating of polyester onto ovenable paperboard. Huffman, et al., in U.S. Pat. No. 4,957,578, disclose the extrusion of a polyester layer onto a polyethylene coated paperboard, and the direct formation of a multilayer structure by coextrusion of the polyethylene layer onto the paperboard with the polyester the polyethylene, with a coextruded tie layer of Bynel® adhesive between the polyethylene layer and the polyester layer.

One of ordinary skill in the art can determine appropriate process parameters based on the polymeric composition and process used for the coating formation. The properties exhibited by a coating depend on several factors indicated above, including the polymeric composition, the method of forming the polymer, the method of forming the coating, and whether the coating was oriented during manufacture. These factors affect properties of the coating, such as shrinkage, tensile strength, elongation at break, impact strength, dielectric strength and constant, tensile modulus, chemical resistance, melting point, heat deflection temperature. The coating properties can be adjusted by adding certain additives and fillers to the polymeric composition, as disclosed hereinabove.

The substrates can be formed into certain articles prior to coating, or can be formed into articles after they are coated. For example, containers can be produced from flat, coated paperboard by pressforming them, e.g., by vacuum forming, or by folding and adhering them into the desired shape. Coated, flat paperboard stock can be formed into trays by the application of heat and pressure, as disclosed in, for example, U.S. Pat. No. 4,900,594, or can be formed into containers for foods and beverages, as disclosed in U.S. Pat. No. 5,294,483. Articles that can be coated include, for example, cutlery, flower pots, mailing tubes, light fixtures, ash trays, gameboards, food containers, fast food containers, cartons, boxes, milk cartons, fruit juice containers, carriers for beverage containers, ice cream cartons, cups, disposable drinking cups, two-piece cups, one-piece pleated cups, cone cups, coffee cups, lidding, lids, straws, cup tops, french fry containers, fast food carry out boxes, packaging, support boxes, confectionery boxes, boxes for cosmetics, plates, bowls, vending plates, pie plates, trays, baking trays, breakfast plates, microwavable dinner trays, "TV" dinner trays, egg cartons, meat packaging platters, disposable single use liners which can be utilized with containers such as cups or food containers, substantially spherical objects, bottles, jars, crates, dishes, medicine vials, interior packaging, such as partitions, liners, anchor pads, corner braces, corner protectors, clearance pads, hinged sheets, trays, funnels, cushioning materials, and other objects used as containers for in packaging, storing, shipping, portioning, serving, or dispensing.

Water-resistant polymer coated paper and paperboard are commonly used in packaging material for foodstuffs and as disposable containers. Coating polymers and multilamellar coating structures including such coated paper and paperboard provide oxygen, water vapor, and aroma tightness for preservation of the packaged product.

Coatings made from the sulfonated aromatic copolyesters containing hydroxyalkanoic acid residues can be used in a wide variety of areas such as those disclosed hereinabove for uses of films.

As further examples, the coatings can be used as protective films in agriculture, such as mulch films, seed coverings, agriculture mats containing seeds, ("seed tapes"), garbage and lawn waste bags. Further examples of uses for the coatings include: adhesive tape substrates, bags, bag closures, bed sheets, bottles, cartons, dust bags, fabric softener sheets, garment bags, industrial bags, trash bags, waste bin liners, compost bags, labels, tags, pillow cases, bed liners, bedpan liners, bandages, boxes, handkerchiefs, pouches, wipes, protective clothing, surgical gowns, surgical sheets, surgical sponges, temporary enclosures, temporary siding, toys, and wipes.

A particularly preferred use of the coatings comprising the sulfonated aromatic copolyesters containing hydroxyalkanoic acid residues is in food packaging, especially for fast food packaging. Specific examples of food packaging uses include those uses recited hereinabove for films.

A specifically preferred end use for the coatings includes wraps. Such wraps may take the form of a polymeric coated paper. Uses and characteristics of coated wraps include those recited hereinabove with respect to films. The wraps can be filled, with, for example, inorganic particles, organic particles, such as starch, or combinations of fillers.

A further preferred aspect of the present invention relates to laminates of the sulfonated aromatic copolyesters containing hydroxyalkanoic acid residues onto substrates and the production processes thereof and articles derived therefrom. The films comprising the sulfonated aromatic copolyesters containing hydroxyalkanoic acid can be laminated onto a wide variety of substrates using known processes such as, for example, thermoforming, vacuum thermoforming, vacuum lamination, pressure lamination, mechanical lamination, skin packaging, and adhesion lamination. A laminate is different from a coating in that, in a laminate, a preformed film is attached to a substrate. The substrate can be shaped into the shape for their intended use, such as in the form of a plate, cup, bowl, or tray, or can be in an intermediate shape still to be formed, such as a sheet or film, when the preformed film is applied. The film can be attached to the substrate using the application of heat and/or pressure, as with, for example heated bonding rolls. Generally speaking, the laminate bond strength or peel strength can be enhanced through the use of higher temperatures and/or pressures. When adhesives are used, the adhesives can be hot melt adhesives or solvent based adhesives. To enhance the lamination, the films and/or the substrates can be treated by known, conventional post forming operations, such as corona discharge, chemical treatments, such as primers, flame treatments, as previously described. For example, U.S.

Pat. No. 4,147,836 discloses subjecting a paperboard to a corona discharge to enhance the lamination process with a poly(ethylene terephthalate) film. Quick, et al., in U.S. Pat. No. 4,900,594, disclose the corona treatment of a polyester film to aid in the lamination to paperstock with adhesives. For example, Schirmer, in U.S. Pat. No. 5,011,735, discloses the use of corona treatments to aid the adhesion between various blown films. U.S. Pat. No. 5,679,201 and U.S. Pat. No. 6,071,577, disclose the use of flame treatments to aid in the adhesion within polymeric lamination processes. Sandstrom, et al., in U.S. Pat. No. 5,868,309, disclose the use of paperboard substrate primer consisting of certain styrene-acrylic materials to improve the adhesion with polymeric laminates.

Processes for producing polymeric coated or laminated paper and paperboard substrates for use as containers and cartons are well known and are described, for example, in U.S. Pat. No. 3,863,832, U.S. Pat. No. 3,866,816, U.S. Pat. No. 4,337,116, U.S. Pat. No. 4,456,164, U.S. Pat. No. 4,698,246, U.S. Pat. No. 4,701,360, U.S. Pat. No. 4,789,575, U.S. Pat. No. 4,806,399, U.S. Pat. No. 4,888,222, and U.S. Pat. No. 5,002,833. Kane, in U.S. Pat. No. 3,924,013, discloses the formation of ovenable trays mechanically formed from paperboard previously laminated with polyester. Schmidt, in U.S. Pat. No. 4,130,234, discloses the polymeric film lamination of paper cups. lamination of films onto nonwoven fabrics is disclosed in U.S. Pat. No. 6,045,900 and U.S. Pat. No. 6,309,736. Depending on the intended use of the polyester laminated substrate, the substrate may be laminated on one side or on both sides.

The films can be passed through heating and pressure/nip rolls to be laminated onto flat substrates. More commonly, the films are laminated onto substrates by processes that are derivatives of thermoforming. The films can be laminated onto substrates by vacuum lamination, pressure lamination, blow lamination, or mechanical lamination. When the films are heated, they soften and can be stretched onto a substrate of any given shape. Processes to adhere a polymeric film to a preformed substrate are disclosed, for example, in U.S. Pat. No. 2,590,221.

In vacuum lamination, the film can be clamped or simply held against the substrate and then heated until it becomes soft. A vacuum is then applied, typically through porous substrates or designed-in holes, causing the softened film to mold into the contours of the substrate and laminate onto the substrates. The as-formed laminate is then cooled. The vacuum can be maintained or not during the cooling process.

For substrate shapes that require a deep draw, such as cups, deep bowls, boxes, cartons, a plug assist can be used. In such substrate shapes, the softened film tends to thin out significantly before it reaches the base or bottom of the substrate shape, leaving only a thin and weak laminate on the bottom of the substrate shape. A plug assist is any type of mechanical helper that carries more film stock toward an area of the substrate shape where the lamination would otherwise be too thin. Plug assist methods can be adapted to vacuum and pressure lamination processes.

Vacuum lamination processes for applying films onto preformed substrates are known, and are disclosed, for example, in U.S. Pat. No. 4,611,456 and U.S. Pat. No. 4,862,671. For example, Knoell, in U.S. Pat. No. 3,932,105, discloses processes for the vacuum lamination of a film onto a folded paperboard carton. For example, Lee, et al., in U.S. Pat. No. 3,957,558, disclose the vacuum lamination of thermoplastic films onto a molded pulp product, such as a plate. For example, Foster, et al., in U.S. Pat. No. 4,337,116, disclose the lamination of poly(ethylene terephthalate) films onto preformed molded pulp containers by preheating the pulp container and the film, pressing the film into contact with the substrate and applying vacuum through the molded pulp container substrate. Plug assisted, vacuum lamination processes are also known. For example, Wommelsdorf, et al., in U.S. Pat. No. 4,124,434, disclose such processes for deep drawn laminates, such as coated cups. For example, Faller, in U.S. Pat. No. 4,200,481 and U.S. Pat. No. 4,257,530, discloses the production processes of lined trays by such processes.

In pressure lamination, the film can be clamped, heated until it softens, and then forced into the contours of the substrate to be laminated by the application of pressure to the side of the film opposite to the substrate. Exhaust holes may be present to allow the trapped air to escape, or in the more common situation, the substrate is porous to air and the air simply escapes through the substrate. The air pressure may be released once the laminated substrate cools and the film solidifies. Pressure lamination can provide a faster production cycle, improved part definition and greater dimensional control in comparison to vacuum lamination. Pressure lamination of films onto preformed substrates is disclosed, for example, in U.S. Pat. No. 3,657,044 and U.S. Pat. No. 4,862,671. Wommelsdorf, in U.S. Pat. No. 4,092,201, discloses a process for lining an air-permeable container, such as a paper cup, with a thermoplastic foil using a warm pressurized stream of gas.

Mechanical lamination includes any lamination method that does not use vacuum or air pressure. The film is heated and then mechanically applied to the substrate. Examples of the mechanical application include molds or pressure rolls.

Suitable substrates include articles made of paper, paperboard, cardboard, fiberboard, cellulose, such as Cellophane® cellophane, starch, plastic, polystyrene foam, glass, metal in, for example aluminum or tin cans or metal foils, polymeric foams, organic foams, inorganic foams, organic-inorganic foams, and polymeric films. Preferred are biodegradable substrates, such as paper, paperboard, cardboard, cellulose, and starch, and biobenign substrates such as inorganic and inorganic-organic foams.

Polymeric films suitable as substrates for lamination can be naturally derived, modified naturally derived or synthetic, as disclosed hereinabove.

Examples of nonbiodegradable polymeric materials suitable as substrates include polyethylene, high density polyethylene, low density polyethylene, linear low density polyethylene, ultralow density polyethylene, polyolefins, poly (ethylene-co-glycidylmethacrylate), poly(ethylene-co-methyl(meth)acrylate-co-glycidyl acrylate), poly(ethylene-co-n-butyl acrylate-co-glycidyl acrylate), poly(ethylene-co-methyl acrylate), poly(ethylene-co-ethyl acrylate), poly (ethylene-co-butyl acrylate), poly(ethylene-co-(meth) acrylic acid), metal salts of poly(ethylene-co-(meth)acrylic acid), poly((meth)acrylates), such as poly(methyl methacrylate), poly(ethyl methacrylate), poly(ethylene-co-carbon monoxide), poly(vinyl acetate), poly(ethylene-co-vinyl acetate), poly(vinyl alcohol), poly(ethylene-co-vinyl alcohol), polypropylene, polybutylene, poly(cyclic olefins), polyesters, poly(ethylene terephthalate), poly(1,3-propylene terephthalate), poly(1,4-butylene terephthalate), PETG, poly (ethylene-co-1,4-cyclohexanedimethanol terephthalate), poly(vinyl chloride), PVDC, poly(vinylidene chloride), polystyrene, syndiotactic polystyrene, poly(4-hydroxystyrene), novalacs, poly(cresols), polyamides, nylon, nylon 6, nylon 46, nylon 66, nylon 612, polycarbonates, poly(bisphenol A carbonate), polysulfides, poly(phenylene sulfide), polyethers, poly(2,6-dimethylphenylene oxide), polysulfones, and copolymers thereof and mixtures thereof.

Examples of natural polymeric materials suitable as substrates include those disclosed hereinabove with regard to making blends. Organic foams, such as derived from expanded starches and grains, suitable as substrates, are disclosed hereinabove.

Substrates can be formed into their use shape prior to lamination. Any conventional process to form the substrates can be used. For example, for molded pulp substrates, a "precision molding", "die-drying", and "close-drying" process can be used. The processes include molding fibrous pulp from an aqueous slurry against a screen-covered open-face suction mold to the substantially finished contoured shape, followed by drying the damp pre-form under a strong pressure applied by a mated pair of heated dies. Such processes are disclosed, for example, in U.S. Pat. No. 2,183,869, U.S. Pat. No. 4,337,116, and U.S. Pat. No. 4,456,164. Precision molded pulp articles tend to be dense, hard and boardy, with an extremely smooth, hot-ironed surface finish. Chinet® disposable paper plates produced by such processes have been sold by the Huhtamaki Company.

Molded pulp substrates can also be produced using known "free-dried" or "open-dried" processes. The free-dried process includes molding fibrous pulp from an aqueous slurry against a screen-covered, open-face suction mold to the desired molded shape and then drying the damp pre-from in a free space, such as placing it on a conveyor, and moving it slowly through a heated drying oven. Molded pulp articles can have a non-compacted consistency, resilient softness, and an irregular fibrous feel and appearance. Molded pulp substrates can also be "after pressed", after being formed in a free-dried process, for example, as disclosed in U.S. Pat. No. 2,704,493. They can also be produced by other conventional processes, such as disclosed, for example, in U.S. Pat. No. 3,185,370.

The laminated substrates can be formed into the desired shape using known processes, such as press forming or folding up. Such processes are disclosed, for example in U.S. Pat. No. 3,924,013, U.S. Pat. No. 4,026,458, and U.S. Pat. No. 4,456,164. Quick, et al., in U.S. Pat. No. 4,900,594, disclose the production of trays from flat, polyester laminated paperstock through the use of pressure and heat.

As disclosed above, adhesives can be applied to the film, to the substrate or to the film and the substrate to enhance the bond strength of the laminate. Adhesive lamination of films onto preformed substrates is disclosed, for example, in U.S. Pat. No. 2,434,106, U.S. Pat. No. 2,510,908, U.S. Pat. No. 2,628,180, U.S. Pat. No. 2,917,217, U.S. Pat. No. 2,975,093, U.S. Pat. No. 3,112,235, U.S. Pat. No. 3,135,648, U.S. Pat. No. 3,616,197, U.S. Pat. No. 3,697,369, U.S. Pat. No. 4,257,530, U.S. Pat. No. 4,016,327, U.S. Pat. No. 4,352,925, U.S. Pat. No. 5,037,700, U.S. Pat. No. 5,132,391, and U.S. Pat. No. 5,942,295. Schmidt, in U.S. Pat. No. 4,130,234, discloses the use of hot melt adhesives in the lamination of polymeric films to paper cups. Dropsy, in U.S. Pat. No. 4,722,474, discloses the use of adhesives for plastic laminated cardboard packaging articles. For example, Quick, et al., in U.S. Pat. No. 4,900,594, disclose the formation of paperboard trays through pressure and heat forming of a flat polyester laminated paperboard stock adhered with a crosslinkable adhesives system. Martini, et al., in U.S. Pat. No. 5,110,390, disclose the lamination of coextruded bilayer films onto water soluble substrates through the use of adhesives. Gardiner, in U.S. Pat. No. 5,679,201 and U.S. Pat. No. 6,071,577, discloses the use of adhesives to provide improved bond strengths between polyester coated paperboard onto polyethylene coated paperboard to produce, for example, juice containers.

The film can be coated with an adhesive using conventional coating technologies or coextrusion, and/or the substrate can be coated with an adhesive.

Specific examples of adhesives that can be used are recited hereinabove. Preferably, a biodegradable adhesive is used, such as, for example, glue, gelatine, casein or starch. Essentially any known adhesive can be used.

Laminates made using the sulfonated aromatic copolyesters containing hydroxyalkanoic acid residues can be used in a wide variety of areas, such as those disclosed above for uses of films. The laminates can also be used as protective films in agriculture, as disclosed hereinabove. Further examples of uses for laminates are recited hereinabove as uses for films.

A particularly preferred use of the laminates comprising the sulfonated aromatic copolyesters containing hydroxyalkanoic acid residues is in food packaging, especially fast food packaging. Specific examples of food packaging uses include fast food wrappers, stretch wrap films, hermetic seals, food bags, snack bags, containers for frozen food, drinking cups or goblets, heat-sealed cartons for liquid food stuffs, disposable dishes, disposable containers, grocery bags, cups, trays, cartons, boxes, bottles, crates, food packaging films, blister pack wrappers, skin packaging, hinged lid sandwich and salad containers, ("clam shells"). In cups intended for hot drinks, it is preferable to have a watertight polyester coating on only the inner surface. On the other hand, for cups intended for cold drinks, it is preferable to have the polyester coating on both the inner and outer surface of the cup to protect from water condensing on the outer surface of the cup. For heat-sealed cartons, it is preferable that the sealable polyester coating be on both the inner and outer surface of the container. A specifically preferred end use for the laminates includes wraps, in the form of, for example a polymeric laminated paper. Wraps can be used to enclose foods and other items, as disclosed hereinabove for uses of films.

The sulfonated aromatic copolyesters can also be formed into sheets. Polymeric sheets have a variety of uses, such as in signage, glazings, thermoforming articles, displays and display substrates. For some uses, heat resistance of the sheet is desired. Therefore, a higher melting point, glass transition temperature, and crystallinity level are desirable to provide better heat resistance and greater stability. Further, some uses require that the sheets have ultraviolet (UV) and scratch resistance, g tensile strength, optical clarity, and impact strength, particularly at low temperatures.

The sulfonated aromatic copolyesters can be formed into sheets using known methods, or sheets can be formed directly from the polymerization melt. Alternatively, the copolyesters can be formed into an easily handled shape (such as pellets) from the melt, which can then be used to form a sheet. The sheets can be used for forming signs, glazings (such as in bus stop shelters, sky lights or recreational vehicles), displays, automobile lights and in thermoforming articles, for example. As stated above, a sheet can be differentiated from a film based on thickness. As used herein, a sheet is greater than about 0.25 mm (10 mils) thick, preferably between about 0.25 mm and 25 mm, more preferably from about 2 mm to about 15 mm, and even more preferably from about 3 mm to about 10 mm. In a preferred embodiment, the sheets are sufficiently thick to be substantially rigid, generally about 0.50 mm or greater. However, sheets greater than 25 mm, and thinner than 0.25 mm can be formed.

Sheets can be formed using known methods, such as extrusion, solution casting or injection molding. The parameters for such methods can be determined by one of ordinary skill in the art and depend, for example, upon the viscosity of the copolyester and the desired thickness of the sheet. Sheets are preferably formed by solution casting or extrusion. Extrusion is particularly preferred, and exemplary extrusion processes are described hereinabove. Using extruders as known, a sheet can be produced by extruding a thin layer of polymer over chilled rolls and then further drawing down the sheet to size by tension rolls.

For manufacturing large quantities of sheets, a calender can be employed. Calenders are described hereinabove.

Extrusion can be combined with a variety of post-extrusion processes, providing expanded versatility. Such processes include altering round to oval shapes, stretching the sheet to different dimensions, machining and punching, and biaxial stretching, as known to those skilled in the art.

The polymeric sheet can be combined with other polymeric materials during extrusion and/or finishing to form laminates or multilayer sheets with improved characteristics, such as water vapor resistance. A multilayer or laminate sheet can be made by any method known, and can have as many as five or more separate layers joined together by heat, adhesive and/or tie layer.

A sheet can also be made by solution casting, which produces more consistently uniform gauge sheet than melt extrusion. Solution casting comprises dissolving polymeric granules, powder or the like in a suitable solvent with any desired formulant, such as a plasticizer or colorant. The solution is filtered to remove dirt or large particles and cast from a slot die onto a moving belt, preferably of stainless steel, dried, whereon the sheet cools. The extrudate thickness is five to ten times that of the finished sheet. The sheet can then be finished in a like manner to the extruded sheet. Further, sheets and sheet-like articles, such as discs, can be formed by injection molding. One of ordinary skill in the art can select appropriate process parameters based on the polymeric composition and process used for sheet formation.

Regardless of how the sheet is formed, it can be subjected to biaxial orientation by stretching in both the machine and transverse direction after formation, as disclosed above. Biaxially stretched sheets are preferred for certain uses where uniform sheeting is desired. This provides improved tensile strength, flexibility, toughness and shrinkability, for example, in comparison to non-oriented sheets. It is desirable to stretch the sheet along two axes at right angles to each other, which increases tensile strength and elastic modulus in the directions of stretch. It is most desirable for the amount of stretch in each direction to be roughly equivalent, thereby providing similar properties or behavior within the sheet when tested from any direction.

Shrinkage can be controlled by holding the sheet in a stretched position and heating for a few seconds, then quenching (e.g., cooling) which stabilizes the oriented sheet, which can then be forced to shrink only at temperatures above the heat stabilization temperature.

Process conditions and parameters for sheet making by any method in the art can determined by a skilled artisan for any given polymeric composition and desired application.

The properties exhibited by a sheet depend on several factors indicated above, including the polymeric composition, the method of forming the polymer, the method of forming the sheet, and whether the sheet was treated for stretch or biaxially oriented. These factors affect many properties of the sheet, such as shrinkage, tensile strength, elongation at break, impact strength, dielectric strength and constant, tensile modulus, chemical resistance, melting point, heat deflection temperature. The sheet properties can be further adjusted by adding certain additives and fillers, such as colorants, dyes, UV and thermal stabilizers, antioxidants, plasticizers, lubricants antiblock agents, slip agents, as recited above. Alternatively, the sulfonated aromatic copolyesters containing hydroxyalkanoic acid residues can be blended with one or more other polymers, such as starch, to provide certain characteristics. Other polymers can be added to change such characteristics as air permeability, optical clarity, strength and/or elasticity, for example.

The sheets can be thermoformed by any known method into any desirable shape, for use as, for example, covers, skylights, shaped greenhouse glazings, displays, and food trays. The thermoforming is accomplished by heating the sheet to a sufficient temperature and for sufficient time to soften the copolyester so that the sheet can be easily molded into the desired shape. One of ordinary skill in the art can determine appropriate thermoforming parameters depending upon the viscosity and crystallization characteristics of the polyester sheet.

The sulfonated aromatic copolyesters containing hydroxyalkanoic acid residues may also find utility as plastic containers. Plastic containers are widely used for foods and beverages, and also for non-food materials. The containers can be made by any method known, such as extrusion, injection molding, injection blow molding, rotational molding, thermoforming of a sheet, and stretch-blow molding.

A preferred method for molding a container from the sulfonated aromatic copolyesters is stretch-blow molding, which generally used in the production of poly(ethylene terephthalate) (PET) containers, such as bottles. Use can be made of any of the cold parison methods, in which a preformed parison (generally made by injection molding) is taken out of the mold, subjected to stretch blow molding in a separate step. The hot parison method can also be used, wherein the hot parison is immediately subjected to stretch blow molding in the same equipment without complete cooling after injection molding to make the parison. The parison temperature depends on the exact composition of the polymer to be used. Generally, parison temperatures in the range from about 90° C. to about 160° C. are suitable. The stretch blow molding temperature will also vary dependant on the exact material composition used, but a mold temperature of about 80° C. to about 150° C. is generally found to be useful.

Containers made from the copolyesters can have any shape desirable. Preferred are narrow-mouth bottles and wide-mouth bottles having threaded tops and a volume of about 400 mL to about 3 liters, although smaller and larger containers can be formed. The containers can be used in standard cold fill applications, and containers made from the copolyesters having certain compositions can be used in hot fill applications. The containers can be used for foods and beverages, and other solids and liquids. The containers are preferably clear and transparent, but can be modified to have color or to be opaque, rather than transparent, if desired, by adding colorants or dyes, or by causing crystallization of the polymer, which results in opaqueness.

The sulfonated aromatic copolyesters containing hydroxyalkanoic acid residues can also be used to make fibers. Such fibers can be used to form uneven fabrics, knitted fabrics, fabric webs, or any other fiber-containing structures, such as tire cords.

The term "fibers" as used herein includes continuous monofilaments, non-twisted or entangled multifilament yarns, staple yarns, spun yarns, and non-woven materials. Synthetic fibers, such as nylon, acrylic, polyesters, are made by spinning and drawing the polymer into a filament, which is then formed into a yarn by winding many filaments together. Fibers are often treated mechanically and/or chemically to impart desirable characteristics such as strength, elasticity, heat resistance, and hand (feel of fabric), depending upon the desired end product to be made from the fibers. Polyester fibers are produced in large quantities for use in a variety of applications, such as textiles, particularly in combination with natural fibers such as cotton and wool. Clothing, rugs, tires, ropes and other items can be made from fibers containing the sulfonated aromatic copolyesters. The fibers can be used in any application wherein polyester fibers are desirable due to their elasticity and strength.

For use in making fibers, the monomer composition of the sulfonated aromatic copolyester containing hydroxyalkanoic acid residues is desirably chosen to result in a partially crystalline polymer. The crystallinity is desirable for the formation of fibers, providing strength and elasticity. As first produced, the polyester is mostly amorphous in structure. In preferred embodiments, the polyester polymer readily crystallizes on reheating and/or extension of the polymer.

Fibers containing the sulfonated aromatic copolyesters can be made using any known process. Generally, melt spinning is preferred for polyester fibers. Melt spinning includes heating the polymer to form a molten liquid, or melting the polymer against a heated surface. The molten polymer is forced through a spinneret with a plurality of fine holes. Upon contact with air or a non-reactive gas stream after passing through the spinneret, the polymer emerging from each spinneret solidifies into filaments. The filaments are gathered together downstream from the spinneret by a convergence guide, and can be taken up by a roller or a plurality of rollers. This process allows filaments of various sizes and cross sections to be formed, including filaments having a round, elliptical, square, rectangular, lobed or dog-boned cross section, for example.

Following the extrusion and uptake of the fiber, the fiber is usually drawn, thereby increasing the crystallization and maximizing desirable properties such as orientation along the longitudinal axis, which increases elasticity, and strength. The drawing can be done in combination with takeup by using a series of rollers, some of which are generally heated, as known, or as a separate stage in the process of fiber formation. The polymer can be spun at speeds of from about 600 to 6000 meters per minute or higher, depending on the desired fiber size. For textile applications, a fiber with a denier per filament of from about 0.1 to about 100 is desired. Preferably, the denier is about 0.5 to 20, more preferably 0.7 to 10. However, for industrial applications the fiber is preferably from about 0.5 to 100 denier per filament, more preferably about 1.0 to 10.0, and even more preferably 3.0 to 5.0 denier per filament. The required size and strength of a fiber can be readily determined by one of ordinary skill in the art for a given application.

The resulting filamentary material is amenable to further processing through the use of additional processing equipment, or it can be used directly in applications requiring a continuous filament textile yarn. If desired, the filamentary material can be converted from a flat yarn to a textured yarn using known false twist texturing conditions or other processes. In particular, it is desirable to increase the surface area of the fiber to provide a softer feel and to enhance the ability of the fiber to breathe, thereby providing better insulation and water retention in textiles, for example. The fibers can be crimped or twisted by the false twist method, air jet, edge crimp, gear crimp, or stuffer box, for example. Alternatively, the fibers can be cut into shorter lengths, called staple, which may be processed into yarn. A skilled artisan can determine a suitable method of crimping or twisting based on the desired application and the composition of the fiber.

After formation, the fibers are finished by any method appropriate to the desired final use. For textiles, this may include dyeing, sizing, or addition of chemical agents such as antistatic agents, flame retardants, UV light stabilizers, antioxidants, pigments, dyes, stain resistants, and antimicrobial agents, which are appropriate to adjust the look and hand of the fibers. For industrial applications, the fibers can be treated to impart additional desired characteristics such as strength, elasticity or shrinkage. Continuous filament fibers can be used either as produced or texturized for use in a variety of applications such as textile fabrics for apparel and home furnishings, for example. High tenacity fiber can be used in industrial applications such as high strength fabrics, tarpaulins, sailcloth, sewing threads and rubber reinforcement for tires and V-belts, for example. Staple fibers can be used to form a blend with natural fibers, especially cotton and wool.

The sulfonated aromatic copolyester polymers containing hydroxyalkanoic acid residues can be used with another synthetic or natural polymer to form heterogeneous fibers or bicomponent fibers, thereby providing a fiber with improved properties. The heterogeneous fibers can be formed, for example, into side-by-side, sheath-core, and matrix designs.

The sulfonated aromatic copolyesters can also be formed into shaped foamed articles. Thermoplastic polymeric materials are foamed to provide low density articles, such as films, cups, food trays, decorative ribbons, and furniture parts. For some applications, the copolyester to be foamed desirably has a high melt viscosity, to provide sufficient melt viscosity to hold the as formed foamed shape sufficiently long for the polyester to solidify to form the foamed article. This can be achieved by raising the as produced polyester inherent viscosity in post-polymerization processes, such as the solid state polymerization process, as described above. Alternatively, the polyester can contain a branching agent, such as disclosed in U.S. Pat. No. 4,132,707, U.S. Pat. No. 4,145,466, U.S. Pat. No. 4,999,388, U.S. Pat. No. 5,000,991, U.S. Pat. No. 5,110,844, U.S. Pat. No. 5,128,383, and U.S. Pat. No. 5,134,028. Such branched polyesters can additionally be subjected to the solid-state polymerization, as described above, to further enhance the melt viscosity. The polyester can also contain a chain extension agent, such as a dianhydride or a polyepoxide, which can added during the foaming process, as is known to those skilled in the art.

The sulfonated aromatic copolyesters can be foamed by a wide variety of methods. These include the injection of an inert gas such as nitrogen or carbon dioxide into the melt during extrusion or molding operations. Alternatively, inert hydrocarbon gases such as methane, ethane, propane, butane, and pentane, or chlorofluorocarbons, hydrochlorofluorocarbons, and hydrofluorocarbons, can be used. Another method involves the dry blending of chemical blowing agents with the polyester and then extruding or molding the compositions to provide foamed articles. During the extrusion or molding operation, an inert gas such as nitrogen is released from the blowing agents and provides the foaming action. Typical blowing agents include azodicaronamide, hydrazocarbonamide, dinitrosopentamethylenetetramine, p-toluenesulfonyl hydrazodicarboxylate, 5-phenyl-3,6-dihydro-1,3,4-oxa-diazin-2-one, sodium borohydride, sodium bicarbonate, 5-phenyltetrazole, p,p'-oxybis(benzenesulfonylhydrazide). Still another method involves the blending of sodium carbonate or sodium bicarbonate with one portion of the polyester pellets, blending of an organic acid, such as citric acid, with another portion of the polyester pellets and then blending of the two types of pellets through extrusion or molding at elevated temperatures. Carbon dioxide gas is released from the interaction of the sodium carbonate and citric acid to provide the desired foaming action in the polymeric melt.

It is desirable that the foamable polyester compositions incorporate nucleation agents to create sites for bubble initiation, influence the cell size of the foamed sheet or object and to hasten the solidification of the as foamed article. Examples of the nucleation agents include sodium acetate, talc, titanium dioxide, polyolefin materials such as polyethylene, and polypropylene.

Polymeric foaming equipment and processes are known and are disclosed in, for example, U.S. Pat. No. 5,116,881, U.S. Pat. No. 5,134,028, U.S. Pat. No. 4,626,183, U.S. Pat. No. 5,128,383, U.S. Pat. No. 4,746,478, U.S. Pat. No. 5,110,844, U.S. Pat. No. 5,000,844, and U.S. Pat. No. 4,761,256; and reviewed in Kirk-Othmer Encyclopedia of Chemical Technology, Third Edition, Volume 11, pp. 82-145 (1980), John Wiley and Sons, Inc., New York, N.Y. and the Encyclopedia of Polymer Science and Engineering, Second Edition, Volume 2, pp. 434-446 (1985), John Wiley and Sons, Inc., New York, N.Y. As described above, the foamable polyester compositions can include a wide variety of additives, fillers, or be blended with other materials. For biodegradable foams, the addition of cellulose, cellulose derivatives, such as chemically modified cellulose, starch, and starch derivatives, such as chemically modified starch and thermoplastic starch, is especially preferred.

EXAMPLES

Test Methods

Differential Scanning Calorimetry, (DSC), is performed on a TA Instruments Model Number 2920 machine. Samples are heated under a nitrogen atmosphere at a rate of 20 degrees C./minute to 300 degrees C., programmed cooled back to room temperature at a rate of 20 degrees C./minute and then reheated to 300 degrees C. at a rate of 20 degrees C./minute. The observed sample glass transition temperature, (Tg), and crystalline melting temperature, (Tm), noted below were from the second heat.

Inherent Viscosity, (IV), is defined in "Preparative Methods of Polymer Chemistry", W. R. Sorenson and T. W. Campbell, 1961, p. 35. It is determined at a concentration of 0.5 g./100 mL of a 50:50 weight percent trifluoroacetic acid:dichloromethane acid solvent system at room temperature by a Goodyear R-103B method.

Laboratory Relative Viscosity, (LRV), is the ratio of the viscosity of a solution of 0.6 gram of the polyester sample dissolved in 10 mL of hexafluoroisopropanol, (HFIP), containing 80 ppm sulfuric acid to the viscosity of the sulfuric acid-containing hexafluoroisopropanol itself, both measured at 25 degrees C. in a capillary viscometer. The LRV may be numerically related to IV. Where this relationship is utilized, the term "calculated IV" is noted.

Biodegradation was performed according to the ISO 14855 method: "Determination of the ultimate aerobic biodegradability and disintegration of plastic materials under controlled composting conditions—Method by analysis of evolved carbon". This test involved injecting an inoculum consisting of a stabilized and mature compost derived from the organic fraction of municipal solid waste with ground powder of the polymer to be tested on a vermiculite matrix, composting under standard conditions at an incubation temperature controlled at 58 C+/−2 C. The test was conducted with one polymer sample. The carbon dioxide evolved is used to determine the extent of biodegradation.

Prior to testing film properties, the film samples are conditioned for 40 hours at 72 F and 50 percent humidity. Elmendorf Tear is determined as per ASTM 1922. Graves Tear is determined as per ASTM D1004. Tensile Strength at break, tensile modulus and percent elongation at break is determined as per ASTM D882.

Comparative Example CE 1

To a 250 milliliter glass flask was added bis(2-hydroxyethyl)terephthalate, (150.26 grams), glycolic acid, (18.46 grams), dimethyl 5-sulfoisophthalate, sodium salt, (2.67 grams), sodium acetate, (0.19 grams), di(ethylene glycol), (12.73 grams), manganese(II) acetate tetrahydrate, (0.0597 grams), and antimony(III) trioxide, (0.0486 grams). The reaction mixture was stirred and heated to 180 C under a slow nitrogen purge. After achieving 180 C, the reaction mixture was stirred at 180 C for 0.6 hours under a slow nitrogen purge. The reaction mixture was then heated to 240 C over 0.2 hours with stirring. After achieving 240 C, the reaction mixture was stirred at 240 C for 0.6 hours under a slow nitrogen purge. The reaction mixture was then heated to 255 C over 0.3 hours with stirring under a slight nitrogen purge. The reaction mixture was stirred at 255 C for 1.2 hours under a slight nitrogen purge. 11.8 grams of a colorless distillate was collected over this heating cycle. The reaction mixture was then staged to full vacuum with stirring at 255 C. The resulting reaction mixture was stirred for 2.0 hours under full vacuum, (pressure less than 100 mtorr). The vacuum was then released with nitrogen and the reaction mass allowed to cool to room temperature. An additional 40.1 grams of distillate was recovered and 116.2 grams of a solid product was recovered. The sample was measured for laboratory relative viscosity, (LRV), as described above and was found to have an LRV of 17.53. This sample was calculated to have an inherent viscosity of 0.56 dL/g. The sample underwent differential scanning calorimetry, (DSC), analysis. A glass transition temperature, (Tg), was observed with an onset of 62.9 C, a midpoint of 65.4 C, and an endpoint of 67.9 C. A crystalline melting temperature, (Tm), was observed at 195.3 C, (6.2 J/g).

Example 1

To a 250 milliliter glass flask was added bis(2-hydroxyethyl)terephthalate, (150.26 grams), glycolic acid, (17.66 grams), dimethyl 5-sulfoisophthalate, sodium salt, (2.66 grams), sodium acetate, (0.19 grams), manganese(II) acetate tetrahydrate, (0.0584 grams), and antimony(III) trioxide, (0.0470 grams). The reaction mixture was stirred and heated to 180 C under a slow nitrogen purge. After achieving 180 C, the reaction mixture was stirred at 180 C for 0.6 hours under a slow nitrogen purge. The reaction mixture was then heated to 240 C over 0.6 hours with stirring. After achieving 240 C, the reaction mixture was stirred at 240 C for 0.5 hours under a slow nitrogen purge. The reaction mixture was then heated to 255 C over 0.1 hours with stirring under a slight nitrogen purge. The reaction mixture was stirred at 255 C for 1.0 hour under a slight nitrogen purge. 8.2 grams of a colorless distillate was collected over this heating cycle. The reaction mixture was then staged to full vacuum with stirring at 255 C. The resulting reaction mixture was stirred for 1.8 hours under full vacuum, (pressure less than 100 mtorr). The vacuum was then released with nitrogen and the reaction mass allowed to cool to room temperature. An additional 33.9 grams of distillate was recovered and 127.2 grams of a solid product was recovered. The sample was measured for laboratory relative viscosity, (LRV), as described above and was found to have an LRV of 15.16. This sample was calculated to have an inherent viscosity of 0.52 dL/g. The sample underwent differential scanning calorimetry, (DSC), analysis. A glass transition temperature, (Tg), was observed with an onset of 72.7 C, a midpoint of 75.1 C, and an endpoint of 77.6 C. A crystalline melting temperature, (Tm), was observed at 222.6 C, (22.7 J/g).

Example 1 demonstrates the thermal properties of the sulfonated aromatic copolyesters Example 1, which represents the present invention, was found to have a 10 degree C. improvement in the glass transition temperature, a 27 degree C. improvement in the crystalline melting point temperature, and over three times the crystallinity level of conventional materials such as those prepared according to Comparative Example CE 1.

Comparative Example CE 2

To a 250 milliliter glass flask was added bis(2-hydroxyethyl)terephthalate, (150.26 grams), poly(lactide), (13.49 grams), dimethyl 5-sulfoisophthalate, sodium salt, (2.67 grams), sodium acetate, (0.19 grams), di(ethylene glycol), (12.73 grams), manganese(II) acetate tetrahydrate, (0.0605 grams), and antimony(III) trioxide, (0.0487 grams). The reaction mixture was stirred and heated to 180 C under a slow nitrogen purge. After achieving 180 C, the reaction mixture was stirred at 180 C for 0.5 hours under a slow nitrogen purge. The reaction mixture was then heated to 240 C over 0.8 hours with stirring. After achieving 240 C, the reaction mixture was stirred at 240 C for 0.6 hours under a slow nitrogen purge. The reaction mixture was then heated to 255 C over 0.4 hours with stirring under a slight nitrogen purge. The reaction mixture was stirred at 255 C for 0.9 hours under a slight nitrogen purge. 11.5 grams of a colorless distillate was collected over this heating cycle. The reaction mixture was then staged to full vacuum with stirring at 255 C. The resulting reaction mixture was stirred for 1.9 hours under full vacuum, (pressure less than 100 mtorr). The vacuum was then released with nitrogen and the reaction mass allowed to cool to room temperature. An additional 42.3 grams of distillate was recovered and 90.7 grams of a solid product was recovered. The sample was measured for laboratory relative viscosity, (LRV), as described above and was found to have an LRV of 14.49. This sample was calculated to have an inherent viscosity of 0.51 dL/g. The sample underwent differential scanning calorimetry, (DSC), analysis. A glass transition temperature, (Tg), was observed with an onset of 66.4 C, a midpoint of 68.7 C, and an endpoint of 71.0 C. A crystalline melting temperature, (Tm), was observed at 215.6 C, (24.5 J/g).

Example 2

35 To a 250 milliliter glass flask was added bis(2-hydroxyethyl)terephthalate, (150.26 grams), poly(lactide), (12.90 grams), dimethyl 5-sulfoisophthalate, sodium salt, (2.67 grams), sodium acetate, (0.18 grams), manganese(II) acetate tetrahydrate, (0.0577 grams), and antimony(III) trioxide, (0.0466 grams). The reaction mixture was stirred and heated to 180 C under a slow nitrogen purge. After achieving 180 C, the reaction mixture was stirred at 180 C for 0.5 hours under a slow nitrogen purge. The reaction mixture was then heated to 240 C over 0.2 hours with stirring. After achieving 240 C, the reaction mixture was stirred at 240 C for 0.8 hours under a slow nitrogen purge. The reaction mixture was then heated to 255 C over 0.3 hours with stirring under a slight nitrogen purge. The reaction mixture was stirred at 255 C for 0.8 hours under a slight nitrogen purge. 3.7 grams of a colorless distillate was collected over this heating cycle. The reaction mixture was then staged to full vacuum with stirring at 255 C. The resulting reaction mixture was stirred for 2.7 hours under full vacuum, (pressure less than 100 mtorr). The vacuum was then released with nitrogen and the reaction mass allowed to cool to room temperature. An additional 34.9 grams of distillate was recovered and 102.7 grams of a solid product was recovered. The sample was measured for laboratory relative viscosity, (LRV), as described above and was found to have an LRV of 12.09. This sample was calculated to have an inherent viscosity of 0.46 dL/g. The sample underwent differential scanning calorimetry, (DSC), analysis. A glass transition temperature, (Tg), was observed with an onset of 73.5 C, a midpoint of 78.1 C, and an endpoint of 82.6 C. A crystalline melting temperature, (Tm), was observed at 237.8 C, (30.7 J/g).

Example 2 demonstrates the thermal properties of the sulfonated aromatic copolyesters Example 2, which represents the present invention, was found to have a 10 degree C. improvement in the glass transition temperature and a 22 degree C. improvement in the crystalline melting point temperature over that of materials such as those prepared according to Comparative Example CE 2.

Comparative Example CE 3

To a 250 milliliter glass flask was added bis(2-hydroxyethyl)terephthalate, (149.49 grams), poly(caprolactone), (22.84 grams), dimethyl 5-sulfoisophthalate, sodium salt, (3.57 grams), sodium acetate, (0.19 grams), manganese(II) acetate tetrahydrate, (0.0583 grams), and antimony(III) trioxide, (0.0486 grams). The reaction mixture was stirred and heated to 180 C under a slow nitrogen purge. After achieving 180 C, the reaction mixture was stirred at 180 C for 0.5 hours under a slow nitrogen purge. The reaction mixture was then heated to 240 C over 0.6 hours with stirring. After achieving 240 C, the reaction mixture was stirred at 240 C for 0.5 hours under a slow nitrogen purge. The reaction mixture was then heated to 255 C over 0.3 hours with stirring under a slight nitrogen purge. The reaction mixture was stirred at 255 C for 1.0 hour under a slight nitrogen purge. 6.7 grams of a colorless distillate was collected over this heating cycle. The reaction mixture was then staged to full vacuum with stirring at 255 C. The resulting reaction mixture was stirred for 4.5 hours under full vacuum, (pressure less than 100 mtorr). The vacuum was then released with nitrogen and the reaction mass allowed to cool to room temperature. An additional 32.4 grams of distillate was recovered and 130.4 grams of a solid product was recovered. The sample was measured for laboratory relative viscosity, (LRV), as described above and was found to have an LRV of 17.41. This sample was calculated to have an inherent viscosity of 0.56 dL/g. The sample underwent differential scanning calorimetry, (DSC), analysis. A glass transition temperature, (Tg), was observed with an onset of 43.4 C, a midpoint of 46.6 C, and an endpoint of 49.9 C. A crystalline melting temperature, (Tm), was observed at 201.2 C, (21.4 J/g).

Example 3

To a 250 milliliter glass flask was added bis(2-hydroxyethyl)terephthalate, (149.49 grams), glycolic acid, (15.22 grams), dimethyl 5-sulfoisophthalate, sodium salt, (3.54 grams), sodium acetate, (0.19 grams), manganese(II) acetate tetrahydrate, (0.0594 grams), and antimony(III) oxide (0.0455 grams). The reaction mixture was stirred and heated to 180 C under a slow nitrogen purge. After achieving 180 C, the reaction mixture was heated to 240 C over 0.4 hours with stirring. After achieving 240 C, the reaction mixture was stirred at 240 C for 0.7 hours under a slow nitrogen purge. The reaction mixture was then heated to 255 C over 0.1 hours with stirring under a slight nitrogen purge. The reaction mixture was stirred at 255 C for 0.7 hours under a slight nitrogen purge. 8.9 grams of a colorless distillate was collected over this heating cycle. The reaction mixture was then staged to full vacuum with stirring at 255 C. The resulting reaction mixture was stirred for 1.6 hours under full vacuum, (pressure less than 100 mtorr). The vacuum was then released with nitrogen and the reaction mass allowed to cool to room temperature. An additional 32.3 grams of distillate was recovered and 101.9 grams of a solid product was recovered. The sample was measured for laboratory relative viscosity, (LRV), as described above and was found to have an LRV of 15.15. This sample was calculated to have an inherent viscosity of 0.52 dL/g. The sample underwent differential scanning calorimetry, (DSC), analysis. A glass transition temperature, (Tg), was observed with an onset of 72.4 C, a midpoint of 75.1 C, and an endpoint of 77.9 C. A crystalline melting temperature, (Tm), was observed at a temperature of 224.8 C, (26.2 J/g).

Example 3 demonstrates the thermal properties of the sulfonated aromatic copolyesters Example 3, which represents the present invention, was found to have a 28 degree C. improvement in the glass transition temperature and a 24 degree C. improvement in the crystalline melting point temperature over that of materials such as are prepared according to Comparative Example CE 3.

Comparative Example CE 4

To a 250 milliliter glass flask was added bis(2-hydroxyethyl)terephthalate, (149.49 grams), poly(caprolactone), (38.81 grams), dimethyl 5-sulfoisophthalate, sodium salt, (3.55 grams), sodium acetate, (0.18 grams), manganese(II) acetate tetrahydrate, (0.0573 grams), and antimony(III) trioxide, (0.0478 grams). The reaction mixture was stirred and heated to 180 C under a slow nitrogen purge. After achieving 180 C, the reaction mixture was stirred at 180 C for 0.5 hours under a slow nitrogen purge. The reaction mixture was then heated to 240 C over 0.3 hours with stirring. After achieving 240 C, the reaction mixture was stirred at 240 C for 0.7 hours under a slow nitrogen purge. The reaction mixture was then heated to 255 C over 0.1 hours with stirring under a slight nitrogen purge. The reaction mixture was stirred at 255 C for 1.3 hours under a slight nitrogen purge. 2.3 grams of a colorless distillate was collected over this heating cycle. The reaction mixture was then staged to full vacuum with stirring at 255 C. The resulting reaction mixture was stirred for 3.2 hours under full vacuum, (pressure less than 100 mtorr). The vacuum was then released with nitrogen and the reaction mass allowed to cool to room temperature. An additional 39.6 grams of distillate was recovered and 113.6 grams of a solid product was recovered. The sample was measured for laboratory relative viscosity, (LRV), as described above and was found to have an LRV of 23.61. This sample was calculated to have an inherent viscosity of 0.67 dL/g. The sample underwent differential scanning calorimetry, (DSC), analysis. A glass transition temperature, (Tg), was observed with an onset of 28.6 C, a midpoint of 31.5 C, and an endpoint of 34.5 C. A crystalline melting temperature, (Tm), was observed at 174.8 C, (1.6 J/g).

Example 4

To a 250 milliliter glass flask was added bis(2-hydroxyethyl)terephthalate, (149.49 grams), poly(lactide), (24.51 grams), dimethyl 5-sulfoisophthalate, sodium salt, (3.55 grams), sodium acetate, (0.18 grams), manganese(II) acetate tetrahydrate, (0.0580 grams), and antimony(III) trioxide, (0.0480 grams). The reaction mixture was stirred and heated to 180 C under a slow nitrogen purge. After achieving 180 C, the reaction mixture was stirred at 180 C for 0.5 hours under a slow nitrogen purge. The reaction mixture was then heated to 240 C over 0.3 hours with stirring. After achieving 240 C, the reaction mixture was stirred at 240 C for 0.7 hours under a slow nitrogen purge. The reaction mixture was then heated to 255 C over 0.2 hours with stirring under a slight nitrogen purge. The reaction mixture was stirred at 255 C for 1.1 hours under a slight nitrogen purge. 2.2 grams of a colorless distillate was collected over this heating cycle. The reaction mixture was then staged to full vacuum with stirring at 255 C. The resulting reaction mixture was stirred for 2.6 hours under full vacuum, (pressure less than 100 mtorr). The vacuum was then released with nitrogen and the reaction mass allowed to cool to room temperature. An additional 45.1 grams of distillate was recovered and 89.9 grams of a solid product was recovered. The sample was measured for laboratory relative viscosity, (LRV), as described above and was found to have an LRV of 15.59. This sample was calculated to have an inherent viscosity of 0.53 dL/g. The sample underwent differential scanning calorimetry, (DSC), analysis. A glass transition temperature, (Tg), was observed with an onset of 73.7 C, a midpoint of 76.2 C, and an endpoint of 78.8 C. A crystalline melting temperature, (Tm), was observed at 221.9 C, (20.8 J/g).

Example 4 demonstrates the thermal properties of the sulfonated aromatic copolyesters Example 4, which represents the present invention, was found to have a 45 degree C. improvement in the glass transition temperature, a 47 degree C. improvement in the crystalline melting point temperature, and thirteen times the crystallinity of materials such as that prepared according to Comparative Example CE 4.

Example 5

To a 250 milliliter glass flask was added bis(2-hydroxyethyl)terephthalate, (175.15 grams), lactic acid, (85 weight percent aqueous solution, 12.77 grams), dimethyl 5-sulfoisophthalate, sodium salt, (3.30 grams), sodium acetate, (0.20 grams), ethylene glycol, (26.34 grams), manganese(II) acetate tetrahydrate, (0.0665 grams), and antimony(III) trioxide, (0.0528 grams). The reaction mixture was stirred and heated to 180 C under a slow nitrogen purge. After achieving 180 C, the reaction mixture was stirred at 180 C for 1.0 hours under a slow nitrogen purge. The reaction mixture was then heated to 240 C over 0.2 hours with stirring. After achieving 240 C, the reaction mixture was stirred at 240 C for 0.5 hours under a slow nitrogen purge. The reaction mixture was then heated to 255 C over 0.1 hours with stirring under a slight nitrogen purge. The reaction mixture was stirred at 255 C for 0.5 hours under a slight nitrogen purge. 32.5 grams of a colorless distillate was collected over this heating cycle. The reaction mixture was then staged to full vacuum with stirring at 255 C. The resulting reaction mixture was stirred for 2.4 hours under full vacuum, (pressure less than 100 mtorr). The vacuum was then released with nitrogen and the reaction mass allowed to cool to room temperature. An additional 43.6 grams of distillate was recovered and 116.4 grams of a solid product was recovered. The sample was measured for laboratory relative viscosity, (LRV), as described above and was found to have an LRV of 13.11. This sample was calculated to have an inherent viscosity of 0.48 dL/g. The sample underwent differential scanning calorimetry, (DSC), analysis. A glass transition temperature, (Tg), was observed with an onset of 76.1 C, a midpoint of 81.8 C, and an endpoint of 87.4 C. A crystalline melting temperature, (Tm), was observed at 247.7 C, (33.8 J/g).

Example 5 demonstrates the thermal properties of the sulfonated aromatic copolyesters Example 5, which represents the present invention, was found to have a 71 degree C. improvement in the crystalline melting point temperature over that of conventional materials such as those prepared according to U.S. Pat. No. 6,018,004, Example 9.

Example 6

To a 250 milliliter glass flask was added bis(2-hydroxyethyl)terephthalate, (164.4 grams), lactic acid, (85 weight percent aqueous solution, 23.3 grams), dimethyl 5-sulfoisophthalate, sodium salt, (3.91 grams), sodium acetate, (0.24 grams), ethylene glycol, (27.31 grams), tris(2-hydroxyethyl)trimellitate, (0.23 grams), manganese(II) acetate tetrahydrate, (0.0730 grams), and antimony(III) trioxide, (0.0592 grams). The reaction mixture was stirred and heated to 180 C under a slow nitrogen purge. After achieving 180 C, the reaction mixture was stirred at 180 C for 1.2 hours under a slow nitrogen purge. The reaction mixture was then heated to 240 C over 0.5 hours with stirring. After achieving 240 C, the reaction mixture was stirred at 240 C for 0.8 hours under a slow nitrogen purge. The reaction mixture was then heated to 255 C over 0.3 hours with stirring under a slight nitrogen purge. The reaction mixture was stirred at 255 C for 1.0 hour under a slight nitrogen purge. 38.4 grams of a colorless distillate was collected over this heating cycle. The reaction mixture was then staged to full vacuum with stirring at 255 C. The resulting reaction mixture was stirred for 2.4 hours under full vacuum, (pressure less than 100 mtorr). The vacuum was then released with nitrogen and the reaction mass allowed to cool to room temperature. An additional 42.7 grams of distillate was recovered and 117.0 grams of a solid product was recovered. The sample was measured for laboratory relative viscosity, (LRV), as described above and was found to have an LRV of 13.93. This sample was calculated to have an inherent viscosity of 0.50 dL/g. The sample underwent differential scanning calorimetry, (DSC), analysis. A glass transition temperature, (Tg), was observed with an onset of 32.2 C, a midpoint of 34.7 C, and an endpoint of 37.2 C. A crystalline melting temperature, (Tm), was observed at 183.9 C, (4.5 J/g).

The sample was ground into powder and tested for biodegradation, as described above. This sample was found to biodegrade 0.7 percent within 13.6 days under these test conditions.

Pressed films were produced from the material prepared above on a Sargent hydraulic melt press, (W. H. Sargent & Company, Chicago, USA). Approximately 0.5 grams of the material prepared above was placed between two sheets of Armalon® cloth with a 0.001 inch thick brass shim. This construct was placed between the hydraulic melt press platens heated to a temperature of 250 C+/−5 C. The platens were closed without pressure for 10-15 seconds and then the pressure was slowly raised to 3000-4000 psi. The pressure was held there for 15 seconds and then the pressure was released, the sample removed from the hydraulic press and the film was quenched in cold water. The films were found to be clear and flexible.

Example 7

To a 250 milliliter glass flask was added bis(2-hydroxyethyl)terephthalate, (149.49 grams), lactic acid, (85 weight percent aqueous solution, 27.34 grams), dimethyl 5-sulfoisophthalate, sodium salt, (3.55 grams), sodium acetate, (0.23 grams), ethylene glycol, (24.83 grams), tris(2-hydroxyethyl)trimellitate, (0.21 grams), manganese(II) acetate tetrahydrate, (0.0664 grams), and antimony(III) trioxide, (0.0534 grams). The reaction mixture was stirred and heated to 180 C under a slow nitrogen purge. After achieving 180 C, the reaction mixture was stirred at 180 C for 1.1 hours under a slow nitrogen purge. The reaction mixture was then heated to 240 C over 0.4 hours with stirring. After achieving 240 C, the reaction mixture was stirred at 240 C for 0.3 hours under a slow nitrogen purge. The reaction mixture was then heated to 255 C over 0.1 hours with stirring under a slight nitrogen purge. The reaction mixture was stirred at 255 C for 0.9 hours under a slight nitrogen purge. 30.1 grams of a colorless distillate was collected over this heating cycle. The reaction mixture was then staged to full vacuum with stirring at 255 C. The resulting reaction mixture was stirred for 3.5 hours under full vacuum, (pressure less than 100 mtorr). The vacuum was then released with nitrogen and the reaction mass allowed to cool to room temperature. An additional 46.3 grams of distillate was recovered and 104.0 grams of a solid product was recovered. The sample was measured for laboratory relative viscosity, (LRV), as described above and was found to have an LRV of 13.62. This sample was calculated to have an inherent viscosity of 0.49 dL/g. The sample underwent differential scanning calorimetry, (DSC), analysis. A glass transition temperature, (Tg), was observed with an onset of 71.7 C, a midpoint of 75.4 C, and an endpoint of 78.9 C. A crystalline melting temperature, (Tm), was observed at 230.0 C, (28.1 J/g).

The sample was ground into powder and tested for biodegradation, as described above. This sample was found to biodegrade 0.9 percent within 13.6 days under these test conditions.

Pressed films were produced from the material prepared above on a Sargent hydraulic melt press, (W. H. Sargent & Company, Chicago, USA). Approximately 0.5 grams of the material prepared above was placed between two sheets of Armalon® cloth with a 0.001 inch thick brass shim. This construct was placed between the hydraulic melt press platens heated to a temperature of 250 C+/−5 C. The platens were closed without pressure for 10-15 seconds and then the pressure was slowly raised to 3000-4000 psi. The pressure was held there for 15 seconds and then the pressure was released, the sample removed from the hydraulic press and the film was quenched in cold water. The films were found to be clear and flexible.

Example 8

To a 250 milliliter glass flask was added bis(2-hydroxyethyl)terephthalate, (139.35 grams), lactic acid, (85 weight percent aqueous solution, 27.69 grams), dimethyl 5-sulfoisophthalate, sodium salt, (3.30 grams), sodium acetate, (0.20 grams), ethylene glycol, (26.34 grams), manganese(II) acetate tetrahydrate, (0.0631 grams), and antimony(III) trioxide, (0.0508 grams). The reaction mixture was stirred and heated to 180 C under a slow nitrogen purge. After achieving 180 C, the reaction mixture was stirred at 180 C for 1.1 hours under a slow nitrogen purge. The reaction mixture was then heated to 240 C over 0.9 hours with stirring. After achieving 240 C, the reaction mixture was stirred at 240 C for 0.6 hours under a slow nitrogen purge. The reaction mixture was then heated to 255 C over 0.3 hours with stirring under a slight nitrogen purge. The reaction mixture was stirred at 255 C for 0.5 hours under a slight nitrogen purge. 42.6 grams of a colorless distillate was collected over this heating cycle. The reaction mixture was then staged to full vacuum with stirring at 255 C. The resulting reaction mixture was stirred for 2.3 hours under full vacuum, (pressure less than 100 mtorr). The vacuum was then released with nitrogen and the reaction mass allowed to cool to room temperature. An additional 38.3 grams of distillate was recovered and 89.6 grams of a solid product was recovered. The sample was measured for laboratory relative viscosity, (LRV), as described above and was found to have an LRV of 14.12. This sample was calculated to have an inherent viscosity of 0.50 dL/g. The sample underwent differential scanning calorimetry, (DSC), analysis. A glass transition temperature, (Tg), was observed with an onset of 77.5 C, a midpoint of 78.6 C, and an endpoint of 79.8 C. A crystalline melting temperature, (Tm), was observed at 231.3 C, (27.9 J/g).

Example 8 demonstrates the thermal properties of the sulfonated aromatic copolyesters Example 8, which represents the present invention, was found to have a 55 degree C. improvement in the crystalline melting point temperature over that of conventional materials, such as those prepared according to U.S. Pat. No. 6,018,004, Example 9.

Example 9

To a 250 milliliter glass flask was added bis(2-hydroxyethyl)terephthalate, (149.49 grams), lactic acid, (85 weight percent aqueous solution, 34.34 grams), dimethyl 5-sulfoisophthalate, sodium salt, (3.55 grams), sodium acetate, (0.22 grams), ethylene glycol, (24.83 grams), tris(2-hydroxyethyl)trimellitate, (0.21 grams), manganese(II) acetate tetrahydrate, (0.0680 grams), and antimony(III) trioxide, (0.0540 grams). The reaction mixture was stirred and heated to 180 C under a slow nitrogen purge. After achieving 180 C, the reaction mixture was stirred at 180 C for 1.0 hour under a slow nitrogen purge. The reaction mixture was then heated to 240 C over 0.3 hours with stirring. After achieving 240 C, the reaction mixture was stirred at 240 C for 0.7 hours under a slow nitrogen purge. 12.4 grams of a colorless distillate was collected over this heating cycle. The reaction mixture was then staged to full vacuum with stirring at 240 C. The resulting reaction mixture was stirred for 4.2 hours under full vacuum, (pressure less than 100 mtorr). The vacuum was then released with nitrogen and the reaction mass allowed to cool to room temperature. An additional 68.3 grams of distillate was recovered and 92.4 grams of a solid product was recovered. The sample was measured for laboratory relative viscosity, (LRV), as described above and was found to have an LRV of 8.11. This sample was calculated to have an inherent viscosity of 0.39 dL/g. The sample underwent differential scanning calorimetry, (DSC), analysis. A glass transition temperature, (Tg), was observed with an onset of 68.1 C, a midpoint of 71.5 C, and an endpoint of 74.9 C. A crystalline melting temperature, (Tm), was observed at 220.5 C, (27.4 J/g).

Comparative Example CE 5

To a 250 milliliter glass flask was added bis(2-hydroxyethyl)terephthalate, (149.49 grams), dimethyl adipate, (56.44 grams), dimethyl 5-sulfoisophthalate, sodium salt, (3.55 grams), sodium acetate, (0.22 grams), ethylene glycol, (24.83 grams), tris(2-hydroxyethyl)trimellitate, (0.21 grams), manganese(II) acetate tetrahydrate, (0.0664 grams), and antimony(III) trioxide, (0.0534 grams). The reaction mixture was stirred and heated to 180 C under a slow nitrogen purge. After achieving 180 C, the reaction mixture was stirred at 180 C for 1.1 hours under a slow nitrogen purge. The reaction mixture was then heated to 240 C over 0.6 hours with stirring. After achieving 240 C, the reaction mixture was stirred at 240 C for 0.5 hours under a slow nitrogen purge. The reaction mixture was then heated to 255 C over 0.3 hours with stirring under a slight nitrogen purge. The reaction mixture was stirred at 255 C for 0.7 hours under a slight nitrogen purge. 50.6 grams of a colorless distillate was collected over this heating cycle. The reaction mixture was then staged to full vacuum with stirring at 255 C. The resulting reaction mixture was stirred for 4.0 hours under full vacuum, (pressure less than 100 mtorr). The vacuum was then released with nitrogen and the reaction mass allowed to cool to room temperature. An additional 25.8 grams of distillate was recovered and 140.7 grams of a solid product was recovered. The sample was measured for laboratory relative viscosity, (LRV), as described above and was found to have an LRV of 18.54. This sample was calculated to have an inherent viscosity of 0.58 dL/g. The sample underwent differential scanning calorimetry, (DSC), analysis. A glass transition temperature, (Tg), was observed with an onset of 30.4 C, a midpoint of 33.4 C, and an endpoint of 36.3 C. A crystalline melting temperature, (Tm), was observed at 192.0 C, (17.5 J/g).

Comparative Example CE 6

To a 250 milliliter glass flask was added bis(2-hydroxyethyl)terephthalate, (152.54 grams), lactic acid, (85 weight percent aqueous solution, 34.34 grams), ethylene glycol, (24.83 grams), tris(2-hydroxyethyl)trimellitate, (0.21 grams), manganese(II) acetate tetrahydrate, (0.0701 grams), and antimony(III) trioxide, (0.0534 grams). The reaction mixture was stirred and heated to 180 C under a slow nitrogen purge. After achieving 180 C, the reaction mixture was stirred at 180 C for 1.0 hour under a slow nitrogen purge. The reaction mixture was then heated to 240 C over 0.4 hours with stirring. After achieving 240 C, the reaction mixture was stirred at 240 C for 0.8 hours under a slow nitrogen purge. The reaction mixture was then heated to 255 C over 0.3 hours with stirring under a slight nitrogen purge. The reaction mixture was stirred at 255 C for 0.7 hours under a slight nitrogen purge. 36.3 grams of a colorless distillate was collected over this heating cycle. The reaction mixture was then staged to full vacuum with stirring at 255 C. The resulting reaction mixture was stirred for 2.8 hours under full vacuum, (pressure less than 100 mtorr). The vacuum was then released with nitrogen and the reaction mass allowed to cool to room temperature. An additional 50.1 grams of distillate was recovered and 95.9 grams of a solid product was recovered. The sample was measured for laboratory relative viscosity, (LRV), as described above and was found to have an LRV of 21.30. This sample was calculated to have an inherent viscosity of 0.63 dL/g. The sample underwent differential scanning calorimetry, (DSC), analysis. A glass transition temperature, (Tg), was observed with an onset of 72.1 C, a midpoint of 75.5 C, and an endpoint of 78.8 C. A crystalline melting temperature, (Tm), was observed at 228.6 C, (28.9 J/g).

The sample was ground into powder and tested for biodegradation, as described above. This sample was found to biodegrade 0.2 percent within 13.6 days under these test conditions.

Example 10

To a 250 milliliter glass flask was added bis(2-hydroxyethyl)terephthalate, (149.49 grams), lactic acid, (85 weight percent aqueous solution, 35.00 grams), dimethyl 5-sulfoisophthalate, sodium salt, (3.55 grams), sodium acetate, (0.21 grams), ethylene glycol, (24.83 grams), tris(2-hydroxyethyl)trimellitate, (0.21 grams), manganese(II) acetate tetrahydrate, (0.0664 grams), and antimony(III) trioxide, (0.0615 grams). The reaction mixture was stirred and heated to 180 C under a slow nitrogen purge. After achieving 180 C, the reaction mixture was stirred at 180 C for 0.9 hours under a slow nitrogen purge. The reaction mixture was then heated to 240 C over 0.3 hours with stirring. After achieving 240 C, the reaction mixture was stirred at 240 C for 0.6 hours under a slow nitrogen purge. The reaction mixture was then heated to 255 C over 0.1 hours with stirring under a slight nitrogen purge. The reaction mixture was stirred at 255 C for 0.7 hours under a slight nitrogen purge. 31.4 grams of a colorless distillate was collected over this heating cycle. The reaction mixture was then staged to full vacuum with stirring at 255 C. The resulting reaction mixture was stirred for 2.7 hours under full vacuum, (pressure less than 100 mtorr). The vacuum was then released with nitrogen and the reaction mass allowed to cool to room temperature. An additional 51.3 grams of distillate was recovered and 96.0 grams of a solid product was recovered. The sample was measured for laboratory relative viscosity, (LRV), as described above and was found to have an LRV of 15.41. This sample was calculated to have an inherent viscosity of 0.52 dL/g. The sample underwent differential scanning calorimetry, (DSC), analysis. A glass transition temperature, (Tg), was observed with an onset of 71.2 C, a midpoint of 73.3 C, and an endpoint of 75.6 C. A crystalline melting temperature, (Tm), was observed at 220.9 C, (24.3 J/g).

Example 10 demonstrates the thermal properties of the sulfonated aromatic copolyesters Example 10, which represents the present invention, was found to have a 40 degree C. improvement in the glass transition temperature and a 29 degree C. improvement in the crystalline melting point temperature over that of materials such as that prepared according to Comparative Example CE 5.

The sample was ground into powder and tested for biodegradation, as described above. This sample was found to biodegrade 6.2 percent within 13.6 days under these test conditions.

Pressed films were produced from the material prepared above on a Sargent hydraulic melt press, (W. H. Sargent & Company, Chicago, USA). Approximately 0.5 grams of the material prepared above was placed between two sheets of Armalon® cloth with a 0.001 inch thick brass shim. This construct was placed between the hydraulic melt press platens heated to a temperature of 250 C+/−5 C. The platens were closed without pressure for 10-15 seconds and then the pressure was slowly raised to 3000-4000 psi. The pressure was held there for 15 seconds and then the pressure was released, the sample removed from the hydraulic press and the film was quenched in cold water. The films were found to be clear and flexible.

Example 11

To a 250 milliliter glass flask was added bis(2-hydroxyethyl)terephthalate, (149.49 grams), lactic acid, (85 weight percent aqueous solution, 34.34 grams), dimethyl 5-sulfoisophthalate, sodium salt, (3.55 grams), sodium acetate, (0.22 grams), ethylene glycol, (24.83 grams), tris(2-hydroxyethyl)trimellitate, (0.21 grams), manganese(II) acetate tetrahydrate, (0.0697 grams), and antimony(III) trioxide, (0.0541 grams). The reaction mixture was stirred and heated to 180 C under a slow nitrogen purge. After achieving 180 C, the reaction mixture was stirred at 180 C for 1.2 hours under a slow nitrogen purge. The reaction mixture was then heated to 240 C over 0.2 hours with stirring. After achieving 240 C, the reaction mixture was stirred at 240 C for 0.8 hours under a slow nitrogen purge. The reaction mixture was then heated to 255 C over 0.2 hours with stirring under a slight nitrogen purge. The reaction mixture was stirred at 255 C for 0.7 hours under a slight nitrogen purge. 29.3 grams of a colorless distillate was collected over this heating cycle. The reaction mixture was then staged to full vacuum with stirring at 255 C. The resulting reaction mixture was stirred for 3.1 hours under full vacuum, (pressure less than 100 mtorr). The vacuum was then released with nitrogen and the reaction mass allowed to cool to room temperature. An additional 51.8 grams of distillate was recovered and 103.8 grams of a solid product was recovered. The sample was measured for laboratory relative viscosity, (LRV), as described above and was found to have an LRV of 13.03. This sample was calculated to have an inherent viscosity of 0.48 dL/g. The sample underwent differential scanning calorimetry, (DSC), analysis. A glass transition temperature, (Tg), was observed with an onset of 68.6 C, a midpoint of 71.0 C, and an endpoint of 73.1 C. A crystalline melting temperature, (Tm), was observed at 224.5 C, (31.6 J/g).

Example 12

To a 250 milliliter glass flask was added bis(2-hydroxyethyl)terephthalate, (149.49 grams), lactic acid, (85 weight percent aqueous solution, 34.34 grams), dimethyl 5-sulfoisophthalate, sodium salt, (3.55 grams), sodium acetate, (0.20 grams), ethylene glycol, (24.83 grams), tris(2-hydroxyethyl)trimellitate, (0.21 grams), manganese(II) acetate tetrahydrate, (0.0692 grams), and antimony(III) trioxide, (0.0581 grams). The reaction mixture was stirred and heated to 180 C under a slow nitrogen purge. After achieving 180 C, the reaction mixture was stirred at 180 C for 0.9 hours under a slow nitrogen purge. The reaction mixture was then heated to 240 C over 0.4 hours with stirring. After achieving 240 C, the reaction mixture was stirred at 240 C for 0.6 hours under a slow nitrogen purge. The reaction mixture was then heated to 255 C over 0.1 hours with stirring under a slight nitrogen purge. The reaction mixture was stirred at 255 C for 3.4 hours under a slight nitrogen purge. 34.8 grams of a colorless distillate was collected over this heating cycle. The reaction mass allowed to cool to room temperature and 187.0 grams of a solid product was recovered. The sample was measured for laboratory relative viscosity, (LRV), as described above and was found to have an LRV of 1.78. This sample was calculated to have an inherent viscosity of 0.28 dL/g. The sample underwent differential scanning calorimetry, (DSC), analysis. A glass transition temperature, (Tg), was observed with an onset of 68.8 C, a midpoint of 72.0 C, and an endpoint of 75.3 C. A crystalline melting temperature, (Tm), was observed at 219.0 C, (9.4 J/g).

Example 13

To a 250 milliliter glass flask was added bis(2-hydroxyethyl)terephthalate, (149.49 grams), lactic acid, (85 weight percent aqueous solution, 34.34 grams), dimethyl 5-sulfoisophthalate, sodium salt, (3.55 grams), sodium acetate, (0.20 grams), ethylene glycol, (20.11 grams), tris(2-hydroxyethyl)trimellitate, (0.19 grams), manganese(II) acetate tetrahydrate, (0.0624 grams), antimony(III) trioxide, (0.0502 grams), tin(II) 2-ethylhexanoate, (0.0954 grams), and sodium hypophosphite hydrate, (0.0224 grams). The reaction mixture was stirred and heated to 180 C under a slow nitrogen purge. After achieving 180 C, the reaction mixture was stirred at 180 C for 1.0 hour under a slow nitrogen purge. The reaction mixture was then heated to 240 C over 0.9 hours with stirring. After achieving 240 C, the reaction mixture was stirred at 240 C for 0.7 hours under a slow nitrogen purge. The reaction mixture was then heated to 255 C over 0.3 hours with stirring under a slight nitrogen purge. The reaction mixture was stirred at 255 C for 0.5 hours under a slight nitrogen purge. 24.1 grams of a colorless distillate was collected over this heating cycle. The reaction mixture was then staged to full vacuum with stirring at 255 C. The resulting reaction mixture was stirred for 1.7 hours under full vacuum, (pressure less than 100 mtorr). The vacuum was then released with nitrogen and the reaction mass allowed to cool to room temperature. An additional 54.6 grams of distillate was recovered and 97.4 grams of a solid product was recovered. The sample was measured for laboratory relative viscosity, (LRV), as described above and was found to have an LRV of 14.00. This sample was calculated to have an inherent viscosity of 0.50 dL/g. The sample underwent differential scanning calorimetry, (DSC), analysis. A glass transition temperature, (Tg), was observed with an onset of 77.4 C, a midpoint of 78.6 C, and an endpoint of 79.8 C. A crystalline melting temperature, (Tm), was observed at 225.5 C, (15.5 J/g).

Example 14

To a 250 milliliter glass flask was added bis(2-hydroxyethyl)terephthalate, (149.49 grams), lactic acid, (85 weight percent aqueous solution, 42.39 grams), dimethyl 5-sulfoisophthalate, sodium salt, (3.55 grams), sodium acetate, (0.22 grams), ethylene glycol, (24.83 grams), tris(2-hydroxyethyl)trimellitate, (0.58 grams), and Tyzor® PEL-G, (8.2 weight percent titanium, 0.0594 grams). The reaction mixture was stirred and heated to 180 C under a slow nitrogen purge. After achieving 180 C, the reaction mixture was stirred at 180 C for 1.2 hours under a slow nitrogen purge. The reaction mixture was then heated to 225 C over 0.7 hours with stirring. After achieving 225 C, the reaction mixture was stirred at 225 C for 0.3 hours under a slow nitrogen purge. The reaction mixture was then heated to 250 C over 0.7 hours with stirring under a slight nitrogen purge. The reaction mixture was stirred at 250 C for 0.6 hours under a slight nitrogen purge. 30.8 grams of a colorless distillate was collected over this heating cycle. The reaction mixture was then staged to full vacuum with stirring at 250 C. The resulting reaction mixture was stirred for 3.2 hours under full vacuum, (pressure less than 100 mtorr). The vacuum was then released with nitrogen and the reaction mass allowed to cool to room temperature. An additional 60.9 grams of distillate was recovered and 101.5 grams of a solid product was recovered. The sample was measured for laboratory relative viscosity, (LRV), as described above and was found to have an LRV of 15.55. This sample was calculated to have an inherent viscosity of 0.53 dL/g. The sample underwent differential scanning calorimetry, (DSC), analysis. A glass transition temperature, (Tg), was observed with an onset of 74.0 C, a midpoint of 75.6 C, and an endpoint of 77.1 C. A crystallization exotherm, (Tcryst), was observed at 160.0 C, (24.6 J/g). A crystalline melting temperature, (Tm), was observed at 220.8 C, (24.0 J/g).

Example 15

To a 250 milliliter glass flask was added bis(2-hydroxyethyl)terephthalate, (149.49 grams), lactic acid, (85 weight percent aqueous solution, 42.39 grams), dimethyl 5-sulfoisophthalate, sodium salt, (3.58 grams), sodium acetate, (0.22 grams), ethylene glycol, (24.83 grams), tris(2-hydroxyethyl)trimellitate, (0.21 grams), manganese(II) acetate tetrahydrate, (0.0686 grams), and antimony(III) trioxide, (0.0555 grams). The reaction mixture was stirred and heated to 180 C under a slow nitrogen purge. After achieving 180 C, the reaction mixture was stirred at 180 C for 1.0 hour under a slow nitrogen purge. The reaction mixture was then heated to 240 C over 0.4 hours with stirring. After achieving 240 C, the reaction mixture was stirred at 240 C for 0.5 hours under a slow nitrogen purge. The reaction mixture was then heated to 255 C over 0.1 hours with stirring under a slight nitrogen purge. The reaction mixture was stirred at 255 C for 0.9 hours under a slight nitrogen purge. 32.3 grams of a colorless distillate was collected over this heating cycle. The reaction mixture was then staged to full vacuum with stirring at 255 C. The resulting reaction mixture was stirred for 3.4 hours under full vacuum, (pressure less than 100 mtorr). The vacuum was then released with nitrogen and the reaction mass allowed to cool to room temperature. An additional 53.8 grams of distillate was recovered and 112.6 grams of a solid product was recovered. The sample was measured for laboratory relative viscosity, (LRV), as described above and was found to have an LRV of 14.28. This sample was calculated to have an inherent viscosity of 0.50 dL/g. The sample underwent differential scanning calorimetry, (DSC), analysis. A glass transition temperature, (Tg), was observed with an onset of 70.6 C, a midpoint of 72.8 C, and an endpoint of 75.1 C. A crystalline melting temperature, (Tm), was observed at 207.3 C, (17.5 J/g).

The sample was ground into powder and tested for biodegradation, as described above. This sample was found to biodegrade 4.6 percent within 13.6 days under these test conditions.

Pressed films were produced from the material prepared above on a Sargent hydraulic melt press, (W. H. Sargent & Company, Chicago, USA). Approximately 0.5 grams of the material prepared above was placed between two sheets of Armalon® cloth with a 0.001 inch thick brass shim. This construct was placed between the hydraulic melt press platens heated to a temperature of 250 C+/−5 C. The platens were closed without pressure for 10-15 seconds and then the pressure was slowly raised to 3000-4000 psi. The pressure was held there for 15 seconds and then the pressure was released, the sample removed from the hydraulic press and the film was quenched in cold water. The films were found to be clear and flexible.

Example 16

To a 250 milliliter glass flask was added bis(2-hydroxyethyl)terephthalate, (162.06 grams), lactic acid, (85 weight percent aqueous solution, 38.32 grams), dimethyl 5-sulfoisophthalate, sodium salt, (6.00 grams), sodium acetate, (0.22 grams), tris(2-hydroxyethyl)trimellitate, (0.27 grams), manganese(II) acetate tetrahydrate, (0.0942 grams), and antimony(III) trioxide, (0.0759 grams). The reaction mixture was stirred and heated to 180 C under a slow nitrogen purge. After achieving 180 C, the reaction mixture was heated to 200 C over 0.1 hours with stirring. After achieving 200 C, the reaction mixture was stirred at 200 C for 0.9 hours under a slow nitrogen purge. The reaction mixture was then heated to 275 C over 0.5 hours with stirring under a slight nitrogen purge. The reaction mixture was stirred at 275 C for 1.3 hours under a slight nitrogen purge. 24.4 grams of a colorless distillate was collected over this heating cycle. The reaction mixture was then staged to full vacuum with stirring at 275 C. The resulting reaction mixture was stirred for 1.6 hours under full vacuum, (pressure less than 100 mtorr). The vacuum was then released with nitrogen and the reaction mass allowed to cool to room temperature. An additional 36.1 grams of distillate was recovered and 129.1 grams of a solid product was recovered. The sample was measured for laboratory relative viscosity, (LRV), as described above and was found to have an LRV of 15.62. This sample was calculated to have an inherent viscosity of 0.53 dL/g. The sample underwent differential scanning calorimetry, (DSC), analysis. A glass transition temperature, (Tg), was observed with an onset of 69.7 C, a midpoint of 72.0 C, and an endpoint of 74.4 C. A crystalline melting temperature, (Tm), was observed at 215.5 C, (16.3 J/g).

Example 17

To a 250 milliliter glass flask was added bis(2-hydroxyethyl)terephthalate, (123.48 grams), lactic acid, (85 weight percent aqueous solution, 53.61 grams), dimethyl 5-sulfoisophthalate, sodium salt, (6.00 grams), sodium acetate, (0.19 grams), tris(2-hydroxyethyl)trimellitate, (0.27 grams), manganese(II) acetate tetrahydrate, (0.0942 grams), and antimony(III) trioxide, (0.0759 grams). The reaction mixture was stirred and heated to 180 C under a slow nitrogen purge. After achieving 180 C, the reaction mixture was heated to 200 C over 0.4 hours with stirring. After achieving 200 C, the reaction mixture was stirred at 200 C for 1.0 hour under a slow nitrogen purge. The reaction mixture was then heated to 275 C over 1.1 hours with stirring under a slight nitrogen purge. The reaction mixture was stirred at 275 C for 1.0 hour under a slight nitrogen purge. 29.5 grams of a colorless distillate was collected over this heating cycle. The reaction mixture was then staged to full vacuum with stirring at 275 C. The resulting reaction mixture was stirred for 2.1 hours under full vacuum, (pressure less than 100 mtorr). The vacuum was then released with nitrogen and the reaction mass allowed to cool to room temperature. An additional 37.6 grams of distillate was recovered and 109.9 grams of a solid product was recovered. The sample was measured for laboratory relative viscosity, (LRV), as described above and was found to have an LRV of 15.05. This sample was calculated to have an inherent viscosity of 0.52 dL/g. The sample underwent differential scanning calorimetry, (DSC), analysis. A glass transition temperature, (Tg), was observed with an onset of 61.4 C, a midpoint of 63.9 C, and an endpoint of 66.6 C. A crystalline melting temperature, (Tm), was not observed up to a temperature of 300 C.

Example 18

To a 250 milliliter glass flask was added bis(2-hydroxyethyl)terephthalate, (124.58 grams), lactic acid, (85 weight percent aqueous solution, 45.04 grams), dimethyl 5-sulfoisophthalate, sodium salt, (2.96 grams), sodium acetate, (0.19 grams), ethylene glycol, (31.04 grams), manganese(II) acetate tetrahydrate, (0.0594 grams), and antimony(III) trioxide, (0.0480 grams). The reaction mixture was stirred and heated to 180 C under a slow nitrogen purge. After achieving 180 C, the reaction mixture was stirred at 180 C for 1.0 hour under a slight nitrogen purge. The reaction mixture was then heated to 255 C over 1.1 hours with stirring. After achieving 255 C, the reaction mixture was stirred at 255 C for 0.5 hours under a slow nitrogen purge. 41.3 grams of a colorless distillate was collected over this heating cycle. The reaction mixture was then staged to full vacuum with stirring at 255 C. The resulting reaction mixture was stirred for 3.0 hours under full vacuum, (pressure less than 100 mtorr). The vacuum was then released with nitrogen and the reaction mass allowed to cool to room temperature. An additional 55.2 grams of distillate was recovered and 91.2 grams of a solid, tan product was recovered. The sample was measured for laboratory relative viscosity, (LRV), as described above and was found to have an LRV of 13.69. This sample was calculated to have an inherent viscosity of 0.49 dL/g. The sample underwent differential scanning calorimetry, (DSC), analysis. A glass transition temperature, (Tg), was observed with an onset of 72.8 C, a midpoint of 75.0 C, and an endpoint of 77.2 C. A crystalline melting temperature, (Tm), was observed at a temperature of 215.2 C, (13.6 J/g).

Example 19

To a 250 milliliter glass flask was added bis(2-hydroxyethyl)terephthalate, (124.58 grams), lactic acid, (85 weight percent aqueous solution, 45.04 grams), dimethyl 5-sulfoisophthalate, sodium salt, (2.96 grams), sodium acetate, (0.19 grams), ethylene glycol, (31.04 grams), 2,2'-ethylidenebis(4,6-di-tert-butylphenyl)fluorophosphite, (0.0487 grams), manganese(II) acetate tetrahydrate, (0.0594 grams), and antimony(III) trioxide, (0.0480 grams). The reaction mixture was stirred and heated to 180 C under a slow nitrogen purge. After achieving 180 C, the reaction mixture was stirred at 180 C for 1.1 hours under a slight nitrogen purge. The reaction mixture was then heated to 225 C over 0.7 hours with stirring. After achieving 225 C, the reaction mixture was stirred at 225 C for 0.5 hours under a slight nitrogen purge. The reaction mixture was then heated to 255 C over 0.5 hours with stirring. After achieving 255 C, the reaction mixture was stirred at 255 C for 0.6 hours under a slow nitrogen purge. 41.5 grams of a colorless distillate was collected over this heating cycle. The reaction mixture was then staged to full vacuum with stirring at 255 C. The resulting reaction mixture was stirred for 2.5 hours under full vacuum, (pressure less than 100 mtorr). The vacuum was then released with nitrogen and the reaction mass allowed to cool to room temperature. An additional 54.9 grams of distillate was recovered and 91.0 grams of a solid, light tan product was recovered. The sample was measured for laboratory relative viscosity, (LRV), as described above and was found to have an LRV of 14.02. This sample was calculated to have an inherent viscosity of 0.50 dL/g. The sample underwent differential scanning calorimetry, (DSC), analysis. A glass transition temperature, (Tg), was observed with an onset of 73.5 C, a midpoint of 75.1 C, and an endpoint of 76.6 C. A crystalline melting temperature, (Tm), was observed at a temperature of 214.9 C, (15.0 J/g).

Example 20

To a 250 milliliter glass flask was added bis(2-hydroxyethyl)terephthalate, (124.58 grams), lactic acid, (85 weight percent aqueous solution, 45.04 grams), dimethyl 5-sulfoisophthalate, sodium salt, (2.96 grams), sodium acetate, (0.19 grams), ethylene glycol, (32.00 grams), tris(2,4-di-tert-butylphenyl)phosphite, (0.0677 grams), manganese(II) acetate tetrahydrate, (0.0596 grams), and antimony(III) trioxide, (0.0518 grams). The reaction mixture was stirred and heated to 180 C under a slow nitrogen purge. After achieving 180 C, the reaction mixture was stirred at 180 C for 0.3 hours under a slight nitrogen purge. The reaction mixture was then heated to 225 C over 0.3 hours with stirring. After achieving 225 C, the reaction mixture was stirred at 225 C for 0.7 hours under a slight nitrogen purge. The reaction mixture was then heated to 255 C over 0.3 hours with stirring. After achieving 255 C, the reaction mixture was stirred at 255 C for 0.9 hours under a slow nitrogen purge. 24.8 grams of a colorless distillate was collected over this heating cycle. The reaction mixture was then staged to full vacuum with stirring at 255 C. The resulting reaction mixture was stirred for 2.8 hours under full vacuum, (pressure less than 100 mtorr). The vacuum was then released with nitrogen and the reaction mass allowed to cool to room temperature. An additional 69.6 grams of distillate was recovered and 85.3 grams of a solid, light tan product was recovered. The sample was measured for laboratory relative viscosity, (LRV), as described above and was found to have an LRV of 14.51. This sample was calculated to have an inherent viscosity of 0.51 dL/g. The sample underwent differential scanning calorimetry, (DSC), analysis. A glass transition temperature, (Tg), was observed with an onset of 72.2 C, a midpoint of 75.0 C, and an endpoint of 77.8 C. A crystalline melting temperature, (Tm), was observed at a temperature of 214.2 C, (7.5 J/g).

Example 21

To a 250 milliliter glass flask was added bis(2-hydroxyethyl)terephthalate, (124.58 grams), lactic acid, (85 weight percent aqueous solution, 45.04 grams), dimethyl 5-sulfoisophthalate, sodium salt, (2.96 grams), sodium acetate, (0.19 grams), ethylene glycol, (31.04 grams), 3,9-bis(2,4-dicumylphenoxy)2,4,8,10-tetraoxa-3,9-diphosphaspiro{5.5] undecane, (0.0884 grams), manganese(II) acetate tetrahydrate, (0.0608 grams), and antimony(III) trioxide, (0.0486 grams). The reaction mixture was stirred and heated to 180 C under a slow nitrogen purge. After achieving 180 C, the reaction mixture was stirred at 180 C for 0.1 hours under a slight nitrogen purge. The reaction mixture was then heated to 225 C over 0.2 hours with stirring. After achieving 225 C, the reaction mixture was stirred at 225 C for 1.1 hours under a slight nitrogen purge. The reaction mixture was then heated to 255 C over 0.5 hours with stirring. After achieving 255 C, the reaction mixture was stirred at 255 C for 0.8 hours under a slow nitrogen purge. 34.9 grams of a colorless distillate was collected over this heating cycle. The reaction mixture was then staged to full vacuum with stirring at 255 C. The resulting reaction mixture was stirred for 2.7 hours under full vacuum, (pressure less than 100 mtorr). The vacuum was then released with nitrogen and the reaction mass allowed to cool to room temperature. An additional 56.1 grams of distillate was recovered and 88.4 grams of a solid, light tan product was recovered. The sample was measured for laboratory relative viscosity, (LRV), as described above and was found to have an LRV of 15.01. This sample was calculated to have an inherent viscosity of 0.52 dL/g. The sample underwent differential scanning calorimetry, (DSC), analysis. A glass transition temperature, (Tg), was observed with an onset of 70.8 C, a midpoint of 73.7 C, and an endpoint of 76.6 C. A crystalline melting temperature, (Tm), was observed at a temperature of 210.8 C, (6.4 J/g).

Example 22

To a 250 milliliter glass flask was added bis(2-hydroxyethyl)terephthalate, (124.58 grams), lactic acid, (85 weight percent aqueous solution, 45.04 grams), dimethyl 5-sulfoisophthalate, sodium salt, (2.96 grams), sodium acetate, (0.19 grams), ethylene glycol, (31.04 grams), 1,3,5-trimethyl-2,4,6-tris(3,5-di-tert-butyl-4-hydroxybenzyl)benzene, (0.13 grams), manganese(II) acetate tetrahydrate, (0.0594 grams), and antimony(III) trioxide, (0.0480 grams). The reaction mixture was stirred and heated to 180 C under a slow nitrogen purge. After achieving 180 C, the reaction mixture was stirred at 180 C for 1.1 hours under a slight nitrogen purge. The reaction mixture was then heated to 225 C over 1.0 hour with stirring. After achieving 225 C, the reaction mixture was stirred at 225 C for 0.5 hours under a slight nitrogen purge. The reaction mixture was then heated to 255 C over 1.1 hours with stirring. After achieving 255 C, the reaction mixture was stirred at 255 C for 0.6 hours under a slow nitrogen purge. 32.4 grams of a colorless distillate was collected over this heating cycle. The reaction mixture was then staged to full vacuum with stirring at 255 C. The resulting reaction mixture was stirred for 2.7 hours under full vacuum, (pressure less than 100 mtorr). The vacuum was then released with nitrogen and the reaction mass allowed to cool to room temperature. An additional 52.8 grams of distillate was recovered and 91.2 grams of a solid, light tan product was recovered. The sample was measured for laboratory relative viscosity, (LRV), as described above and was found to have an LRV of 14.36. This sample was calculated to have an inherent viscosity of 0.51 dL/g. The sample underwent differential scanning calorimetry, (DSC), analysis. A glass transition temperature, (Tg), was observed with an onset of 73.0 C, a midpoint of 74.8 C, and an endpoint of 76.5 C. A crystalline melting temperature, (Tm), was observed at a temperature of 210.8 C, (15.2 J/g).

Example 23

To a 250 milliliter glass flask was added bis(2-hydroxyethyl)terephthalate, (124.58 grams), lactic acid, (85 weight percent aqueous solution, 45.04 grams), dimethyl 5-sulfoisophthalate, sodium salt, (2.96 grams), sodium acetate, (0.19 grams), ethylene glycol, (31.04 grams), sodium hypophosphite hydrate, (0.0213 grams), manganese(II) acetate tetrahydrate, (0.0594 grams), and antimony(III) trioxide, (0.0480 grams). The reaction mixture was stirred and heated to 180 C under a slow nitrogen purge. After achieving 180 C, the reaction mixture was stirred at 180 C for 1.0 hour under a slight nitrogen purge. The reaction mixture was then heated to 225 C over 0.8 hours with stirring. After achieving 225 C, the reaction mixture was stirred at 225 C for 0.6 hours under a slight nitrogen purge. The reaction mixture was then heated to 255 C over 0.7 hours with stirring. After achieving 255 C, the reaction mixture was stirred at 255 C for 0.5 hours under a slow nitrogen purge. 39.0 grams of a colorless distillate was collected over this heating cycle. The reaction mixture was then staged to full vacuum with stirring at 255 C. The resulting reaction mixture was stirred for 2.6 hours under full vacuum, (pressure less than 100 mtorr). The vacuum was then released with nitrogen and the reaction mass allowed to cool to room temperature. An additional 54.6 grams of distillate was recovered and 83.6 grams of a solid, light tan product was recovered. The sample was measured for laboratory relative viscosity, (LRV), as described above and was found to have an LRV of 13.54. This sample was calculated to have an inherent viscosity of 0.49 dL/g. The sample underwent differential scanning calorimetry, (DSC), analysis. A glass transition temperature, (Tg), was observed with an onset of 73.2 C, a midpoint of 75.0 C, and an endpoint of 76.8 C. A crystalline melting temperature, (Tm), was observed at a temperature of 214.7 C, (8.2 J/g).

Example 24

To a 250 milliliter glass flask was added bis(2-hydroxyethyl)terephthalate, (162.06 grams), poly(lactate), (from Cargill-Dow, 25.53 grams), dimethyl 5-sulfoisophthalate, sodium salt, (6.00 grams), tris(2-hydroxyethyl)trimellitate, (0.27 grams), sodium acetate, (0.19 grams), and Tyzor® PEL-G, (0.1121 grams). The reaction mixture was stirred and heated to 180 C under a slow nitrogen purge. After achieving 180 C, the reaction mixture was heated to 200 C over 0.4 hours with stirring. After achieving 200 C, the reaction mixture was stirred at 200 C for 1.2 hours under a slow nitrogen purge. The reaction mixture was then heated to 275 C over 0.8 hours with stirring under a slight nitrogen purge. The reaction mixture was stirred at 275 C for 1.1 hours under a slight nitrogen purge. 22.6 grams of a colorless distillate was collected over this heating cycle. The reaction mixture was then staged to full vacuum with stirring at 275 C. The resulting reaction mixture was stirred for 1.9 hours under full vacuum, (pressure less than 100 mtorr). The vacuum was then released with nitrogen and the reaction mass allowed to cool to room temperature. An additional 24.9 grams of distillate was recovered and 133.9 grams of a solid product was recovered. The sample was measured for laboratory relative viscosity, (LRV), as described above and was found to have an LRV of 11.88. This sample was calculated to have an inherent viscosity of 0.46 dL/g. The sample underwent differential scanning calorimetry, (DSC), analysis. A glass transition temperature, (Tg), was observed with an onset at 66.2 C, a midpoint at 68.1 C, and an endpoint of 70.0 C. A crystalline melting temperature, (Tm), was observed at 216.1 C, (26.8 J/g).

Example 25

To a 250 milliliter glass flask was added bis(2-hydroxyethyl)terephthalate, (123.48 grams), poly(lactate), (from Cargill-Dow, 36.47 grams), dimethyl 5-sulfoisophthalate, sodium salt, (6.00 grams), sodium acetate, (0.19 grams), tris(2-hydroxyethyl)trimellitate, (0.27 grams), and Tyzor® PEL-G, (8.2 weight percent titanium, 0.0827 grams). The reaction mixture was stirred and heated to 180 C under a slow nitrogen purge. After achieving 180 C, the reaction mixture was heated to 200 C over 0.3 hours with stirring. After achieving 200 C, the reaction mixture was stirred at 200 C for 1.1 hours under a slow nitrogen purge. The reaction mixture was then heated to 275 C over 0.4 hours with stirring under a slight nitrogen purge. The reaction mixture was stirred at 275 C for 1.0 hour under a slight nitrogen purge. 7.5 grams of a colorless distillate was collected over this heating cycle. The reaction mixture was then staged to full vacuum with stirring at 275 C. The resulting reaction mixture was stirred for 2.1 hours under full vacuum, (pressure less than 100 mtorr). The vacuum was then released with nitrogen and the reaction mass allowed to cool to room temperature. An additional 32.9 grams of distillate was recovered and 113.2 grams of a solid product was recovered. The sample was measured for laboratory relative viscosity, (LRV), as described above and was found to have an LRV of 14.12. This sample was calculated to have an inherent viscosity of 0.50 dL/g. The sample underwent differential scanning calorimetry, (DSC), analysis. A glass transition temperature, (Tg), was observed with an onset of 61.5, a midpoint of 64.4 C, and an endpoint of 67.3 C.

Preparative Example PE 1

To a 1 liter glass flask was added lactic acid, (85 weight percent aqueous solution, 423.91 grams), and ethylene glycol, (248.28 grams). The reaction mixture was heated to 180 C with stirring while under a slight nitrogen purge. After achieving 180 C, the resulting reaction mixture was allowed to stir at 180 C under the slight nitrogen purge for 1.0 hour. The reaction mixture was then heated to 200 C over 0.8 hours with stirring with a slight nitrogen purge. After achieving 200 C, the resulting reaction mixture was allowed to stir at 200 C for 2.0 hours with a slight nitrogen purge. Heating was then discontinued and the reaction mixture allowed to cool to room temperature. A total of 130.1 grams distillate was collected and 514.7 grams of a colorless, clear product was provided.

Example 26

To a 250 milliliter glass flask was added bis(2-hydroxyethyl)terephthalate, (144.15 grams), the reaction product from Preparative Example PE 1, (4.02 grams), dimethyl 5-sulfoisophthalate, sodium salt, (0.89 grams), sodium acetate, (0.16 grams), manganese(II) acetate tetrahydrate, (0.0512 grams), antimony(III) trioxide, (0.0413 grams), and a 50 weight percent calcium carbonate slurry in ethylene glycol, (95.92 grams). The reaction mixture was stirred and heated to 180 C under a slow nitrogen purge. After achieving 180 C, the reaction mixture was stirred at 180 C for 0.4 hours under a slight nitrogen purge. The reaction mixture was then heated to 260 C over 0.5 hours with stirring. After achieving 260 C, the reaction mixture was stirred at 260 C for 0.6 hours under a slight nitrogen purge. 85.0 grams of a colorless distillate was collected over this heating cycle. The reaction mixture was then staged to full vacuum with stirring at 260 C. The resulting reaction mixture was stirred for 1.5 hours under full vacuum, (pressure less than 100 mtorr). The vacuum was then released with nitrogen and the reaction mass allowed to cool to room temperature. An additional 24.6 grams of distillate was recovered and 128.5 grams of a solid product was recovered. The sample was measured for laboratory relative viscosity, (LRV), as described above and was found to have an LRV of 17.24. This sample was calculated to have an inherent viscosity of 0.56 dL/g. The sample underwent differential scanning calorimetry, (DSC), analysis. A glass transition temperature, (Tg), was observed with an onset of 68.9 C, a midpoint of 74.2 C, and an endpoint of 79.5 C. A crystalline melting temperature, (Tm), was observed at a temperature of 243.7 C, (26.8 J/g).

Example 27

To a 250 milliliter glass flask was added dimethyl terephthalate, (102.53 grams), ethyl (S)-(−)-lactate, (7.09 grams), dimethyl 5-sulfoisophthalate, sodium salt, (3.55 grams), 1,3-propanediol, (73.06 grams), sodium acetate, (0.17 grams), and titanium(IV) isopropoxide, (0.1387 grams). The reaction mixture was stirred and heated to 180 C under a slow nitrogen purge. After achieving 180 C, the reaction mixture was stirred at 180 C for 0.8 hours under a slow nitrogen purge. The reaction mixture was then heated to 190 C over 0.5 hours with stirring. After achieving 190 C, the reaction mixture was stirred at 190 C for 0.5 hours under a slow nitrogen purge. The reaction mixture was then heated to 200 C over 0.3 hours with stirring under a slight nitrogen purge. After achieving 200 C, the reaction mixture was stirred at 200 C for 0.6 hours under a slight nitrogen purge. The reaction mixture was then heated to 255 C over 1.4 hours with stirring under a slight nitrogen purge. The reaction mixture was stirred at 255 C for 0.6 hours under a slight nitrogen purge. 32.6 grams of a colorless distillate was collected over this heating cycle. The reaction mixture was then staged to full vacuum with stirring at 255 C. The resulting reaction mixture was stirred for 1.5 hours under full vacuum, (pressure less than 100 mtorr). The vacuum was then released with nitrogen and the reaction mass allowed to cool to room temperature. An additional 30.8 grams of distillate was recovered and 93.0 grams of a solid product was recovered. The sample was measured for laboratory relative viscosity, (LRV), as described above and was found to have an LRV of 20.80. This sample was calculated to have an inherent viscosity of 0.62 dL/g. The sample underwent differential scanning calorimetry, (DSC), analysis. A glass transition temperature, (Tg), was observed with an onset of 54.0 C, a midpoint of 55.8 C, and an endpoint of 57.6 C. A sharp crystalline melting temperature, (Tm), was observed at 227.3 C, (49.6 J/g).

Example 28

To a 250 milliliter glass flask was added dimethyl terephthalate, (83.89 grams), lactic acid, (85 weight percent aqueous solution, 15.90 grams), dimethyl 5-sulfoisophthalate, sodium salt, (5.33 grams), 1,3-propanediol, (51.36 grams), pentaerythritol, (0.0514 grams), sodium acetate, (0.15 grams), titanium(IV) isopropoxide, (0.0893 grams), and kaolin, (11.50 grams). The reaction mixture was stirred and heated to 180 C under a slow nitrogen purge. After achieving 180 C, the reaction mixture was stirred at 180 C for 0.7 hours under a slow nitrogen purge. The reaction mixture was then heated to 190 C over 0.2 hours with stirring. After achieving 190 C, the reaction mixture was stirred at 190 C for 0.4 hours under a slow nitrogen purge. The reaction mixture was then heated to 200 C over 0.1 hours with stirring under a slight nitrogen purge. After achieving 200 C, the reaction mixture was stirred at 200 C for 0.4 hours under a slight nitrogen purge. The reaction mixture was then heated to 255 C over 0.4 hours with stirring under a slight nitrogen purge. The reaction mixture was stirred at 255 C for 0.8 hours under a slight nitrogen purge. 34.0 grams of a colorless distillate was collected over this heating cycle. The reaction mixture was then staged to full vacuum with stirring at 255 C. The resulting reaction mixture was stirred for 2.0 hours under full vacuum, (pressure less than 100 mtorr). The vacuum was then released with nitrogen and the reaction mass allowed to cool to room temperature. An additional 10.1 grams of distillate was recovered and 94.2 grams of a solid product was recovered. The sample was measured for laboratory relative viscosity, (LRV), as described above and was found to have an LRV of 21.97. This sample was calculated to have an inherent viscosity of 0.64 dL/g. The sample underwent differential scanning calorimetry, (DSC), analysis. A glass transition temperature, (Tg), was observed with an onset of 44.7 C, a midpoint of 46.7 C, and an endpoint of 48.8 C. A broad crystalline melting temperature, (Tm), was observed at 216.7 C, (38.3 J/g).

Example 29

To a 250 milliliter glass flask was added dimethyl terephthalate, (83.89 grams), lactic acid, (85 weight percent aqueous solution, 15.90 grams), dimethyl 5-sulfoisophthalate, sodium salt, (5.33 grams), 1,3-propanediol, (51.36 grams), pentaerythritol, (0.0518 grams), sodium acetate, (0.15 grams), titanium(IV) isopropoxide, (0.0595 grams), and kaolin, (11.50 grams). The reaction mixture was stirred and heated to 180 C under a slow nitrogen purge. After achieving 180 C, the reaction mixture was stirred at 180 C for 0.6 hours under a slow nitrogen purge. The reaction mixture was then heated to 190 C over 0.2 hours with stirring. After achieving 190 C, the reaction mixture was stirred at 190 C for 0.5 hours under a slow nitrogen purge. The reaction mixture was then heated to 200 C over 0.3 hours with stirring under a slight nitrogen purge. After achieving 200 C, the reaction mixture was stirred at 200 C for 0.6 hours under a slight nitrogen purge. The reaction mixture was then heated to 255 C over 1.0 hour with stirring under a slight nitrogen purge. The reaction mixture was stirred at 255 C for 0.5 hours under a slight nitrogen purge. 33.7 grams of a colorless distillate was collected over this heating cycle. The reaction mixture was then staged to full vacuum with stirring at 255 C. The resulting reaction mixture was stirred for 1.8 hours under full vacuum, (pressure less than 100 mtorr). The vacuum was then released with nitrogen and the reaction mass allowed to cool to room temperature. An additional 19.4 grams of distillate was recovered and 91.0 grams of a solid product was recovered. The sample was measured for laboratory relative viscosity, (LRV), as described above and was found to have an LRV of 19.45. This sample was calculated to have an inherent viscosity of 0.60 dL/g. The sample underwent differential scanning calorimetry, (DSC), analysis. A glass transition temperature, (Tg), was observed with an onset of 45.0 C, a midpoint of 46.9 C, and an endpoint of 48.9 C. A broad crystalline melting temperature, (Tm), was observed at 216.3 C, (42.4 J/g).

Example 30

To a 250 milliliter glass flask was added poly(trimethylene terephthalate), (119.48 grams), dimethyl 5-sulfoisophthalate, sodium salt, (5.92 grams), and 1,3-propanediol, (7.61 grams). The reaction mixture was heated to 255 C under a slow nitrogen purge and held there until it was molten. Stirring was started and poly(lactate), (from Cargill-Dow, 28.83 grams), was added. The resulting reaction mixture was stirred at 255 C for 0.7 hours under a slight nitrogen purge. 0.9 grams of distillates were collected over this heating cycle. The reaction mixture was then staged to full vacuum with stirring at 255 C. The resulting reaction mixture was stirred for 4.2 hours under full vacuum, (pressure less than 100 mtorr). The vacuum was then released with nitrogen and the reaction mass allowed to cool to room temperature. 3.4 grams of additional distillates were recovered and 148.0 grams of a solid product was recovered. The sample was measured for laboratory relative viscosity, (LRV), as described above and was found to have an LRV of 20.59. This sample was calculated to have an inherent viscosity of 0.62 dL/g. The sample underwent differential scanning calorimetry, (DSC), analysis. A glass transition temperature, (Tg), was observed with an onset at 37.4 C, a midpoint at 39.2 C, and an endpoint of 40.9 C. A crystalline melting temperature, (Tm), was observed at 185.9 C, (31.9 J/g).

Example 31

To a 250 milliliter glass flask was added dimethyl terephthalate, (87.39 grams), isophthalic acid, (6.65 grams), lactic acid, (85 weight percent aqueous solution, 52.99 grams), dimethyl 5-sulfoisophthalate, sodium salt, (2.96 grams), sodium acetate, (0.20 grams), 1,3-propanediol, (60.88 grams), titanium(IV) isopropoxide, (0.0714 grams), and silica, (1.40 grams). The reaction mixture was stirred and heated to 180 C under a slow nitrogen purge. After achieving 180 C, the reaction mixture was stirred at 180 C for 0.5 hours under a slow nitrogen purge. The reaction mixture was then heated to 190 C over 0.2 hours with stirring. After achieving 190 C, the reaction mixture was stirred at 190 C for 0.5 hours under a slow nitrogen purge. The reaction mixture was then heated to 200 C over 0.2 hours with stirring under a slight nitrogen purge. After achieving 200 C, the reaction mixture was stirred at 200 C for 0.9 hours under a slight nitrogen purge. The reaction mixture was then heated to 255 C over 0.8 hours with stirring under a slight nitrogen purge. The reaction mixture was stirred at 255 C for 0.5 hours under a slight nitrogen purge. 45.0 grams of a colorless distillate was collected over this heating cycle. The reaction mixture was then staged to full vacuum with stirring at 255 C. The resulting reaction mixture was stirred for 4.1 hours under full vacuum, (pressure less than 100 mtorr). The vacuum was then released with nitrogen and the reaction mass allowed to cool to room temperature. An additional 19.1 grams of distillate was recovered and 94.4 grams of a solid product was recovered. The sample was measured for laboratory relative viscosity, (LRV), as described above and was found to have an LRV of 4.92. This sample was calculated to have an inherent viscosity of 0.33 dL/g. The sample underwent differential scanning calorimetry, (DSC), analysis. A glass transition temperature, (Tg), was observed with an onset of 30.8 C, a midpoint of 33.1 C, and an endpoint of 35.4 C. A broad crystalline melting temperature, (Tm), was observed at 174.3 C, (25.8 J/g).

Example 32

To a 250 milliliter glass flask was added dimethyl terephthalate, (90.88 grams), lactic acid, (85 weight percent aqueous solution, 6.36 grams), glycolic acid, (4.56 grams), dimethyl 5-sulfoisophthalate, sodium salt, (3.55 grams), 1,4-butanediol, (86.52 grams), and titanium(IV) isopropoxide, (0.1361 grams). The reaction mixture was stirred and heated to 180 C under a slow nitrogen purge. After achieving 180 C, the reaction mixture was stirred at 180 C for 0.6 hours under a slow nitrogen purge. The reaction mixture was then heated to 190 C over 0.3 hours with stirring. After achieving 190 C, the reaction mixture was stirred at 190 C for 0.5 hours under a slow nitrogen purge. The reaction mixture was then heated to 200 C over 0.3 hours with stirring under a slight nitrogen purge. After achieving 200 C, the reaction mixture was stirred at 200 C for 0.5 hours under a slight nitrogen purge. The reaction mixture was then heated to 255 C over 1.5 hours with stirring under a slight nitrogen purge. The reaction mixture was stirred at 255 C for 0.5 hours under a slight nitrogen purge. 59.2 grams of a colorless distillate was collected over this heating cycle. The reaction mixture was then staged to full vacuum with stirring at 255 C. The resulting reaction mixture was stirred for 3.5 hours under full vacuum, (pressure less than 100 mtorr). The vacuum was then released with nitrogen and the reaction mass allowed to cool to room temperature. An additional 2.2 grams of distillate was recovered and 104.4 grams of a solid product was recovered. The sample was measured for laboratory relative viscosity, (LRV), as described above and was found to have an LRV of 19.17. This sample was calculated to have an inherent viscosity of 0.59 dL/g. The sample underwent differential scanning calorimetry, (DSC), analysis. A sharp crystalline melting temperature, (Tm), was observed at 198.7 C, (50.0 J/g).

Example 33

To a 250 milliliter glass flask was added poly(tetramethylene terephthalate), (127.60 grams), dimethyl 5-sulfoisophthalate, sodium salt, (5.92 grams), and 1,4-butanediol, (9.01 grams). The reaction mixture was heated to 255 C under a slow nitrogen purge and held there until it was molten. Stirring was started and poly(lactate), (from Cargill-Dow, 28.83 grams), was added. The resulting reaction mixture was stirred at 255 C for 1.1 hours under a slight nitrogen purge. 1.3 grams of distillates were collected over this heating cycle. The reaction mixture was then staged to full vacuum with stirring at 255 C. The resulting reaction mixture was stirred for 2.8 hours under full vacuum, (pressure less than 100 mtorr). The vacuum was then released with nitrogen and the reaction mass allowed to cool to room temperature. 0.3 grams of additional distillates were recovered and 145.1 grams of a solid product was recovered. The sample was measured for laboratory relative viscosity, (LRV), as described above and was found to have an LRV of 11.74. This sample was calculated to have an inherent viscosity of 0.46 dL/g. The sample underwent differential scanning calorimetry, (DSC), analysis. A crystalline melting temperature, (Tm), was observed at 204.0 C, (32.0 J/g).

Example 34

To a 250 milliliter glass flask was added dimethyl terephthalate, (53.60 grams), methyl (S)-(−)-lactate, (31.23 grams), dimethyl 5-sulfoisophthalate, sodium salt, (7.11 grams), 1,4-butanediol, (86.52 grams), pentaerythritol, (0.045 grams), sodium acetate, (0.13 grams), and titanium (IV) isopropoxide, (0.1070 grams). The reaction mixture was stirred and heated to 180 C under a slow nitrogen purge. After achieving 180 C, the reaction mixture was stirred at 180 C for 0.6 hours under a slow nitrogen purge. The reaction mixture was then heated to 190 C over 0.3 hours with stirring. After achieving 190 C, the reaction mixture was stirred at 190 C for 0.5 hours under a slow nitrogen purge. The reaction mixture was then heated to 200 C over 0.4 hours with stirring under a slight nitrogen purge. After achieving 200 C, the reaction mixture was stirred at 200 C for 0.3 hours under a slight nitrogen purge. The reaction mixture was then heated to 255 C over 1.7 hours with stirring under a slight nitrogen purge. The reaction mixture was stirred at 255 C for 0.6 hours under a slight nitrogen purge. 76.2 grams of a colorless distillate was collected over this heating cycle. The reaction mixture was then staged to full vacuum with stirring at 255 C. The resulting reaction mixture was stirred for 1.7 hours under full vacuum, (pressure less than 100 mtorr). The vacuum was then released with nitrogen and the reaction mass allowed to cool to room temperature. An additional 8.8 grams of distillate was recovered and 71.9 grams of a solid product was recovered. The sample was measured for laboratory relative viscosity, (LRV), as described above and was found to have an LRV of 19.15. This sample was calculated to have an inherent viscosity of 0.59 dL/g. The sample underwent differential scanning calorimetry, (DSC), analysis. A glass transition temperature, (Tg), was observed with an onset of 34.7 C, a midpoint of 35.4 C, and an endpoint of 34.8 C. A broad crystalline melting temperature, (Tm), was observed at 165.1 C, (22.2 J/g).

Example 35

To a 250 milliliter glass flask was added bis(2-hydroxyethyl)terephthalate, (136.53 grams), lactic acid, (85 weight percent aqueous solution, 3.18 grams), glycolic acid, (2.28 grams), dimethyl 5-sulfoisophthalate, sodium salt, (0.89 grams), sodium acetate, (0.15 grams), manganese(II) acetate tetrahydrate, (0.0514 grams), and antimony(III) trioxide, (0.0414 grams), and Claytone® 2000, (3.33 grams). The reaction mixture was stirred and heated to 180 C under a slow nitrogen purge. After achieving 180 C, the reaction mixture was stirred at 180 C for 0.6 hours under a slow nitrogen purge. The reaction mixture was then heated to 260 C over 1.7 hours with stirring. After achieving 260 C, the reaction mixture was stirred at 260 C for 0.6 hours under a slow nitrogen purge. 14.1 grams of a colorless distillate was collected over this heating cycle. The reaction mixture was then staged to full vacuum with stirring at 260 C. The resulting reaction mixture was stirred for 1.5 hours under full vacuum, (pressure less than 100 mtorr). The vacuum was then released with nitrogen and the reaction mass allowed to cool to room temperature. An additional 18.7 grams of distillate was recovered and 71.1 grams of a solid product was recovered. The sample was measured for laboratory relative viscosity, (LRV), as described above and was found to have an LRV of 14.84. This sample was calculated to have an inherent viscosity of 0.51 dL/g. The sample underwent differential scanning calorimetry, (DSC), analysis. A glass transition temperature, (Tg), was observed with an onset of 78.5 C, a midpoint of 78.9 C, and an endpoint of 79.0 C. A crystalline melting temperature, (Tm), was observed at 241.5 C, (32.7 J/g).

Example 36

To a 250 milliliter glass flask was added bis(2-hydroxyethyl)terephthalate, (129.66 grams), isophthalic acid, (8.97 grams), glycolic acid, (2.28 grams), dimethyl 5-sulfoisophthalate, sodium salt, (1.78 grams), sodium acetate, (0.16 grams), manganese(II) acetate tetrahydrate, (0.0579 grams), antimony(III) oxide, (0.0417 grams), and a 50 weight percent calcium carbonate slurry in ethylene glycol, (95.30 grams). The reaction mixture was stirred and heated to 180 C under a slow nitrogen purge. After achieving 180 C, the reaction was stirred at 180 C for 0.7 hours under a slight nitrogen purge. The reaction mixture was heated to 260 C over 0.6 hours with stirring. After achieving 260 C, the reaction mixture was stirred at 260 C for 0.9 hours under a slow nitrogen purge. 78.4 grams of a colorless distillate was collected over this heating cycle. The reaction mixture was then staged to full vacuum with stirring at 260 C. The resulting reaction mixture was stirred for 1.6 hours under full vacuum, (pressure less than 100 mtorr). The vacuum was then released with nitrogen and the reaction mass allowed to cool to room temperature. An additional 21.4 grams of distillate was recovered and 85.5 grams of a solid product was recovered. The sample was measured for laboratory relative viscosity, (LRV), as described above and was found to have an LRV of 17.38. This sample was calculated to have an inherent viscosity of 0.56 dL/g. The sample underwent differential scanning calorimetry, (DSC), analysis. A broad crystalline melting point, (Tm), was observed at 241.3 C, (28.7 J/g).

Comparative Example CE 7

To a 250 milliliter glass flask was added bis(2-hydroxyethyl)terephthalate, (165.31 grams), glycolic acid, (27.50 grams), tris(2-hydroxyethyl)trimellitate, (0.27 grams), manganese(II) acetate tetrahydrate, (0.0942 grams), and antimony(III) oxide, (0.0759 grams). The reaction mixture was stirred and heated to 180 C under a slow nitrogen purge. After achieving 180 C, the reaction mixture was heated to 200 C over 0.6 hours with stirring. After achieving 200 C, the reaction mixture was stirred at 200 C for 0.9 hours under a slow nitrogen purge. The reaction mixture was then heated to 275 C over 1.4 hours with stirring under a slight nitrogen purge. The reaction mixture was stirred at 275 C for 0.9 hours under a slight nitrogen purge. 24.4 grams of a colorless distillate was collected over this heating cycle. The reaction mixture was then staged to full vacuum with stirring at 275 C. The resulting reaction mixture was stirred for 1.8 hours under full vacuum, (pressure less than 100 mtorr). The vacuum was then released with nitrogen and the reaction mass allowed to cool to room temperature. An additional 28.6 grams of distillate was recovered and 116.5 grams of a solid product was recovered. The sample was measured for laboratory relative viscosity, (LRV), as described above and was found to have an LRV of 17.63. This sample was calculated to have an inherent viscosity of 0.56 dL/g. The sample underwent differential scanning calorimetry, (DSC), analysis. A glass transition temperature, (Tg), was observed with an onset at 71.3 C, a midpoint at 73.4 C, and an endpoint of 75.6 C. A crystalline melting point, (Tm), was observed at 205.4 C, (2.9 J/g).

The sample was ground into powder and tested for biodegradation, as described above. This sample was found to biodegrade 16.0 percent within 27.3 days under these test conditions.

Example 37

To a 250 milliliter glass flask was added bis(2-hydroxyethyl)terephthalate, (165.31 grams), glycolic acid, (27.50 grams), dimethyl 5-sulfoisophthalate, sodium salt, (6.30 grams), sodium acetate, (1.18 grams), tris(2-hydroxyethyl)trimellitate, (0.27 grams), manganese(II) acetate tetrahydrate, (0.0942 grams), and antimony(III) oxide (0.0759 grams). The reaction mixture was stirred and heated to 180 C under a slow nitrogen purge. After achieving 180 C, the reaction mixture was heated to 200 C over 0.4 hours with stirring. After achieving 200 C, the reaction mixture was stirred at 200 C for 1.0 hour under a slow nitrogen purge. The reaction mixture was then heated to 275 C over 0.5 hours with stirring under a slight nitrogen purge. The reaction mixture was stirred at 275 C for 1.0 hour under a slight nitrogen purge. 25.6 grams of a colorless distillate was collected over this heating cycle. The reaction mixture was then staged to full vacuum with stirring at 275 C. The resulting reaction mixture was stirred for 0.8 hours under full vacuum, (pressure less than 100 mtorr). The vacuum was then released with nitrogen and the reaction mass allowed to cool to room temperature. An additional 20.0 grams of distillate was recovered and 147.8 grams of a solid product was recovered. The sample was measured for laboratory relative viscosity, (LRV), as described above and was found to have an LRV of 21.64. This sample was calculated to have an inherent viscosity of 0.64 dL/g. The sample underwent differential scanning calorimetry, (DSC), analysis. A glass transition temperature, (Tg), was observed with an onset of 67.1 C, a midpoint of 70.4 C, and an endpoint of 73.7 C. A crystalline melting temperature, (Tm), was observed at 211.9 C, (14.3 J/g).

The sample was ground into powder and tested for biodegradation, as described above. This sample was found to biodegrade 27.3 percent within 27.3 days under these test conditions.

Example 37 demonstrates the enhanced biodegradation rates of polymers made according to the present invention over comparable non-sulfonated materials of the art. Example 37 was found to have an enhanced biodegradation rate in comparison to conventional non-sulfonated polyesters such as that prepared according to Comparative Example CE 7.

Example 38

To a 250 milliliter glass flask was added bis(2-hydroxyethyl)terephthalate, (178.15 grams), glycolic acid, (36.75 grams), dimethyl 5-sulfoisophthalate, sodium salt, (7.16 grams), sodium acetate, (0.24 grams), tris(2-hydroxyethyl)trimellitate, (0.24 grams), and Tyzor® PC-42 titanate (6.3 weight percent titanium, 0.0758 grams). The reaction mixture was stirred and heated to 180 C under a slow nitrogen purge. After achieving 180 C, the reaction mixture was heated to 200 C over 0.4 hours with stirring. After achieving 200 C, the reaction mixture was stirred at 200 C for 1.5 hours under a slow nitrogen purge. The reaction mixture was then heated to 275 C over 0.9 hours with stirring under a slight nitrogen purge. The reaction mixture was stirred at 275 C for 0.9 hours under a slight nitrogen purge. 28.1 grams of a colorless distillate was collected over this heating cycle. The reaction mixture was then staged to full vacuum with stirring at 275 C. The resulting reaction mixture was stirred for 1.4 hours under full vacuum, (pressure less than 100 mtorr). The vacuum was then released with nitrogen and the reaction mass allowed to cool to room temperature. An additional 33.1 grams of distillate was recovered and 149.9 grams of a solid product was recovered. The sample was measured for laboratory relative viscosity, (LRV), as described above and was found to have an LRV of 15.09. This sample was calculated to have an inherent viscosity of 0.52 dL/g. The sample underwent differential scanning calorimetry, (DSC), analysis. A glass transition temperature, (Tg), was observed with an onset of 65.6 C, a midpoint of 68.3 C, and an endpoint of 71.0 C. A crystalline melting temperature, (Tm), was not observed up to a temperature of 300 C.

Example 39

To a 250 milliliter glass flask was added bis(2-hydroxyethyl)terephthalate, (126.00 grams), glycolic acid, (39.26 grams), dimethyl 5-sulfoisophthalate, sodium salt, (6.12 grams), sodium acetate, (1.16 grams), tris(2-hydroxyethyl)trimellitate, (0.27 grams), manganese(II) acetate tetrahydrate, (0.0942 grams), and antimony(III) oxide (0.0759 grams). The reaction mixture was stirred and heated to 180 C under a slow nitrogen purge. After achieving 180 C, the reaction mixture was heated to 200 C over 0.5 hours with stirring. After achieving 200 C, the reaction mixture was stirred at 200 C for 1.0 hour under a slow nitrogen purge. The reaction mixture was then heated to 275 C over 1.0 hour with stirring under a slight nitrogen purge. The reaction mixture was stirred at 275 C for 1.0 hour under a slight nitrogen purge. 26.6 grams of a colorless distillate was collected over this heating cycle. The reaction mixture was then staged to full vacuum with stirring at 275 C. The resulting reaction mixture was stirred for 0.6 hours under full vacuum, (pressure less than 100 mtorr). The vacuum was then released with nitrogen and the reaction mass allowed to cool to room temperature. An additional 22.6 grams of distillate was recovered and 86.6 grams of a solid product was recovered. The sample was measured for laboratory relative viscosity, (LRV), as described above and was found to be too viscous to evidence a determination. The sample underwent differential scanning calorimetry, (DSC), analysis. A glass transition temperature, (Tg), was observed with an onset of 66.9 C, a midpoint of 69.5 C, and an endpoint of 72.3 C. A crystalline melting temperature, (Tm), was not observed up to a temperature of 300 C.

Example 40

To a 250 milliliter glass flask was added bis(2-hydroxyethyl)terephthalate, (163.80 grams), glycolic acid, (51.04 grams), dimethyl 5-sulfoisophthalate, sodium salt, (7.96 grams), sodium acetate, (1.51 grams), tris(2-hydroxyethyl)trimellitate, (0.36 grams), manganese(II) acetate tetrahydrate, (0.1225 grams), and antimony(III) oxide (0.0987 grams). The reaction mixture was stirred and heated to 180 C under a slow nitrogen purge. After achieving 180 C, the reaction mixture was heated to 200 C over 0.6 hours with stirring. After achieving 200 C, the reaction mixture was stirred at 200 C for 1.0 hour under a slow nitrogen purge. The reaction mixture was then heated to 275 C over 1.5 hours with stirring under a slight nitrogen purge. The reaction mixture was stirred at 275 C for 1.1 hours under a slight nitrogen purge. 29.1 grams of a colorless distillate was collected over this heating cycle. The reaction mixture was then staged to full vacuum with stirring at 275 C. The resulting reaction mixture was stirred for 0.6 hours under full vacuum, (pressure less than 100 mtorr). The vacuum was then released with nitrogen and the reaction mass allowed to cool to room temperature. An additional 21.2 grams of distillate was recovered and 119.5 grams of a solid product was recovered. The sample was measured for laboratory relative viscosity, (LRV), as described above and was found to have an LRV of 16.30. This sample was calculated to have an inherent viscosity of 0.54 dL/g. The sample underwent differential scanning calorimetry, (DSC), analysis. A glass transition temperature, (Tg), was observed with an onset of 59.8 C, a midpoint of 62.6 C, and an endpoint of 65.5 C. A crystalline melting temperature, (Tm), was not observed up to a temperature of 300 C.

The sample was ground into powder and tested for biodegradation, as described above, and degraded 61.0 percent within 27.3 days.

Example 41

To a 250 milliliter glass flask was added dimethyl terephthalate, (110.11 grams), glycolic acid, (2.28 grams), dimethyl 5-sulfoisophthalate, sodium salt, (0.89 grams), 1,3-propanediol, (73.06 grams), and titanium(IV) isopropoxide, (0.1500 grams). The reaction mixture was stirred and heated to 180 C under a slow nitrogen purge. After achieving 180 C, the reaction mixture was stirred at 180 C for 0.3 hours under a slow nitrogen purge. The reaction mixture was then heated to 190 C over 0.1 hours with stirring. After achieving 190 C, the reaction mixture was stirred at 190 C for 0.4 hours under a slow nitrogen purge. The reaction mixture was then heated to 200 C over 0.1 hours with stirring under a slight nitrogen purge. After achieving 200 C, the reaction mixture was stirred at 200 C for 0.2 hours under a slight nitrogen purge. The reaction mixture was then heated to 255 C over 0.4 hours with stirring under a slight nitrogen purge. The reaction mixture was stirred at 255 C for 0.9 hours under a slight nitrogen purge. Claytone® 2000, (31.86 grams), was then added and the resulting reaction mixture allowed to stir at 255 C for an additional 0.8 hours under a slight nitrogen purge. 35.3 grams of a colorless distillate was collected over this heating cycle. The reaction mixture was then staged to full vacuum with stirring at 255 C. The resulting reaction mixture was stirred for 0.8 hours under full vacuum, (pressure less than 100 mtorr). The vacuum was then released with nitrogen and the reaction mass allowed to cool to room temperature. An additional 1.1 grams of distillate was recovered and 68.0 grams of a solid product was recovered. The sample was measured for laboratory relative viscosity, (LRV), as described above and was found to have an LRV of 3.44. This sample was calculated to have an inherent viscosity of 0.31 dL/g. The sample underwent differential scanning calorimetry, (DSC), analysis. A crystalline melting temperature, (Tm), was observed at 213.4 C, (40.5 J/g).

Example 42

To a 250 milliliter glass flask was added dimethyl terephthalate, (110.11 grams), glycolic acid, (2.28 grams), dimethyl 5-sulfoisophthalate, sodium salt, (0.89 grams), 1,4-butanediol, (86.52 grams), pentaerythritol, (0.13 grams), and titanium(IV) isopropoxide, (0.1465 grams). The reaction mixture was stirred and heated to 180 C under a slow nitrogen purge. After achieving 180 C, the reaction mixture was stirred at 180 C for 0.5 hours under a slow nitrogen purge. The reaction mixture was then heated to 190 C over 0.2 hours with stirring. After achieving 190 C, the reaction mixture was stirred at 190 C for 0.4 hours under a slow nitrogen purge. The reaction mixture was then heated to 200 C over 0.1 hours with stirring under a slight nitrogen purge. After achieving 200 C, the reaction mixture was stirred at 200 C for 1.0 hour under a slight nitrogen purge. The reaction mixture was then heated to 255 C over 0.7 hours with stirring under a slight nitrogen purge. The reaction mixture was stirred at 255 C for 0.8 hours under a slight nitrogen purge. Cloisite Na, (31.86 grams) was then added to the stirred reaction mixture at 255 C. The resulting reaction mixture was stirred at 255 C under a slight nitrogen purge for an additional 0.7 hours. 51.9 grams of a colorless distillate was collected over this heating cycle. The reaction mixture was then staged to full vacuum with stirring at 255 C. The resulting reaction mixture was stirred for 3.2 hours under full vacuum, (pressure less than 100 mtorr). The vacuum was then released with nitrogen and the reaction mass allowed to cool to room temperature. An additional 1.4 grams of distillate was recovered and 146.8 grams of a solid product was recovered. The sample was measured for laboratory relative viscosity, (LRV), as described above and was found to have an LRV of 15.97. This sample was calculated to have an inherent viscosity of 0.54 dL/g. The sample underwent differential scanning calorimetry, (DSC), analysis. A crystalline melting temperature, (Tm), was observed at 219.7 C, (40.7 J/g).

Example 43

Material produced as described for Example 19, above, except at a larger scale, is dried in a hopper dryer for 8 hours at 70° C. to a −40° C. dew point. The material is then fed at a rate of 20 pounds per hour into the feed section of a 1½-inch diameter single screw Davis Standard extruder, (screw L/D of 24:1, model number DS-15H). The extruder conditions and temperature profile is noted below. The molten polymer is then fed into a Killion 3 roll stack sheet line with the conditions and temperature profile noted below.
Extruder Zone 1 temperature, (feed section): 410 F
Extruder Zone 2 temperature: 430 F
Extruder Zone 3 temperature: 460 F
Extruder Zone 4 (front) temperature: 460 F
Flange: 460 F
Pipe: 460 F
Flange: 460 F
Die temperature: 460 F
Die Lips: 460 F
Melt Temperature: 460 F
Extruder Amps: 5
Extruder rpm: 50
Chill Roll Top temperature: 70 F
Chill Roll Middle temperature: 70 F
Chill Roll Bottom temperature: 70 F
Film Take Off Speed: 235 inches/minute A film 8 inches wide with a thickness of 0.003 inches, (3 mils), is produced. The film is tested as a fast food sandwich wrap packaging.

Example 44

2 inch squares of the film produced above in Example 43 are preheated to 80 C and held there for 4 minutes, (being careful not to allow the hot air to impinge directly onto the film so as to avoid hot spots), and biaxially oriented on a tenter frame T. M. Long Biaxial stretcher. The draw ratio of the stretcher is set at 3 times 3 and the stretching rate is 5 inches per second (12.7 cm/second). The biaxially stretched film is tested as a fast food sandwich wrap packaging.

Examples 45-67 and Comparative Examples CE 8-CE 9

Polymers prepared as described above in the Examples and Comparative Examples noted below in Table 1, except at a larger scale, are dried in a hopper dryer for 8 hours at 60 C to a −40 C dew point. The materials are placed in the hopper of a single screw volumetric feeder, (K-tron Model No. 7), from which they free fall to the inlet of a 28 mm Werner and Pfleider twin screw extruder with a vacuum port maintained at house vacuum attached to a 10 inch wide film die with about a 0.010 inch gap. A dry nitrogen purge is maintained in the feed hopper and the feed throat of the extruder. The extruder is operated at a 150 rpm screw speed with the heater profile noted within Table 1.

TABLE 1

| Example | Polymer Example | Zone 1 (C.) | Zone 2 (C.) | Zone 3 (C.) | Zone 4 (C.) | Zone 5 (C.) | Die (C.) | Melt (C.) |
|---|---|---|---|---|---|---|---|---|
| 45 | 1 | 210 | 230 | 240 | 240 | 240 | 245 | 240 |
| 46 | 2 | 230 | 250 | 260 | 260 | 260 | 265 | 260 |
| 47 | 3 | 215 | 235 | 245 | 245 | 245 | 250 | 245 |
| CE | CE 4 | 165 | 185 | 185 | 185 | 185 | 190 | 185 |
| 48 | 4 | 210 | 230 | 240 | 240 | 240 | 245 | 240 |
| 49 | 5 | 240 | 260 | 270 | 270 | 270 | 275 | 270 |
| 50 | 6 | 175 | 185 | 195 | 195 | 195 | 200 | 195 |
| 51 | 7 | 220 | 230 | 240 | 240 | 240 | 245 | 235 |
| CE 9 | CE 5 | 180 | 200 | 210 | 210 | 210 | 215 | 210 |
| 52 | 10 | 210 | 230 | 240 | 240 | 240 | 245 | 245 |
| 53 | 14 | 210 | 230 | 240 | 240 | 240 | 245 | 240 |
| 54 | 18 | 205 | 225 | 235 | 235 | 235 | 240 | 240 |
| 55 | 23 | 205 | 225 | 235 | 235 | 235 | 240 | 240 |
| 56 | 24 | 205 | 225 | 235 | 235 | 235 | 240 | 230 |
| 57 | 26 | 235 | 250 | 255 | 255 | 255 | 260 | 255 |
| 58 | 27 | 220 | 235 | 245 | 245 | 245 | 250 | 245 |
| 59 | 29 | 210 | 220 | 225 | 225 | 225 | 230 | 225 |
| 60 | 30 | 175 | 190 | 200 | 200 | 200 | 205 | 200 |
| 61 | 31 | 165 | 180 | 190 | 190 | 190 | 195 | 195 |
| 62 | 32 | 190 | 200 | 210 | 210 | 210 | 215 | 210 |
| 63 | 33 | 195 | 205 | 225 | 225 | 225 | 230 | 230 |
| 64 | 34 | 155 | 170 | 180 | 180 | 180 | 185 | 180 |
| 65 | 35 | 230 | 250 | 260 | 260 | 260 | 265 | 265 |
| 66 | 41 | 200 | 215 | 225 | 225 | 225 | 230 | 230 |
| 67 | 42 | 210 | 220 | 230 | 230 | 230 | 235 | 230 |

The extruded polymer films are electrostatically pinned on an 12 inch diameter smooth quench drum maintained at a temperature of 26 C with cold water and collected on release paper using a standard tension roll. The quench drum speed is adjusted from 5 to 15 feet per minute to obtain film samples with a thickness of about 8 mils to about 1.5 mils. The films are tested as fast food sandwich wraps. The films are tested for physical properties by Elmendorf Tear, Graves Tear, and percent elongation at break, and strength, as measured by tensile strength at break and tensile modulus.

10 inch by 16 inch rectangles are cut out of the films of Examples 45 to 67 and Comparative Examples CE 8 and CE 9 and the size accurately measured. The film rectangles are placed in a Fisher Scientific Isotemp Incubator, Model Number 625D, heated to 60 C for 1 hour. The film rectangles are then accurately remeasured to determine shrinkage.

Pieces of the films of Examples 45 to 67 (8-inch by 8-inch squares) are placed in a rotary composter with about 0.5 cubic yards squared of mixed municipal solid waste, (from which glass, cans, and much of the light plastic and paper is removed), and sewage sludge in the ratio of about 2:1. The composter is rotated once a week and the temperature and moisture content is monitored.

Example 68

A polymer prepared as described in Example 16, except at a larger scale, is dried in a hopper dryer for 8 hours at 80° C. to a −40° C. dew point. The material is placed in the hopper of a single screw volumetric feeder, (K-tron Model No. 7), from which it free falls to the inlet of a 28 mm Werner and Pfleider twin screw extruder with a vacuum port maintained at house vacuum attached to a 10 inch wide film die with about a 0.010 inch gap. A dry nitrogen purge is maintained in the feed hopper and the feed throat of the extruder. The extruder is operated at a 150 rpm screw speed with a heater profile as follows:

| Zone 1 (C.) | Zone 2 (C.) | Zone 3 (C.) | Zone 4 (C.) | Zone 5 (C.) | Die (C.) | Melt (C.) |
|---|---|---|---|---|---|---|
| 205 | 220 | 235 | 235 | 235 | 240 | 235 |

The extruded polymer film is electrostatically pinned on an 12 inch diameter smooth quench drum maintained at a temperature of 26° C. with cold water and collected on release paper using a standard tension roll. The quench drum speed is adjusted from 5 to 15 feet per minute to obtain film samples with a thickness of about 8 mils to about 1.5 mils. The film is tested as fast food sandwich wraps.

Examples 69-89 and Comparative Examples CE 10-CE 11

The films produced in the Examples listed below in Table 2, with a thickness of about 1.5 mils to 8 mils, are sent through a Machine Direction Orienter (MDO) Model Number 7200 from the Marshall and Williams Company of Providence, R.I. The MDO unit is preheated to the temperature listed in Table 2, below, and the film is stretched as noted below in Table 2 while at that temperature. For example, "Stretched 3×" means that a 1 meter long film would be stretched to a length of 3 meters.

TABLE 2

| Example | Cast Film Example | MDO Temperature (° C.) | MDO Stretch |
|---|---|---|---|
| 69 | 45 | 80 | 3X |
| 70 | 46 | 85 | 3X |
| CE 10 | CE 8 | 50 | 3X |
| 71 | 48 | 80 | 3X |
| 72 | 49 | 90 | 4X |
| 73 | 50 | 50 | 5X |
| 74 | 51 | 80 | 3.5X |
| CE 11 | CE 9 | 40 | 3X |
| 75 | 52 | 80 | 3X |
| 76 | 53 | 85 | 4X |
| 77 | 54 | 80 | 3.5X |
| 78 | 55 | 85 | 4.5X |
| 79 | 56 | 75 | 4X |
| 80 | 57 | 80 | 4X |
| 81 | 59 | 55 | 4X |
| 82 | 60 | 50 | 3.5X |
| 83 | 61 | 45 | 4X |
| 84 | 62 | 40 | 3.5X |
| 85 | 63 | 50 | 3.5X |
| 86 | 64 | 50 | 4X |
| 87 | 65 | 90 | 4X |
| 88 | 66 | 40 | 3.5X |
| 89 | 67 | 50 | 4X |

The uniaxially stretched films of Examples 69 to 89 are tested as a fast food sandwich wrap packaging. 10 inch by 16 inch rectangles are cut out of the film of Examples 69-89 and Comparative Examples CE 10-CE 11 and the size accurately measured. The film rectangles are placed in a Fisher Scientific Isotemp Incubator, Model Number 625D, heated to 60 C for 1 hour. The film rectangles are then accurately remeasured.

Examples 90-97

2 inch squares of the films produced above and detailed in Table 3 below are preheated to the temperatures noted below in Table 3 for 4 minutes, (being careful not to allow the hot air to impinge directly onto the film so as to avoid hot spots), and biaxially oriented on a tenter frame T. M. Long Biaxial stretcher. The draw ratio of the stretcher is set at 3 times 3 and the stretching rate is 5 inches per second (12.7 cm/second). The biaxially stretched films are tested as a fast food sandwich wrap packaging.

TABLE 3

| Example | Cast Film Example | Biaxial Stretch Temperature (° C.) |
|---|---|---|
| 90 | 47 | 85 |
| 91 | 54 | 85 |
| 92 | 57 | 85 |
| 93 | 59 | 55 |
| 94 | 61 | 50 |
| 95 | 64 | 55 |
| 96 | 65 | 90 |
| 97 | 67 | 45 |

Examples 98-102

A polymer prepared as described in Example 7, except at a larger scale, is dried in a hopper dryer for 8 hours at 80° C. to a −40 C dew point. The dried polymer is powder blended with 0.10 weight percent (based on polymer weight) Irganox®11010 hindered phenolic antioxidant (Ciba Company). The material is placed in the hopper of a single screw volumetric feeder, (K-tron Model No. 7), from which it free falls to the inlet of a 28 mm Werner and Pfleider twin screw extruder with a vacuum port maintained at house vacuum attached to a 10 inch wide film die with about a 0.010 inch gap. A dry nitrogen purge is maintained in the feed hopper and the feed throat of the extruder. The extruder is operated at a 150 rpm screw speed with a heater profile of

| Zone 1 (C.) | Zone 2 (C.) | Zone 3 (C.) | Zone 4 (C.) | Zone 5 (C.) | Die (C.) |
|---|---|---|---|---|---|
| 200 | 230 | 240 | 240 | 240 | 245 |

A plasticizer, acetyl tri-n-butyl citrate, from Morflex, Inc., is injected into zone 2 at a rate to provide the compositions listed below in Table 4 with an Accurate feeder. The amount of plasticizer shown in Table 4 is based on the weight of the total composition.

TABLE 4

| Example | Plasticizer (wt. %) |
|---|---|
| 98 | 0 |
| 99 | 5 |
| 100 | 10 |
| 101 | 15 |
| 102 | 20 |

The extruded polymer film is electrostatically pinned on an 12 inch diameter smooth quench drum maintained at a temperature of 26 C with cold water and collected on release paper using a standard tension roll. The quench drum speed is adjusted from 5 to 15 feet per minute to obtain film samples with a thickness of about 8 mils to about 1.5 mils. The films of Examples 98-102 are tested as fast food sandwich wrap packaging.

Examples 103-108

A polymer prepared as described for Example 30, above, except at a larger scale, is dried overnight in a large tray dryer at 60° C. with hot dry air recirculation to a moisture content of less than 0.04 percent. Corn starch (Corn Products 3005 from CPC International, Inc.) and rice starch (Sigma Chemicals catalog number S7260) are dried in a large tray vacuum oven at 90° C. and less than 1 mm Hg vacuum to a moisture content of less than 1 percent and stored in sealed containers until used. Polyethylene adipate, (Rucoflex® S-101-55, nominal molecular weight of 2000, from the Ruco Polymer Corporation), is used directly as received without pretreatment.

Blends of the polymer and starch are made by manually tumbling the materials in plastic bags. The dry starch is added to the warm polymer from the dryer, and the still warm mixture fed to the extruder. When polyethylene adipate, (Rucoflex®), is used, the Rucoflex® is melted and liquid injected into the second heater zone of the extruder through a metering pump. The compositions listed in Table 5, below, are prepared.

TABLE 5

| Example | Polymer (wt. %) | Cornstarch (wt. %) | rice starch (wt. %) | Rucoflex ® (wt. %) |
|---|---|---|---|---|
| 103 | 80 | 20 | | |
| 104 | 60 | 40 | | |
| 105 | 55 | 40 | | 5 |
| 106 | 45 | 35 | | 20 |
| 107 | 60 | | 40 | |
| 108 | 45 | | 35 | 20 |

The blends are placed in the feed hopper (with a nitrogen purge) of a Ktron twin screw feeder (Model Number T-35 with 190 6300 controller), and metered to a Werner and Pfleider ZSK 30 mm twin screw extruder. The extruder has an L/D of 30/1 with a vacuum port and a mild mixing screw. The temperature of the extruder barrel is electrically heated from 170 C at the feed end of the extruder to 200 C at the discharge. The extruder is operated at 150 rpm, and the vacuum port is connected to house vacuum and permitted to fluctuate with process conditions. A single hole die, (⅛-inch diameter), is used for discharge. The resulting strand is quenched in a 6 foot long water trough, dewatered with an air knife and cut into pellets with a Conair cutter, (Model number 304). Operating conditions are listed below in Table 6.

TABLE 6

| Example | Feed Rate (pph) | Screw Torque (% max.) | Die Pressure (psig) | Melt Temperature (° C.) | Vacuum (Inches Hg) |
|---|---|---|---|---|---|
| 103 | 34 | 58 | 800 | 190 | 13 |
| 104 | 32 | 60 | 800 | 210 | 13 |
| 105 | 31 | 50 | 750 | 205 | 12 |
| 106 | 32 | 35 | 600 | 185 | 12 |
| 107 | 33 | 60 | 800 | 210 | 13 |
| 108 | 32 | 35 | 600 | 185 | 13 |

Examples 109-114

The polymer-starch blends prepared above in Examples 103-108 are dried in a hopper dryer for 8 hours at 60 C to a −40 C dew point. The materials are placed in the hopper of a single screw volumetric feeder (K-tron Model No. 7), from which they free fall to the inlet of a 28 mm Werner and Pfleider twin screw extruder with a vacuum port maintained at house vacuum attached to a 10 inch wide film die with about a 0.010 inch gap. A dry nitrogen purge is maintained in the feed hopper and the feed throat of the extruder. The extruder is operated at a 150 rpm screw speed with a heater profile of

| Zone 1 (C.) | Zone 2 (C.) | Zone 3 (C.) | Zone 4 (C.) | Zone 5 (C.) | Die (C.) | Melt (C.) |
|---|---|---|---|---|---|---|
| 165 | 175 | 195 | 195 | 195 | 200 | 200 |

The extruded polymer films are electrostatically pinned on an 12 inch diameter smooth quench drum maintained at a temperature of 26° C. with cold water and collected on release paper using a standard tension roll. The quench drum speed is adjusted from 5 to 15 feet per minute to obtain film samples with a thickness of about 8 mils to about 1.5 mils.

TABLE 7

| Film Example | Blend Example |
|---|---|
| 109 | 103 |
| 110 | 104 |
| 111 | 105 |
| 112 | 106 |
| 113 | 107 |
| 114 | 108 |

The films of Examples 109-114 are tested as fast food sandwich packaging.

Examples 115-121

A polymer prepared as described in Example 35, above, except at a larger scale, is dried overnight in a large tray dryer at 60 C with hot dry air recirculation to a moisture content of less than 0.04 percent. Talc, (from Luzenac, located in Englewood, Colo., having a particle size of 3.8 microns), titanium dioxide, (supplied by Kerr-McGee Chemical, LLC, located in Oklahoma City, Okla., grade Tronox® 470, having a particle size of 0.17 micron), and calcium carbonate, (from ECCA Calcium Products, Inc., of Sylacauga, Ala., ECC Supercoat™ grade with a 1 micron average particle size), are dried in a large tray vacuum oven at 90 C and less than 1 mm Hg vacuum to a moisture content of less than 1 percent and stored in sealed containers until used.

Blends of the polymer and the inorganic fillers are made by manually tumbling the materials in plastic bags. The dry inorganic fillers are added to the warm polymer from the dryer, and the still warm mixture fed to the extruder. The compositions listed in Table 8, below, are prepared.

TABLE 8

| Example | Polymer (wt. %) | Talc (wt. %) | Titanium dioxide (wt. %) | Calcium carbonate (wt. %) |
|---|---|---|---|---|
| 115 | 85 | 2.5 | 5 | 7.5 |
| 116 | 70 | 5 | 5 | 20 |
| 117 | 70 | 5 | 10 | 15 |
| 118 | 30 | 10 | 15 | 45 |

TABLE 8-continued

| Example | Polymer (wt. %) | Talc (wt. %) | Titanium dioxide (wt. %) | Calcium carbonate (wt. %) |
|---|---|---|---|---|
| 119 | 95 | 5 | | |
| 120 | 95 | | 5 | |
| 121 | 70 | | | 30 |

The blends are placed in the feed hopper, (with a nitrogen purge), of a Ktron twin screw feeder, (Model Number T-35 with 190 6300 controller), and metered to a Werner and Pfleider ZSK 30 mm twin screw extruder. This extruder has an L/D of 30/1 with a vacuum port and a hard mixing screw. The temperature of the extruder barrel is electrically heated from 230 C at the feed end of the extruder to 260 C at the discharge. The extruder is operated at 150 rpm, and the vacuum port is connected to house vacuum and permitted to fluctuate with process conditions. A single hole die, (⅛-inch diameter), is used for discharge. The resulting strand is quenched in a 6 foot long water trough, dewatered with an air knife and cut into pellets with a Conair cutter, (Model number 304). Operating conditions are listed below in Table 9.

TABLE 9

| Example Number | Feed Rate (pph) | Screw Torque (% max.) | Die Pressure (psig) | Melt Temperature (C.) | Vacuum (Inches Hg) |
|---|---|---|---|---|---|
| 115 | 34 | 58 | 800 | 245 | 13 |
| 116 | 30 | 70 | 800 | 255 | 13 |
| 117 | 31 | 70 | 800 | 255 | 12 |
| 118 | 32 | 80 | 800 | 265 | 12 |
| 119 | 33 | 50 | 600 | 245 | 13 |
| 120 | 32 | 50 | 600 | 245 | 13 |
| 121 | 30 | 70 | 800 | 255 | 12 |

Examples 122-128

The polymer-inorganic filler blends prepared above in Examples 115-121 and a polymer prepared as described in Example 35, above, except at a larger scale, are dried in a hopper dryer for 8 hours at 60° C. to a −40 C dew point. The materials are placed in the hopper of a single screw volumetric feeder, (K-tron Model No. 7), from which they free fall to the inlet of a 28 mm Werner and Pfleider twin screw extruder with a vacuum port maintained at house vacuum attached to a 10 inch wide film die with about a 0.010 inch gap. Example 125 is composed of a tumbled blend of 50 weight percent of Example 35 and 50 weight percent of Example 118. A dry nitrogen purge is maintained in the feed hopper and the feed throat of the extruder. The extruder is operated at a 150 rpm screw speed with a heater profile of

| Zone 1 (C.) | Zone 2 (C.) | Zone 3 (C.) | Zone 4 (C.) | Zone 5 (C.) | Die (C.) | Melt (C.) |
|---|---|---|---|---|---|---|
| 230 | 245 | 260 | 260 | 260 | 265 | 260 |

The extruded polymer films are electrostatically pinned on an 12 inch diameter smooth quench drum maintained at a temperature of 26 C with cold water and collected on release paper using a standard tension roll. The quench drum speed is adjusted from 5 to 15 feet per minute to obtain film samples with a thickness of about 8 mils to about 1.5 mils. The films are tested as fast food sandwich packaging.

TABLE 10

| Example | Blend Example |
|---|---|
| 122 | 115 |
| 123 | 116 |
| 124 | 117 |
| 125 | 50 wt. % Ex. 118, 50 wt. % Ex. 35 |
| 126 | 119 |
| 127 | 120 |
| 128 | 121 |

Examples 129-134

Polymers prepared as described in the Examples noted below in Table 11, except at a larger scale, are dried overnight at 60 C in a dehumidified air dryer. The dried polymers are fed to a laboratory scale blown film line consisting of a Killion 1.25 inch diameter extruder with a 15:1 gear reducer. The extruder heater zones are set around the temperature noted below in Table 11. The screw is a Maddock mixing type with an L/D of 24 to 1. The compression ratio for the mixing screw is 3.5:1. The screw speed is 25 to 30 rpm. A 1.21 inch diameter die with a 25 mil die gap is used. The air ring is a Killion single-lip, No. 2 type. Blowing conditions can be characterized by the blow up ratio, (BUR), which is the ratio of the bubble diameter to die the die diameter which gives an indication of hoop or transverse direction, (TD), stretch, or the draw-down ratio, (DDR), which is an indication of the axial or machined direction, (MD), stretch.

TABLE 11

| Example Number | Polymer Example Number | Extruder Heater Zones (C.) | Film Thickness (mils) | BUR | DDR |
|---|---|---|---|---|---|
| 129 | 2 | 255 | 2.5 | 3.2 | 3.9 |
| 130 | 15 | 215 | 2.0 | 2.6 | 4.6 |
| 131 | 22 | 220 | 1.2 | 3.1 | 8.0 |
| 132 | 28 | 230 | 2.0 | 2.5 | 5.0 |
| 133 | 31 | 190 | 1.5 | 3.0 | 7.0 |
| 134 | 42 | 240 | 2.3 | 2.0 | 2.0 |

The tubular films are slit and tested as fast food sandwich packaging.

Examples 135-137

Bilayer films are produced on a 10 inch, two layer, Streamlined Coextrusion Die, (SCD), blown film die manufactured by Brampton Engineering. Layer configuration of the die is as follows from outside to inside layers of the die, A/B. Two 3½ inch David Standard extruders fed the A and B layers. The process line further utilizes a Brampton Engineering rotating air ring for polymer cooling. Layer A contains a polymer prepared as described in Example 15, except at a larger scale. Layer B contains a polymer prepared as described in Example 34, except at a larger scale. Both polymers are dried in a dehumidified dryer at 60 C. The operation is tailored to provide the layer ratios for the films noted below in Table 12 as percentages of the total film. The thickness of the film is about 2.25 mil (0.00225 inch). The processing conditions for the film are provided in Table 13, below.

TABLE 12

| Example | Layer A (wt. %) | Layer B (wt. %) |
|---|---|---|
| 135 | 25 | 75 |
| 136 | 50 | 50 |
| 137 | 75 | 25 |

TABLE 13

| | Extruder A | Extruder B |
|---|---|---|
| Zone 1 | 195 C. | 160 C. |
| Zone 2 | 220 C. | 165 C. |
| Zone 3 | 230 C. | 185 C. |
| Zone 4 | 230 C. | 185 C. |
| Zone 5 | 235 C. | 190 C. |
| Screen Changer | 230 C. | 185 C. |
| Adapter 1 | 230 C. | 185 C. |
| Adapter 2 | 230 C. | 185 C. |
| Adapter 4 | 230 C. | 185 C. |
| Die 1 | 230 C. | 230 C. |
| Die 2 | 230 C. | 230 C. |
| Die 3 | 230 C. | 230 C. |
| Line Speed | 122 feet per minute | |
| Notes | 15 | 34 |

The multilayer films prepared above are converted into bags using an inline bag machine manufactured by Battenfeld Gloucester Engineering Co., Inc. downstream of the extrusion line nips. The slit films are tested as fast food sandwich wraps.

Examples 138-140

Bilayer films are produced on a 10 inch, two layer, Streamlined Coextrusion Die, (SCD), blown film die manufactured by Brampton Engineering. Layer configuration of the die is as follows from outside to inside layers of the die, A/B. Two 3½ inch David Standard extruders fed the A and B layers. The process line further utilizes a Brampton Engineering rotating air ring for polymer cooling. Layer A contains the plasticized, starch filled polymer prepared similarly to that described for Example 106. Layer B contains a polymer prepared similarly to that described for Example 7, except at a larger scale. Both polymers are dried in a dehumidified dryer at 60 C. The operation is tailored to provide the layer ratios for the films noted below in Table 14 as percentages of the total film. The thickness of the film is about 2.25 mil (0.00225 inch). The processing conditions for the film are provided in Table 15, below.

TABLE 14

| Example | Layer A (wt. %) | Layer B (wt. %) |
|---|---|---|
| 138 | 25 | 75 |
| 139 | 50 | 50 |
| 140 | 75 | 25 |

TABLE 15

|  | Extruder A | Extruder B |
|---|---|---|
| Zone 1 | 170 C. | 220 C. |
| Zone 2 | 190 C. | 230 C. |
| Zone 3 | 200 C. | 240 C. |
| Zone 4 | 200 C. | 240 C. |
| Zone 5 | 205 C. | 245 C. |
| Screen Changer | 200 C. | 240 C. |
| Adapter 1 | 200 C. | 240 C. |
| Adapter 2 | 200 C. | 240 C. |
| Adapter 4 | 200 C. | 240 C. |
| Die 1 | 240 C. | 240 C. |
| Die 2 | 240 C. | 240 C. |
| Die 3 | 240 C. | 240 C. |
| Line Speed | 122 feet per minute | |
| Notes | 106 | 7 |

The multilayer films prepared above are converted into bags using an inline bag machine manufactured by Battenfeld Gloucester Engineering Co., Inc. downstream of the extrusion line nips. The slit films are tested as fast food sandwich wraps.

Examples 141-143

Bilayer films are produced on a 10 inch, two layer, Streamlined Coextrusion Die, (SCD), blown film die manufactured by Brampton Engineering. Layer configuration of the die is as follows from outside to inside layers of the die, A/B. Two 3½ inch David Standard extruders fed the A and B layers. The process line further utilizes a Brampton Engineering rotating air ring for polymer cooling. Layer A contains a polymer prepared similarly to that described for Example 2, except at a larger scale. Layer B contains Eastar® Bio, from the Eastman Chemical Company and as described above. Both polymers are dried in a dehumidified dryer at 60 C. The operation is tailored to provide the layer ratios for the films noted below in Table 16 as percentages of the total film. The thickness of the film is about 2.25 mil (0.00225 inch). The processing conditions for the film are provided in Table 17, below.

TABLE 16

| Example | Layer A (wt. %) | Layer B (wt. %) |
|---|---|---|
| 141 | 25 | 75 |
| 142 | 50 | 50 |
| 143 | 75 | 25 |

TABLE 17

|  | Extruder A | Extruder B |
|---|---|---|
| Zone 1 | 230 C. | 100 C. |
| Zone 2 | 250 C. | 115 C. |
| Zone 3 | 260 C. | 130 C. |
| Zone 4 | 260 C. | 130 C. |
| Zone 5 | 265 C. | 135 C. |
| Screen Changer | 260 C. | 130 C. |
| Adapter 1 | 260 C. | 130 C. |
| Adapter 2 | 260 C. | 130 C. |
| Adapter 4 | 260 C. | 130 C. |
| Die 1 | 260 C. | 260 C. |
| Die 2 | 260 C. | 260 C. |
| Die 3 | 260 C. | 260 C. |

TABLE 17-continued

|  | Extruder A | Extruder B |
|---|---|---|
| Line Speed | 122 feet per minute | |
| Notes | 2 | Eastar ® Bio |

The multilayer films prepared above are converted into bags using an inline bag machine manufactured by Battenfeld Gloucester Engineering Co., Inc. downstream of the extrusion line nips. The slit films are tested as fast food sandwich wraps.

Examples 144-170 and Comparative Examples CE 12-CE 17

The polyester resins prepared similarly to that described in the Examples and Comparative Example listed below in Table 18, except at a larger scale, are dried in a desiccant air dryer with a dew point of −40 C overnight at a temperature of 60 C. The polyester resins are extrusion coated onto paperboard stock by feeding the dried pellets into a 2.5 inch commercial extruder having a barrel length to diameter ratio of 28:1. The five zones of the extruder are maintained at a temperature in the range noted below within Table 18. A single flight screw having eight compression flights, four metering flights, a two flight mixing section and six metering flights is used in the extruder. The screw speed is maintained at 180 revolutions per minute, (rpm). The molten polyester resins are passed through three 24×24 mesh screens. The polymers are passed through a center fed die with 0.75 inch lands having a die opening of 36 inches by 0.02 inches. The extrusion feed rate is held constant at 460 pounds per hour. The resulting extrudates are passed through a 5 inch air gap into the nip formed by a rubber-covered pressure roll and a chill roll. At the same time the paperboard stock noted below in Table 18, that is 32 inches wide, is fed into the nip with the roll in contact with the film. A nip pressure of 100 pounds per linear inch is applied. A 24 inch diameter mirror finished chill roll is maintained at a temperature of 19 C during the extrusion trials. The coated paperboard is taken off the chill roll at a point 180 degrees from the nip formed by the pressure roll and the chill roll. The chill roll is operated at linear speeds of 300 feet per minute, to obtain a polyester resin thickness of 1.25 mils. The polyester resin thickness can be modified by operational modifications.

TABLE 18

| Example | Polymer Example | Extruder Temperature (C.) | Paper/Paperboard Stock |
|---|---|---|---|
| 144 | 1 | 240 | 35 pound basis weight natural kraft paper |
| CE 12 | CE 4 | 185 | Parchment |
| 145 | 4 | 230 | Parchment |
| 146 | 5 | 260 | 25 pound basis weight bleached kraft paper |
| CE 13 | CE 5 | 210 | 15 pound basis weight kraft paper |
| 147 | 10 | 240 | 15 pound basis weight kraft paper |
| 148 | 15 | 230 | 18 pound basis weight natural paper |
| 149 | 26 | 265 | 18 pound basis weight bleached paper |
| 150 | 32 | 230 | 25 pound basis weight bleached kraft paper |
| 151 | 103 | 190 | 35 pound basis weight natural kraft paper |
| 152 | 115 | 245 | Parchment |

TABLE 18-continued

| Example | Polymer Example | Extruder Temperature (C.) | Paper/Paperboard Stock |
|---|---|---|---|
| 153 | 2 | 260 | Trilayered cup paperboard (210 g/m2 weight) |
| CE 14 | CE 4 | 195 | Trilayered cup paperboard (210 g/m2 weight) |
| 154 | 4 | 240 | Trilayered cup paperboard (210 g/m2 weight) |
| 155 | 6 | 210 | Trilayered cup paperboard (210 g/m2 weight) |
| CE 15 | CE 5 | 210 | Trilayered cup paperboard (210 g/m2 weight) |
| 156 | 10 | 240 | Trilayered cup paperboard (210 g/m2 weight) |
| 157 | 17 | 100 | Trilayered cup paperboard (210 g/m2 weight) |
| 158 | 29 | 235 | Trilayered cup paperboard (210 g/m2 weight) |
| 159 | 34 | 190 | Trilayered cup paperboard (210 g/m2 weight) |
| 160 | 105 | 205 | Trilayered cup paperboard (210 g/m2 weight) |
| 161 | 116 | 255 | Trilayered cup paperboard (210 g/m2 weight) |
| 162 | 3 | 230 | 18 point paperboard |
| CE 16 | CE 4 | 210 | 18 point paperboard |
| 163 | 4 | 250 | 18 point paperboard |
| 164 | 8 | 250 | 12 point paperboard |
| CE 17 | CE 5 | 210 | 12 point paperboard |
| 165 | 10 | 240 | 12 point paperboard |
| 166 | 20 | 235 | 12 point paperboard |
| 167 | 31 | 195 | 18 point paperboard |
| 168 | 42 | 240 | 12 point paperboard |
| 169 | 108 | 185 | 18 point paperboard |
| 170 | 117 | 255 | 12 point paperboard |

The products prepared in Examples 144-152 are tested as fast food sandwich wrap packaging. The products are formed and heat sealed by conventional processes into the shape of envelopes and bags, including for, for example, waste, trash, leaf, air-sickness, and groceries.

Examples 153-161 are formed by conventional processes into the shape of cups, glasses, bowls, trays, liquid containers and cartons, including for, for example, milk, juice, water, wine, yogurt, cream, and soda. Examples 162-170 are formed by conventional processes into the shape of trays, boxes, lidded sandwich containers, lidded salad containers, hinged lid sandwich containers, and hinged lid salad containers.

Example 171

A polymer prepared as described in Example 22, except at a larger scale, and poly(lactide) (from the Cargill Dow Company), are dried in a hopper dryer overnight at 60 C to a −40 C dew point. On a trilayered paperboard that weighed 210 g/m² with a forward speed of 150 meters/minute is coextruded the Example 22 polymer and poly(lactide) in a weight ratio of 1:3. The melt temperature of the Example 22 polymer is 240 C and the melt temperature of the poly(lactide) is 240 C. A coated paperboard is obtained where the total weight of the polymeric coating is 19.4 grams/meter.sup.2 in a weight ratio of 75 weight percent of the poly(lactide), which formed the outer layer, and 25 weight percent of the polymer from Example 22, which formed the inner layer adhered to the paperboard. The paperboard prepared above is formed by conventional processes into the shape of cups, glasses, bowls, trays, liquid containers and cartons, including for, for example, milk, juice, water, wine, yogurt, cream, and soda.

Examples 172-177

Calendered paper laminates are prepared by making an assembly of the film produced as described above in Examples noted below in Table 19, coated onto release paper, in contact with a similar sized sheet of paper to be coated, and then pressing this assembly through the nip between a heated polished metal top roll and an unheated resilient (silk) roll at a surface speed of 5 yards/minute, at a temperature of 200 F and under a pressure of 10 tons. Details are given in Table 19, below.

TABLE 19

| Example | Film Example | Paper Substrate | Paper Basis Wt./Thickness (oz/yd.sup.2/mils) |
|---|---|---|---|
| 172 | 53 | Towel, (Scott, Viva) | 1.2/6 |
| 173 | 57 | Towel, (G. P., Sparkle) | 1.3/10 |
| 174 | 61 | Toilet Tissue, (Charmin) | 0.9/6 |
| 175 | 62 | Wrapping Tissue, (white) | 0.5/2 |
| 176 | 112 | Newsprint | 1.5/4 |
| 177 | 125 | Kraft, (recycled) | 2.8/6 |

Pieces of the above laminates, (8-inch by 8-inch squares), are placed in a rotary composter with about 0.5 cubic yards squared of mixed municipal solid waste, (from which glass, cans, and much of the light plastic and paper is removed), and sewage sludge in the ratio of about 2:1. The composter is rotated once a week and the temperature and moisture content is monitored.

Example 178

A laminated stock is produced from a combination of a paperboard and a corona-treated polyester film using a combination of two water-based acrylic adhesive formulations. The paperboard base stock is a bleached white paperboard of the type typically referred to as a solid bleached sulfate (SBS) paperboard, which is well known as a base stock for food packaging materials. The particular paperboard used here is uncoated milk carton stock with a thickness of 0.0235 inch and weighing 282 pounds per 3,000 square feet. The film is produced as described in Example 105, above, and is corona discharge treated by conventional means on one side to enhance adhesive bonding. The lamination process is run on a conventional wet-bond laminating machine with adhesive stations for applying adhesive to both the paperboard and to the film. Adhesive is applied to the paperboard with a 110 line gravure roll applicator delivering about 3 pounds of wet adhesive per 1,000 square feet of paperboard. The adhesive applied to the paperboard consists of 200 pounds of Rhoplex® N-1031 acrylic latex from the Rohm & Haas Company and 1.5 ounces of Foamaster NXZ defoamer (predispersed in an equal volume of water) from the Diamond Shamrock Chemical Company. Adhesive is applied to the corona-treated side of the polyester film. The adhesive applied consists of 375 pounds of Rhoplex® N-1031 acrylic latex from the Rohm & Haas Company, 11.5 pounds of Cymel® 325 melamine-formaldehyde crosslinking agent, 11.5 pounds of isopropyl alcohol, 23 pounds of water, and 3 ounces of Foamaster NXZ defoamer (predispersed in an equal volume of water) from the Diamond Shamrock Chemicals Company.

The laminating process is run with the paperboard and the film running simultaneously through the respective adhesive application stations, and then the paperboard and the film are both directed into a laminating nip where the two adhesive-coated surfaces are joined with the adhesive still moist on both surfaces. The laminating machine is run at a rate of 300 to 350 feet per minute. The laminated stock is run the laminating nip into a hot air oven with an air temperature of 400 degrees F. Residence time for the laminated stock in the oven is about 5 seconds. The laminated stock is then run over a chill roll and rewound into a finished roll.

The laminated stock prepared above is formed by conventional processes into the shape of cups, glasses, bowls, trays, liquid containers and cartons, including for, for example, milk, juice, water, wine, yogurt, cream, and soda.

Examples 179-202

These examples demonstrate the lamination of the films onto preformed substrates. The operation is conducted in a Lab Form Inc. forming machine with a 10 by 10-inch platen. The preformed substrate is shuttled onto the platen. The film is unrolled, preheated for the time noted below in Table 20 by "Black Box Heating" with infrared type heaters. The preheated film is then positioned over the preformed substrate and pulled down onto the preformed substrate. Examples 179-186 utilize vacuum lamination by drawing a vacuum through the preformed substrate, which, in turn, draws the film onto the contours of the preformed substrate. Examples 187-194 utilize plug assisted vacuum lamination whereby, in addition to the above described vacuum, a plug helps to push the preheated film from the side opposite the preformed substrate to help reduce film thinning into deep draw preformed substrates. Examples 195-202 utilize pressure lamination by applying an air pressure to the preheated film side opposite to the preformed substrate, which forces the film onto the contours of the preformed substrate. The lamination process typically takes from 5 to 100 seconds, at which time excess film is trimmed off the laminated substrate and the laminated substrate is ejected and cooled.

The preformed substrates used within these examples of the present invention are as follows. A 9-inch molded "pulp plate", prepared by conventional processes. A formed frozen dinner paperboard "tray", prepared by conventional processes. A formed paperboard coffee "cup", 3.5 inches tall, prepared by conventional processes. A formed paperboard "bowl", 3 inches tall and 4 inches in diameter, prepared by conventional processes. A 9 inch "foam plate", obtained by carefully stripping off the barrier film from commercially available plates obtained from the EarthShell Company, (Stock Number PL9V00001). A 12 ounce "foam bowl", obtained by carefully stripping off the barrier film from commercially available bowls obtained from the EarthShell Company, (Stock Number BL12V00001). Hinged-lid salad and sandwich "foam containers" with a double-tab closure mechanism, obtained by carefully stripping off the barrier film from commercially available containers obtained from the EarthShell Company, (Stock Number CLS00001).

TABLE 20

| Example | Film Example | Film Preheat Time (seconds) | Preformed Substrate |
|---|---|---|---|
| 179 | 45 | 40 | pulp plate |
| 180 | 54 | 35 | tray |
| 181 | 61 | 30 | cup |
| 182 | 65 | 50 | bowl |

TABLE 20-continued

| Example | Film Example | Film Preheat Time (seconds) | Preformed Substrate |
|---|---|---|---|
| 183 | 69 | 40 | foam plate |
| 184 | 111 | 35 | foam bowl |
| 185 | 122 | 40 | foam containers |
| 186 | 135 | 40 | cup |
| 187 | 50 | 25 | cup |
| 188 | 57 | 50 | bowl |
| 189 | 62 | 30 | foam bowl |
| 190 | 66 | 35 | foam containers |
| 191 | 72 | 50 | cup |
| 192 | 106 | 30 | bowl |
| 193 | 123 | 40 | foam bowl |
| 194 | 138 | 40 | pulp plate |
| 195 | 52 | 40 | pulp plate |
| 196 | 59 | 40 | tray |
| 197 | 64 | 20 | cup |
| 198 | 67 | 40 | bowl |
| 199 | 74 | 50 | foam plate |
| 200 | 114 | 40 | foam bowl |
| 201 | 124 | 40 | foam containers |
| 202 | 143 | 50 | bowl |

What is claimed is:

1. A sulfonated aromatic copolyester comprising an acid component, a glycol component, from 0 to about 5.0 mole percent of a polyfunctional branching agent selected from polyfunctional acid, glycol and mixtures thereof, and optionally an effective amount of a color reducing agent, wherein said acid component consists essentially of
   a. 98.9 to 1.0 mole percent of an aromatic dicarboxylic acid component based on 100 mole percent total acid component, and
   b. 1.0 to 99.0 mole percent of a hydroxyalkanoic acid component selected from lactic acid, glycolic acid and mixtures thereof, based on 100 mole percent total acid component, and
   c. about 0.1 to about 5.0 mole percent of a sulfonate component based on 100 mole percent total acid component, and wherein said glycol component comprises:
   a. about 99.0 to about 1.0 mole percent of a single first glycol component selected from ethylene glycol, 1,3-propanediol and 1,4-butanediol, and
   b. 1.0 to about 5.0 mole percent of one or more of a second glycol component based on 100 mole percent total glycol component.

2. The sulfonated aromatic copolyester of claim 1, having an inherent viscosity of at least 0.15 dL/g, as measured on a 0.5 percent solution of the copolyester in a 50:50 solution of trifluoroacetic acid:dichloromethane solvent system at room temperature.

3. The sulfonated aromatic copolyester of claim 2, wherein said inherent viscosity is at least 0.35 dL/g.

4. The sulfonated aromatic copolyester of claim 1 wherein said second glycol component is selected from the group consisting of ethylene glycol, 1,3-propanediol, 1,6-hexanediol, 1,8-octanediol, 1,10-decanediol, 1,12-dodecanediol, 1,14-tetradecanediol, 1,16-hexadecanediol, dimer diol, 4,8-bis(hydroxymethyl)-tricyclo[5.2.1.0/2.6]decane, 1,4-cyclohexanedimethanol, isosorbide, di(ethylene glycol), tri(ethylene glycol), poly(alkylene ether)glycols in the molecular weight range of about 500 to about 4000, and mixtures derived therefrom.

5. The sulfonated aromatic copolyester of claim 1 wherein said sulfonate component is selected from the group consisting of metal salts of 5-sulfoisophthalic acid and metal salts of dimethyl 5-sulfoisophthalate.

6. The sulfonated aromatic copolyester of claim 1 wherein said aromatic dicarboxylic acid component is selected from the group consisting of: terephthalic acid, dimethyl terephthalate, bis(2-hydroxyethyl)terephthalate, bis(3-hydroxypropyl)terephthalate, bis(4-hydroxybutyl)terephthalate, isophthalic acid, dimethyl isophthalate, bis(2-hydroxyethyl) isophthalate, bis(3-hydroxypropyl)isophthalate, bis(4-hydroxybutyl)isophthalate; 2,6-napthalene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), and mixtures derived therefrom.

7. The sulfonated aromatic copolyester of claim 1, wherein the acid component comprises from about 98.9 to about 30 mole percent of said aromatic dicarboxylic acid component.

8. The sulfonated aromatic copolyester of claim 1, wherein the acid component comprises from about 98.9 to about 50 mole percent of said aromatic dicarboxylic acid component.

9. The sulfonated aromatic copolyester of claim 1, wherein the acid component comprises from about 95 to about 50 mole percent of said aromatic dicarboxylic acid component.

10. The sulfonated aromatic copolyester of claim 1, wherein the acid component comprises from about 1 to about 70 mole percent of said hydroxyalkanoic acid component.

11. The sulfonated aromatic copolyester of claim 1, wherein the acid component comprises from about 1 to about 50 mole percent of said hydroxyalkanoic acid component.

12. The sulfonated aromatic copolyester of claim 1, wherein the acid component comprises from about 5 to about 50 mole percent of said hydroxyalkanoic acid component.

13. The sulfonated aromatic copolyester of claim 1, wherein said branching agent is selected from the group consisting of: 1,2,4-benzenetricarboxylic acid; trimethyl-1,2,4-benzenetricarboxylate; tris(2-hydroxyethyl)-1,2,4-benzenetricarboxylate; tris(3-hydroxypropyl)-1,2,4-benzenetricarboxylate; tris(4-hydroxybutyl)-1,2,4-benzenetricarboxylate; 1,2,4-benzenetricarboxylic anhydride; 1,3,5-benzenetricarboxylic acid; 1,2,4,5-benzenetetracarboxylic acid; 1,2,4,5-benzenetetracarboxylic dianhydride; 3,3',4,4'-benzophenonetetracarboxylic dianhydride; 1,4,5,8-naphthalenetetracarboxylic dianhydride; citric acid; tetrahydrofuran-2,3,4,5-tetracarboxylic acid; 1,3,5-cyclohexanetricarboxylic acid; pentaerythritol; glycerol; 2-(hydroxymethyl)-1,3-propanediol; 2,2-bis(hydroxymethyl)propionic acid; and mixtures derived therefrom.

14. The sulfonated aromatic copolyester of claim 2, having an inherent viscosity of at least about 0.35 dL/g.

15. The sulfonated aromatic copolyester of claim 2, having an inherent viscosity of at least about 0.65 dL/g.

16. The sulfonated aromatic copolyester of claim 1, further comprising a filler.

17. The sulfonated aromatic copolyester of claim 16, wherein said filler comprises a first set of particles having a first average particle size, and a second set of particles having a second average particle size, and wherein second average particle size is at least about 2 times that of said first average particle size.

18. The sulfonated aromatic copolyester of claim 16, wherein said filler consists essentially of particles having an average diameter less than about 40 microns.

19. The sulfonated aromatic copolyester of claim 16, wherein said filler consists essentially of particles having an average diameter less than about 20 microns.

20. A blend comprising the sulfonated aromatic copolyester of claim 1 and at least one other polymer.

21. The blend of claim 20 wherein said other polymer is biodegradable.

22. The blend of claim 21 wherein said biodegradable polymer is selected from the group consisting of poly (hydroxy alkanoates), polycarbonates, poly(caprolactone), aliphatic polyesters, aromatic copolyesters, aliphatic-aromatic copolyetheresters, aliphatic-aromatic copolyamideesters, sulfonated aliphatic-aromatic copolyesters, sulfonated aliphatic-aromatic copolyetheresters, sulfonated aliphatic-aromatic copolyamideesters, and mixtures derived therefrom.

23. The blend of claim 21 wherein said other polymer is nonbiodegradable.

24. The blend of claim 21 wherein said other polymer is a natural polymer.

25. The blend of claim 24 wherein said natural polymer is a starch.

26. A shaped article formed from the sulfonated aromatic copolyester of claim 1.

27. The shaped article of claim 26 selected from the group consisting of films, sheets, fibers, melt blown containers, molded parts, and foamed parts.

28. A film comprising the sulfonated aromatic copolyester of claim 1.

29. The film of claim 28, having a thickness from about 0.025 mm to about 0.15 mm.

30. The film according to claim 28, being an oriented film.

31. The oriented film of claim 30, being a biaxially oriented film.

32. The film of claim 30 wherein said film is uniaxially oriented.

33. A multilayer film comprising a layer comprising the sulfonated aromatic copolyester of claim 1.

34. An article comprising a substrate and a coating on said substrate, said coating comprising the sulfonated aromatic copolyetherester of claim 1.

35. The article of claim 34 wherein said coating has a thickness from about 0.2 to about 15 mils.

36. The article of claim 34 wherein said coating has a thickness from about 0.5 to about 2 mils.

37. The article of claim 34 wherein said substrate is selected from the group consisting of textiles, nonwovens, foil, paper, paperboard, and metals.

38. An article comprising a substrate having laminated thereon the sulfonated aromatic copolyester of claim 1.

39. The article of claim 38 wherein said substrate is selected from the group consisting of paper, paperboard, cardboard, fiberboard, cellulose, starch, plastic, polystyrene foam, glass, metals, polymeric foams, organic foams, inorganic foams, organic-inorganic foams, and polymeric films.

40. A package comprising the article of claim 38.

41. A wrap comprising the sulfonated aromatic copolyester of claim 1.

42. A sheet comprising the sulfonated aromatic copolyester of claim 1.

43. The sheet of claim 42, having a thickness of at least about 0.50 mm.

44. A fiber comprising the sulfonated aromatic copolyester of claim 1.

45. The fiber of claim 44 having a denier from about 0.1 to about 100.

46. The fiber of claim 44 having a denier from about 0.5 to 20.

47. A fiber comprising the sulfonated aromatic copolyester of claim 1 and at least one other polymer.

48. The fiber of claim 44 wherein said fiber comprises a blend of said sulfonated aromatic copolyester and one or more natural fibers.

49. The fiber of claim 44 wherein said fiber is a heterogeneous fiber.

50. A foamed article comprising the sulfonated aromatic copolyester of claim 16.

51. A shaped article formed from the sulfonated aromatic copolyester of claim 16.

52. The shaped article of claim 51 selected from the group consisting of films, sheets, fiber, melt blown containers, molded parts, and foamed parts.

53. A film comprising the sulfonated aromatic copolyester of claim 16.

54. The film of claim 53, having a thickness from about 0.025 mm to about 0.15 mm.

55. The film according to claim 53, being an oriented film.

56. A multilayer film comprising a layer comprising the sulfonated aromatic copolyester of claim 16.

57. An article comprising a substrate and a coating on said substrate, said coating comprising the sulfonated aromatic copolyester of claim 16.

58. An article comprising a substrate having laminated thereon the sulfonated aromatic copolyester of claim 16.

59. A wrap comprising the sulfonated aromatic copolyester of claim 16.

60. A sheet comprising the sulfonated aromatic copolyester of claim 16.

61. A foamed article comprising the blend of claim 20.

62. A shaped article formed from the blend of claim 20.

63. The shaped article of claim 62 selected from the group consisting of films, sheets, fiber, melt blown containers, molded parts, and foamed parts.

64. A film comprising the blend of claim 20.

65. The film of claim 64, having a thickness from about 0.025 mm to about 0.15 mm.

66. The film according to claim 64, being an oriented film.

67. A multilayer film comprising a layer comprising the blend of claim 20.

68. An article comprising a substrate and a coating on said substrate, said coating comprising the blend of claim 20.

69. An article comprising a substrate having laminated thereon the blend of claim 20.

70. A wrap comprising the blend of claim 20.

71. A sheet comprising the blend of claim 20.

72. A process for producing a package, comprising providing a substrate; forming said substrate into a desired package form; providing a sulfonated aromatic copolyester comprising an acid component, a glycol component, from 0 to about 5.0 mole percent of a polyfunctional branching agent selected from polyfunctional acid, glycol and mixtures thereof, and optionally an effective amount of a color reducing agent, wherein said acid component consists essentially of a. 98.9 to 1.0 mole percent of an aromatic dicarboxylic acid component based on 100 mole percent total acid component, and b. 1.0 to 99.0 mole percent of a hydroxyalkanoic acid component selected from lactic acid, glycolic acid and mixtures thereof, based on 100 mole percent total acid component, and c. about 0.1 to about 5.0 mole percent of a sulfonate component based on 100 mole percent total acid component, and wherein the glycol component comprises a. about 99.0 to about 1.0 mole percent of a single first glycol component selected from ethylene glycol, 1,3-propanediol and 1,4-butanediol, and b. 1.0 to about 5.0 mole percent of one or more of a second glycol component based on 100 mole percent total glycol component; and laminating or coating said substrate with said sulfonated aromatic copolyester to form said package.

73. The process of claim 72 wherein said substrate comprises a material selected from the group consisting of paper, paperboard, inorganic foams, organic foams, and inorganic-organic foams.

74. The process of claim 72 wherein said package form is selected from the group consisting of wrappers, stretch wrap films, bags, cups, trays, cartons, boxes, bottles, crates, packaging films, blister pack wrappers, skin packaging, and hinged containers.

75. A process for producing a sulfonated aromatic copolyester, comprising providing a reaction mixture comprising an aromatic dicarboxylic component, a first glycol component selected from ethylene glycol, 1,3-propanediol and 1,4-butanediol, 0.1 to 10.0 mole percent of a sulfonate component, and optionally a polyfunctional branching agent; and allowing said aromatic dicarboxylic acid component, said sulfonate component, said first glycol component, said second glycol component and said polyfunctional branching agent to polymerize to form a sulfonated aromatic copolyester comprising an acid component, and a glycol component, wherein said acid component consists essentially of a. 98.9 to 1.0 mole percent of an aromatic dicarboxylic acid component based on 100 mole percent total acid component, and b. 1.0 to 99.0 mole percent of a hydroxyalkanoic acid component selected from lactic acid, glycolic acid and mixtures thereof, based on 100 mole percent total acid component, and c. about 0.1 to about 5.0 mole percent of a sulfonate component based on 100 mole percent total acid component, and wherein said glycol component comprises:

a. about 99.0 to about 1.0 mole percent of a single first glycol component selected from ethylene glycol, 1,3-propanediol and 1,4-butanediol, and b. 1.0 to about 5.0 mole percent of one or more of a second glycol component based on 100 mole percent total glycol component.

76. The composition of claim 1, comprising 0.001 to 5 weight percent of the color reducing agent based on the weight of the polymer.

77. The sulfonated aromatic copolyester of claim 1, wherein the glycol component further comprises 0.1 to 10.0 mole percent of a sulfonate component.

78. The process of claim 72, wherein the glycol component further comprises 0.1 to 10.0 mole percent of a sulfonate component.

79. The process of claim 75, wherein the glycol component further comprises 0.1 to 10.0 mole percent of a sulfonate component.

* * * * *